(12) United States Patent
Bascom et al.

(10) Patent No.: US 9,047,386 B2
(45) Date of Patent: Jun. 2, 2015

(54) CREATING A LINK RELATIONSHIP BETWEEN DOCUMENT OBJECTS AND STORING IN A LINK DIRECTORY

(71) Applicant: Bascom Research, LLC, McLean, VA (US)

(72) Inventors: Thomas Layne Bascom, McLean, VA (US); Tanya Jones, Durwood, MD (US)

(73) Assignee: Bascom Research, LLC, McLean, VA (US)

( * ) Notice: Subject to any disclaimer, the term of this patent is extended or adjusted under 35 U.S.C. 154(b) by 0 days.

(21) Appl. No.: 13/754,542

(22) Filed: Jan. 30, 2013

(65) Prior Publication Data
US 2013/0226947 A1  Aug. 29, 2013

Related U.S. Application Data

(63) Continuation of application No. 11/543,862, filed on Oct. 6, 2006, which is a continuation-in-part of
(Continued)

(51) Int. Cl.
*G06F 17/30* (2006.01)

(52) U.S. Cl.
CPC .... *G06F 17/30882* (2013.01); *G06F 17/30864* (2013.01); *G06F 17/30575* (2013.01); *G06F 17/30286* (2013.01); *G06F 17/30017* (2013.01); *G06F 17/30011* (2013.01)

(58) Field of Classification Search
CPC .............. G06F 17/30882; G06F 17/30864; G06F 17/30575; G06F 17/30286; G06F 17/30011; G06F 17/30017
USPC .......... 707/770, 704, 758, 769, 802; 709/203; 715/201, 234
See application file for complete search history.

(56) References Cited

U.S. PATENT DOCUMENTS 4,982,344 A  1/1991  Jordan 5,204,947 A  4/1993  Bernstein et al.
(Continued)

FOREIGN PATENT DOCUMENTS

DE  2432204 C2  7/1974
DE  2649181 A1  5/1978
(Continued)

OTHER PUBLICATIONS

Microsoft Press Computer Dictionary, 3rd Edition, Microsoft Press, Redmond, WA (C) 1997, pp. 148-149.
(Continued)

*Primary Examiner* — Shahid Alam
(74) *Attorney, Agent, or Firm* — Andrews Kurth LLP; Aldo Noto; Matthew J. Esserman

(57) ABSTRACT

Methods for searching relationships between and among documents are detailed. One method includes steps for selecting one or more initial search items from a group consisting of: (a) document objects, (b) link references to document objects, (c) link reference attributes, and (d) link relationship attributes. The method also includes steps for identifying one or more link relationships using the selected initial search items, and for presenting one or more link relationships attributes describing the identified link relationships. A user interface for presenting and searching relationships between document objects located on a network is also detailed. The user interface may include a first portion of a screen display for displaying one or more link relationship attributes and a second portion of the screen display for displaying one or more entries from a group consisting of: (a) link references that represent the document objects, (b) link relationship attributes describing the link relationships, (c) link reference attributes describing the link references, and (d) document objects. The displayed entries in the second portion of the user interface are related to the displayed one or more link relationship attributes in the first portion.

53 Claims, 28 Drawing Sheets

Related U.S. Application Data application No. 10/090,740, filed on Mar. 6, 2002, now Pat. No. 7,111,232, and a continuation-in-part of application No. 10/090,740, filed on Mar. 6, 2002, now Pat. No. 7,111,232, which is a continuation-in-part of application No. 10/050,515, filed on Jan. 18, 2002, now Pat. No. 7,386,792, and a continuation-in-part of application No. 10/050,515, filed on Jan. 18, 2002, now Pat. No. 7,386,792, said application No. 11/543,862 is a continuation of application No. 10/118,918, filed on Apr. 10, 2002, now Pat. No. 7,158,971, and a continuation of application No. 10/118,918, filed on Apr. 10, 2002, now Pat. No. 7,158,971, which is a continuation-in-part of application No. 10/090,739, filed on Mar. 6, 2002, now Pat. No. 7,139,974, and a continuation-in-part of application No. 10/090,739, filed on Mar. 6, 2002, now Pat. No. 7,139,974, which is a continuation-in-part of application No. 10/050,515, filed on Jan. 18, 2002, now Pat. No. 7,386,792, and a continuation-in-part of application No. 10/050,515, filed on Jan. 18, 2002, now Pat. No. 7,386,792.

(60) Provisional application No. 60/282,470, filed on Apr. 10, 2001, provisional application No. 60/273,520, filed on Mar. 7, 2001.

(56) References Cited

U.S. PATENT DOCUMENTS

| | | |
|---|---|---|
| 5,297,249 A | 3/1994 | Bernstein et al. |
| 5,303,379 A | 4/1994 | Khoyi et al. |
| 5,499,359 A | 3/1996 | Vijaykumar |
| 5,608,900 A | 3/1997 | Dockter et al. |
| 5,634,048 A | 5/1997 | Ryu et al. |
| 5,634,124 A | 5/1997 | Khoyi et al. |
| 5,649,192 A | 7/1997 | Stucky |
| 5,694,594 A | 12/1997 | Chang |
| 5,715,444 A | 2/1998 | Danish et al. |
| 5,717,917 A | 2/1998 | Munakata |
| 5,717,922 A | 2/1998 | Hohense et al. |
| 5,721,911 A | 2/1998 | Ha |
| 5,787,440 A | 7/1998 | Bakke et al. |
| 5,787,442 A | 7/1998 | Hacheri et al. |
| 5,794,232 A * | 8/1998 | Mahlum et al. ............ 707/713 |
| 5,794,257 A | 8/1998 | Liu et al. |
| 5,796,393 A | 8/1998 | MacNaughton et al. |
| 5,801,702 A | 9/1998 | Dolan et al. |
| 5,802,539 A | 9/1998 | Daniels |
| 5,809,250 A | 9/1998 | Kisor |
| 5,809,317 A | 9/1998 | Kogan et al. |
| 5,822,539 A | 10/1998 | Van Hoff |
| 5,826,025 A | 10/1998 | Gramlich |
| 5,842,221 A | 11/1998 | Schmonsees |
| 5,875,446 A | 2/1999 | Brown et al. |
| 5,884,079 A | 3/1999 | Furusawa |
| 5,895,470 A | 4/1999 | Pirolli et al. |
| 5,895,471 A | 4/1999 | King et al. |
| 5,900,870 A | 5/1999 | Malone |
| 5,917,491 A | 6/1999 | Bauersfeld |
| 5,924,090 A | 7/1999 | Krellenstein |
| 5,933,827 A | 8/1999 | Cole et al. |
| 5,940,831 A | 8/1999 | Takano |
| 5,940,834 A | 8/1999 | Pinard et al. |
| 5,941,944 A | 8/1999 | Messerly |
| 5,943,670 A | 8/1999 | Prager |
| 5,958,016 A | 9/1999 | Chang et al. |
| 5,966,126 A | 10/1999 | Szabo |
| 5,983,241 A | 11/1999 | Hoshino |
| 5,987,471 A * | 11/1999 | Bodine et al. ............ 707/803 |
| 5,987,480 A | 11/1999 | Donohue et al. |
| 5,999,929 A | 12/1999 | Goodman |
| 6,006,252 A | 12/1999 | Wolfe |
| 6,009,410 A | 12/1999 | Le Mole et al. |
| 6,016,498 A | 1/2000 | Bakke et al. |
| 6,029,182 A | 2/2000 | Nehab et al. |
| 6,032,162 A | 2/2000 | Burke |
| 6,032,196 A | 2/2000 | Monier |
| 6,035,281 A | 3/2000 | Crosskey et al. |
| 6,035,325 A | 3/2000 | Potts |
| 6,035,330 A | 3/2000 | Astiz et al. |
| 6,037,935 A | 3/2000 | Bates et al. |
| 6,041,360 A | 3/2000 | Himmel et al. |
| 6,044,374 A | 3/2000 | Nesamoney et al. |
| 6,044,378 A | 3/2000 | Gladney |
| 6,049,799 A * | 4/2000 | Mangat et al. ............ 707/669 |
| 6,055,540 A | 4/2000 | Snow et al. |
| 6,055,542 A | 4/2000 | Nielsen et al. |
| 6,069,630 A | 5/2000 | Lisle et al. |
| 6,073,135 A | 6/2000 | Broder et al. |
| 6,081,829 A | 6/2000 | Sidana |
| 6,092,074 A | 7/2000 | Rodkin et al. |
| 6,112,024 A | 8/2000 | Almond |
| 6,112,202 A | 8/2000 | Kleinberg |
| 6,122,647 A | 9/2000 | Horowitz et al. |
| 6,128,667 A | 10/2000 | Jeffrey |
| 6,138,129 A | 10/2000 | Combs |
| 6,138,159 A | 10/2000 | Phaal |
| 6,144,991 A | 11/2000 | England |
| 6,145,000 A | 11/2000 | Stuckman et al. |
| 6,169,992 B1 | 1/2001 | Beall et al. |
| 6,175,831 B1 | 1/2001 | Weinreich et al. |
| 6,181,614 B1 | 1/2001 | Aipperspach et al. |
| 6,182,072 B1 | 1/2001 | Leak et al. |
| 6,182,091 B1 | 1/2001 | Pitkow |
| 6,182,113 B1 | 1/2001 | Narayanaswami |
| 6,184,886 B1 | 2/2001 | Bates et al. |
| 6,185,614 B1 | 2/2001 | Cuomo et al. |
| 6,189,012 B1 | 2/2001 | Mital et al. |
| 6,189,019 B1 | 2/2001 | Blumer |
| 6,195,681 B1 | 2/2001 | Appleman et al. |
| 6,204,582 B1 | 3/2001 | Keller et al. |
| 6,208,992 B1 | 3/2001 | Bruckner |
| 6,209,036 B1 | 3/2001 | Aldred et al. |
| 6,212,533 B1 | 4/2001 | Tabuchi |
| 6,226,655 B1 | 5/2001 | Borman |
| 6,236,768 B1 | 5/2001 | Rhodes et al. |
| 6,236,991 B1 | 5/2001 | Frauenhofer et al. |
| 6,266,649 B1 | 7/2001 | Linden et al. |
| 6,282,548 B1 | 8/2001 | Burner et al. |
| 6,292,789 B1 | 9/2001 | Schutzer |
| 6,311,194 B1 | 10/2001 | Sheth et al. |
| 6,317,777 B1 | 11/2001 | Skarbo et al. |
| 6,324,538 B1 | 11/2001 | Wessinger, Jr. et al. |
| 6,329,730 B1 | 12/2001 | Neckermann et al. |
| 6,336,123 B2 | 1/2002 | Inoue et al. |
| 6,356,922 B1 | 3/2002 | Schilit et al. |
| 6,366,923 B1 | 4/2002 | Lenk et al. |
| 6,389,434 B1 | 5/2002 | Rivette |
| 6,417,595 B1 | 7/2002 | Wasson |
| 6,434,546 B1 | 8/2002 | Williamowski |
| 6,442,548 B1 | 8/2002 | Balabine et al. |
| 6,472,785 B2 | 10/2002 | Petit et al. |
| 6,480,835 B1 * | 11/2002 | Light ............ 707/707 |
| 6,484,156 B1 | 11/2002 | Gupta et al. |
| 6,489,968 B1 | 12/2002 | Ortega et al. |
| 6,493,702 B1 | 12/2002 | Adar et al. |
| 6,518,686 B2 | 2/2003 | Campbell et al. |
| 6,546,393 B1 | 4/2003 | Khan |
| 6,562,076 B2 | 5/2003 | Edwards et al. |
| 6,574,644 B2 | 6/2003 | Hsu |
| 6,581,065 B1 | 6/2003 | Rodkin et al. |
| 6,582,474 B2 | 6/2003 | LaMarca et al. |
| 6,606,619 B2 | 8/2003 | Ortega et al. |
| 6,606,654 B1 | 8/2003 | Borman et al. |
| 6,628,026 B2 | 9/2003 | Torii |
| 6,631,496 B1 | 10/2003 | Li et al. |
| 6,647,534 B1 | 11/2003 | Graham |
| 6,651,070 B1 | 11/2003 | Hirashima et al. |
| 6,658,623 B1 | 12/2003 | Schilit et al. |
| 6,687,877 B1 | 2/2004 | Sastry et al. |
| 6,697,838 B1 | 2/2004 | Jakobson |

(56) References Cited

U.S. PATENT DOCUMENTS

| | | | |
|---|---|---|---|
| 6,711,586 | B1 | 3/2004 | Wells |
| 6,713,916 | B1 | 3/2004 | Williams et al. |
| 6,725,227 | B1 | 4/2004 | Li |
| 6,751,777 | B2 | 6/2004 | Bates et al. |
| 6,754,873 | B1 | 6/2004 | Law et al. |
| 6,763,496 | B1 | 7/2004 | Hennings et al. |
| 6,772,139 | B1 | 8/2004 | Smith |
| 6,785,693 | B2 | 8/2004 | DeLorme |
| 6,798,109 | B2 | 9/2004 | Ortt et al. |
| 6,858,957 | B2 | 2/2005 | Ortt et al. |
| 6,877,137 | B1 | 4/2005 | Rivette et al. |
| 6,882,995 | B2 | 4/2005 | Nasr et al. |
| 6,901,433 | B2 | 5/2005 | San Andres |
| 6,925,594 | B2 | 8/2005 | Dutta |
| 6,948,135 | B1 | 9/2005 | Ruthfield |
| 6,970,867 | B1 | 11/2005 | Hsu |
| 6,973,616 | B1 | 12/2005 | Cottrille |
| 6,981,040 | B1 | 12/2005 | Konig |
| 6,993,657 | B1 | 1/2006 | Renner |
| 7,010,742 | B1 | 3/2006 | Hsu et al. |
| 7,013,308 | B1 | 3/2006 | Tunstall-Pedoe |
| 7,020,679 | B2 | 3/2006 | Tien |
| 7,024,468 | B1 | 4/2006 | Meyer |
| 7,035,864 | B1 | 4/2006 | Ferrari et al. |
| 7,038,344 | B2 | 5/2006 | Winkler |
| 7,120,615 | B2 | 10/2006 | Sullivan |
| 7,152,224 | B1 | 12/2006 | Kaler |
| 7,162,499 | B2 | 1/2007 | Lees |
| 7,165,069 | B1 | 1/2007 | Kahle et al. |
| 7,185,275 | B2 | 2/2007 | Roberts |
| 7,225,181 | B2 | 5/2007 | Tsuda |
| 7,225,463 | B2 | 5/2007 | Dusenbury |
| 7,266,762 | B1 | 9/2007 | Chakrabarti |
| 7,305,399 | B2 | 12/2007 | Keith |
| 7,373,313 | B1 | 5/2008 | Kahle et al. |
| 7,558,795 | B2 | 7/2009 | Malik |
| 7,574,461 | B1 | 8/2009 | Armorer |
| 7,739,139 | B2 | 6/2010 | Robertson et al. |
| 2001/0032672 | A1 | 10/2001 | Schroeder |
| 2002/0065671 | A1 | 5/2002 | Goerz |
| 2002/0073174 | A1 | 6/2002 | Mengerink |
| 2002/0099552 | A1 | 7/2002 | Rubin |
| 2002/0124082 | A1 | 9/2002 | San Andres |
| 2003/0115546 | A1 | 6/2003 | Dubey |
| 2006/0020586 | A1 | 1/2006 | Prompt |

FOREIGN PATENT DOCUMENTS

| | | |
|---|---|---|
| DE | 8025424 U1 | 9/1980 |
| EP | 0074068 B1 | 3/1983 |
| GB | 1278294 | 6/1972 |
| SU | 964817 A1 | 10/1982 |

OTHER PUBLICATIONS

Greer, Jim E., et al., "Guided Navigation Through Hyperspace", 8th World Conference of the AIED Society, Kobe, Japan, Aug. 18-22, 1997, pp. 1-6 (downloaded from: web.archive.

Carr, Leslie A., et al., "Web Links as User Artefacts", Univ. of Southampton Technical Report, .COPYRGT. 1996, pp. 1-12 (downloaded from: eprints.ecs.soton.ac.uk/862/02/html/).

Harold, Elliotte Rusty, XML: Extensible Markup Language, IDG Books Worldwide, Foster City, CA, .COPYRGT. 1998, pp. 245-258.

Eddy, Sandra E., et al., TeachYourself XML, IDG Books Worldwide, Foster City, CA, .COPYRGT. 1998, pp. 302-327.

"XML Linking Language (Xlink) Version 1.0—W3C Candidate Recommendation Jul. 3, 2000", downloaded from: http://web.archive.org/web/2000081507480/http://www.w3.org/TR/xlink/, p.

Cattaneo, Fabiano, et al, "Managing Software Artifacts on the Web with Labyrinth", ICSE 2000, Limerick, Ireland, ACM 23000 1-58113-206-9/00/06, Jun. 2000, pp. 746-749.

Jelliffe, Rick, "Extended Linking Comes to the WWW: XLinks", Academia Sinica Computing Centre, Aug. 2, 1999, downloaded from: http://xml.ascc.net/en/utf-8/xll.html, pp. 1-5.

Ferraiolo, David F., et al, A Role-Based Access Control Model and Reference Implementation Within a Corporate Intranet, National Institute of Standards and Technology, ACM Transactions on Information and System Security, vol. 2, No. 1, Feb. 1999, pp. 34-64.

Whitehead, Jr., E. James, "WebDAV", Univ. of CA at Irvine, (under DARPA contract No. F30602-97-2-0021), Feb. 1998,pp. 1-2.

DeRose, Steve, et al., "XML Linking Language (XLink) Version 1.0", www.w3.org/TR/xlink/, Jun. 27, 2001, pp. 1-34.

Goldfarb, Charles F., et al., "The XML Handbook", Third Edition, Prentice Hall PTR, Upper Saddle River, New Jersey, (selected portions/pages only) 2001.

Goldfarb, Charles F., et al., "The XML Handbook", Third Edition, Prentice Hall PTR2001I, The handbook in its entirety.

De Roure, David C., et al., "Investigating Link Service Infrastructures", Hypertext 2000, San Antonio, TX, May 30-Jun. 3, 2000,pp. 67-76.

Petrou, Costas, et al., "WWW Bookmark Modeling and Visualization: A Fuzzy Based Approach", DEXA '99, INCS 1677,Springer-Verlag, Berlin, Germany, © 1999, pp. 986-995.

Isakowitz, Tomas, et al., "RMM: A Methodology for Structured Hypermedia Design", Communications of the ACM, vol. 38, No. 8, Aug. 1995, pp. 34-44.

Madria, Sanjay Kumar, et al., "Research Issues in Web Data Mining", DaWaK '99, LNCS 1676, Springer-Verlag, Berlin,Germany. © 1999, pp. 302-312.

Newfield, Dale, et al., "Scratch pad: Mechanisms for Better Navigation in Directed Web Searching", UIST '98, San Francisco, CA, © 1998, pp. 1-8.

Greenberg, Saul, et al., "Getting Back to Back: Alternate Behaviors for a Web Browser's Back Button", Proc. of the 5th Annual Human Factors and the Web Conference, NIST, Mar. 1999, pp. 1-7.

Li, Wen-Syan, et al., "PowerBookmarks: A System for Personalizable Web Information Organization, Sharing and Management", SIGMOD '99. Philadelphia, PA, © 1999, pp. 565-567.

Greenhill, Stewart, et al., "Noetica: A Tool for Semantic Data Modelling", Information Processing & Management, vol. 34, Issue 6, Nov. 1998, pp. 739-760.

Aldrich, Jonathan, et al., "Static Analyses for Eliminating Unnecessary Synchronization from Java Programs", SAS '99, LNCS1694, Springer-Verlag, Berlin, Germany, © 1999, pp. 19-38.

Wan, Jiangling, et al., "GHMI: A General Hypertext Data Model Supporting Integration of Hypertext and Information Systems", HICSS-29, Maui, HI, Jan. 3-6, 1996, pp. 47-56.

Bieber, Michael, et al., "Fourth Generation Hypermedia: Some Missing Links for the World Wide Web", International Journal 0Human-Computer Studies, vol. 47, Issue 1, Jul. 1997, pp. 31-65.

DeRose, Stevens J., "XML Linking", ACM Computing Surveys, vol. 31, Issue 4es, Article No. 21, Dec. 1999, pp. 1-12.

Schwabe, Daniel et al., "From Domain Models to Hypermedia Applications: an Object-Oriented Approach", CiteSeer, 1994 pp. 1-17.

Olson, Michael R., et al., "Object Databases for SGML Document Management", HICSS, Maui, HI, Jan. 3-6, 1997, pp. 39-48.

Lai, Kum-Yew, et al., "Object Lens: A "Spreadsheet" for Cooperative Work", ACM Transactions on Office Information Systems, vol. 6, No. 4, Oct. 1998, pp. 332-353.

Yan et al., Integrating a Structured-Text Retrieval System with an Object-Oriented Database System, 1994, Google, Proceedings of the 20th VLDB Conference Santiago, Chile, 740-749.

Stephen J. Green, Building Hypertext Links by Computing Semantic Similarity, 1999, IEEE, vol. 11, 713-30.

Judge Susan Illston, Order Granting Defendant's Motion for Summary Judgment; USDC, Northern District of California, Case Nos. 12-cv-06294 SI and 12-cv-06293 SI, Jan. 5 2015, 20 pgs.

Chakrabarti, Soumen, et al., "Memex: A browsing Assistant for Collaborative Archiving and Mining of Surf Trails", Proceedings of the 26th VLDB Conference, Cairo, Egypt, 2000, pp. 603-606.

Oinas-Kukkonen, Harri, "Embedding Hypermedia into Information Systems", Proceedings of the 30th Annual Hawaii International Conference on System Sciences (HICSS) IEEE 1997, pp. 187-196.

(56) References Cited

OTHER PUBLICATIONS

"Trademark Electronic Search System (TESS) search results page for LINKSPACE", downloaded from: http://tess2.uspto.gov/bin/showfield?f=doc&state=k6127i2.1, Oct. 21, 2004; single page.
Goldfarb, Charles F., et al., "The XML Handbook", Third Edition, Prentice Hall PTR, 2001, Part 11, Ch 42-44, Ch 53, Ch 57.
Fowler et al., "UML Distilled Second Edition: A Brief Guide to the Standard Object Modeling Language," Addison-Wesley, Printed Nov. 2002, copyright 2000, pp. 44-65 and 79-105.
Bollacker, Kurt D., et al., "A System for Automatic Personalized Tracking of Scientific Literature on the Web", Proc. Of the 4th ACM Conf. on Digital Libraries, Berkeley, CA, 1999 pp. 105-113.
Hendren, Laurie, J., et al., "Abstractions for Recursive Pointer Data Structures: Improving the Analysis and Transformation of Imperative Programs", ACM SIGPLAN Notices, 1992; vol. 2; pp. 249-260.
Defendants' Supplemental Invalidity Contentions, USDC, Northern District of California, Case Nos. 12-cv-06294 SI and 12-cv-06293 SI, Nov. 13, 2013, 80 pgs.

* cited by examiner

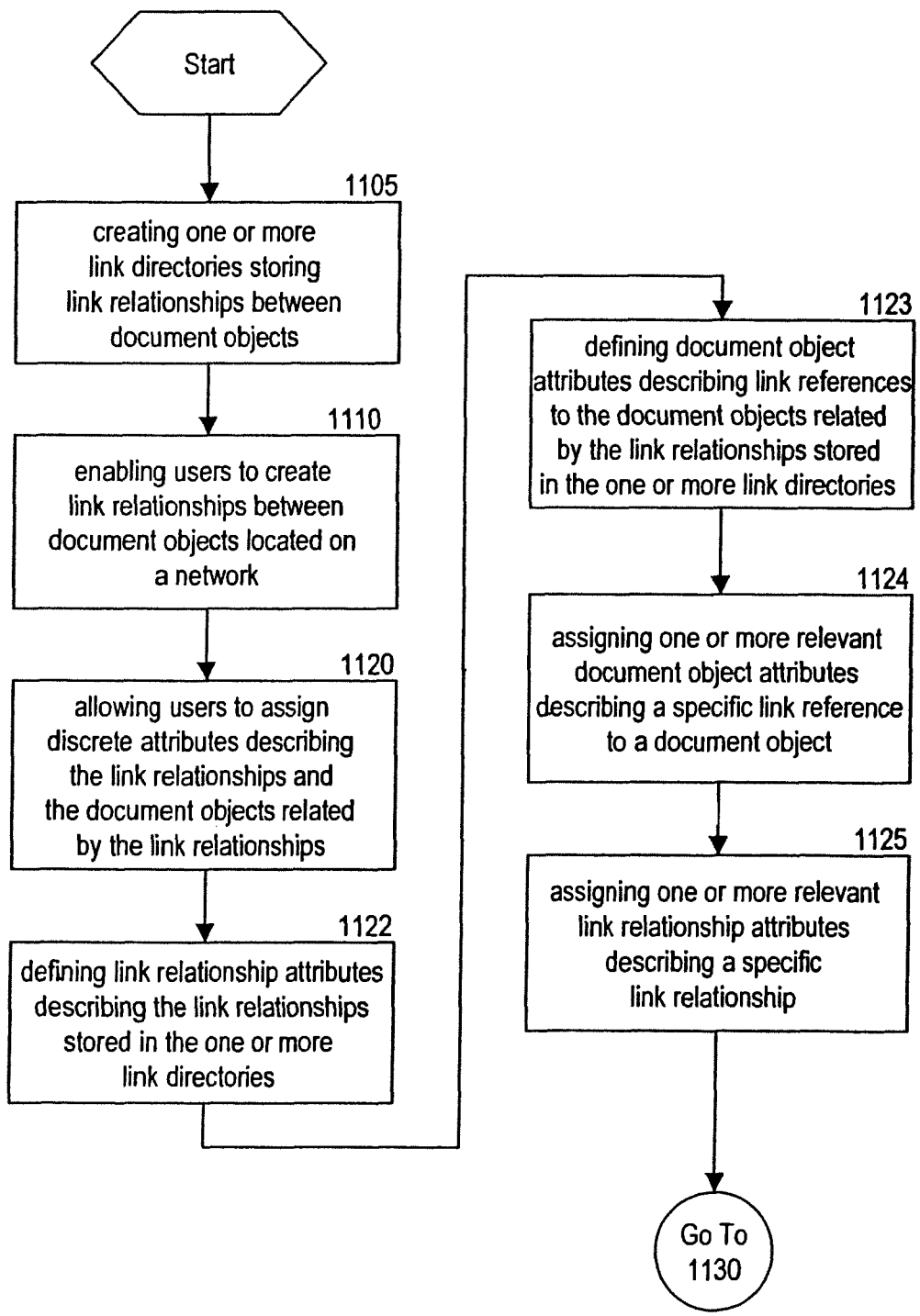

1500

CREATING A LINK RELATIONSHIP BETWEEN DOCUMENT OBJECTS AND STORING IN A LINK DIRECTORY

CROSS REFERENCE TO RELATED APPLICATIONS

This application is a continuation of U.S. application Ser. No. 11/543,862 which is a continuation of U.S. application Ser. No. 10/118,918, filed Apr. 10, 2002, which is a continuation-in-part of U.S. application Ser. No. 10/090,739, filed Mar. 6, 2002, entitled FRAMEWORK FOR MANAGING DOCUMENT OBJECTS STORED ON A NETWORK, which is a continuation-in-part of U.S. application Ser. No. 10/050,515, filed Jan. 18, 2002, entitled A SYSTEM AND METHOD FOR COLLECTING, STORING, MANAGING AND PROVIDING CATEGORIZED INFORMATION RELATED TO A DOCUMENT OBJECT, which claims priority from U.S. Provisional Application No. 60/273,520, filed Mar. 7, 2001, entitled SYSTEM AND METHOD FOR COLLECTING AND PROVIDING USERS WITH CATEGORIZED INFORMATION RELATED TO AN OPEN DOCUMENT and U.S. Provisional Application No. 60/282,470, filed Apr. 10, 2001, entitled SYSTEM AND METHOD FOR COLLECTING, STORING, MANAGING AND PROVIDING TO NETWORK USERS CATEGORIZED INFORMATION RELATED TO AN OPEN DOCUMENT, all of which are hereby incorporated by reference.

This application also claims priority from U.S. application Ser. No. 10/090,740, filed Mar. 6, 2002, entitled A METHOD AND SYSTEM FOR MAKING DOCUMENT OBJECTS AVAILABLE TO USERS OF A NETWORK, from U.S. application Ser. No. 10/050,515, filed Jan. 18, 2002, entitled A SYSTEM AND METHOD FOR COLLECTING, STORING, MANAGING AND PROVIDING CATEGORIZED INFORMATION RELATED TO A DOCUMENT OBJECT, and from U.S. Provisional Application No. 60/273,520, filed Mar. 7, 2001, entitled SYSTEM AND METHOD FOR COLLECTING AND PROVIDING USERS WITH CATEGORIZED INFORMATION RELATED TO AN OPEN DOCUMENT and U.S. Provisional Application No. 60/282,470, filed Apr. 10, 2001, entitled SYSTEM AND METHOD FOR COLLECTING, STORING, MANAGING AND PROVIDING TO NETWORK USERS CATEGORIZED INFORMATION RELATED TO AN OPEN DOCUMENT, which are all hereby incorporated by reference.

The following other continuation-in-part application, also claiming priority from the above-referenced patent applications, is incorporated herein by reference, U.S. application Ser. No. 10/118,093, filed Apr. 9, 2002, entitled, A METHOD FOR USERS OF A NETWORK TO PROVIDE OTHER USERS WITH ACCESS TO LINK RELATIONSHIPS BETWEEN DOCUMENTS, by inventor Thomas Layne Bascom.

TECHNICAL FIELD

The technical field is relating documents on computer networks and storing, indexing and presenting those relationships to network users.

BACKGROUND

Networks connecting many computers offer users access to a wide variety of information. Computers are exceptional devices for storing, sorting and relating large amounts of information. Information is stored on computers and networked computing and storage devices as documents or objects, together referred to as document objects. Such document objects may contain any form of information, from text documents and articles, financial data, statistical information, electronic mail, images and photos, music, animation, and even motion pictures.

The term "computer" or "computing device", although generally thought of to mean a general purpose digital computing device, may include any one of several different information processing and communications devices including mainframe computers, server computers, minicomputers, personal computers, laptop portable computers, handheld computers, personal digital assistants, intelligent wireless phones, and any other device with a microprocessor and an operating system enabling the device to be connected to a network of other information processing and communications devices.

The Internet, as a network of interconnected networks, offers users access to an even broader collection of information—the Worldwide Web (the "Web"). On the Web, publishers offer information for educational, recreational, commercial and other purposes. The Internet, and its predominant Web form, is organized and accessed by assigning document objects an address, or Uniform Resource Locator ("URL"). These URLs define the transfer protocol for and location of each individual document object on the Internet, or other network, including the Internetworking Protocol ("IP") address of the host computer system of the document object.

A URL may also represent an address including instructions for accessing a document object that is generated on request by retrieving and rendering for presentation organized information in response to information supplied by the requestor. When the URL contains enough information to recreate the document object generated in such a manner, that document object can be recreated for others using the URL. A URL may also include information, sometimes called a bookmark, with information allowing the rendering tool to present or highlight a location in the document upon opening the document.

Users accessing computer networks and the Internet are generally required to perform their own searches across the networks for the information, stored as document objects, that they desire or need. As the amount of information available on computer networks, and on the Internet in particular, grows exponentially, existing search and information location techniques become increasingly less effective. Existing Internet search techniques often yield too many seemingly related references that are not, in fact, truly useful to the user. The usefulness of traditional Internet search and indexing systems is actually decreasing as the number of documents on the Internet explodes.

Existing search, categorization, and retrieval techniques for document objects stored on computer networks, while generally executed at the high speeds of modern computer systems, are increasingly imprecise and often much too broad, as well as time and labor intensive, owing to the explosion of information being added to those networks.

A need exists to enhance the network user's information search and browsing experience. A need exists to provide network users with information relevant to the individual document object they are accessing and provide that information in a context of value to them by relating the document object they are accessing to link references to other document objects within a specific context. Such other document objects may or may not be offered by the publisher of the document object currently accessed. A need exists to provide network users with information relevant to the specific information the user may be searching for and relevant to the user's immediate personal, professional, geographic and other interests.

A need exists to access information available on the network by accessing relationships between document objects that are relevant to one another. A need further exists to allow alternate techniques for viewing and navigating relationships between document objects that are relevant to one another. A need further exists to provide users with access to these multiple frameworks for management of and access to document objects.

A need further exists to facilitate educated selection of the kinds of relationships that the user is interested in and the document objects in those relationships by presenting the relationships with managing information while viewing document objects on the network.

A need exists for entities or groups to be able to communicate information to their employees or members as those employees or members access document objects on a network, and to enable those employees or members to view content deemed important to the entities or groups. A need further exists for publishers of content on the Internet to be able to personalize content presented to Internet users without requiring the establishment of a personal relationship between the user and the content publisher. A need exists to enable the collection of the search experiences of a group of users and share that experience with other users of networked information devices.

A need exists for a better user interface. A need exists for better search methods.

These needs reflect a broader need to reduce the time and effort involved, and to provide increased user satisfaction, in user searches for relevant document objects on a network.

Furthermore, a need exists to present a user accessing document objects on the network with a view of a document object the user is accessing, and document objects related to that document object, within a framework for management and presentation developed by the user and by other users of the network.

Wireless communication and information processing devices present unique challenges to the user in finding document objects offered on the network to which the device is wirelessly connected. Some of the challenges include one or more of the following.

On some wireless networks, the speed of the data transfer is limited by the communications network, the devices, the proximity of the device to a network interface and the activity load on that network. The upload of a request for information and the download of a response can be perceived as being very long. A need exists to assist the user with navigation and selection of document objects to minimize the number of times they "click through" document objects that are presented to the user without enough context to ascertain the document objects' value before the user selects the document object for download.

Distribution of document objects to users of wireless devices, aside from being technically challenging because of the format and the competing and evolving protocol challenges of the wireless networks and devices, can be limited based on the portal and application service relationships of the communication services provider or the service provider's network. Those organizations that are developing applications and infrastructure that provide services endeavor to structure and protect their channel to these users and to develop payment-for-placement distribution. A need exists to provide improved method for distribution of content to users of handheld devices.

In addition, the display screens on handheld devices currently remain very small in order to reduce weight and size of the devices. The screens are much smaller than stationary information processing devices, thus permitting very limited viewing areas. Therefore, a limited amount of information can be presented to a user of such a device at any one time without scrolling through multiple screens of data. The context of the information displayed can be lost without the whole picture offered in the large screen typical of a stationary information processing device. Users of such devices prefer presentation of shorter lists and shorter document objects. A need exists to provide access to a greater breadth of alternative selections while viewing content condensed for smaller presentation of handheld devices.

Wireless device users may use their devices to perform indirect search functions. These indirect search functions include search experiences where the user is looking for information based on their current instance. For example, a user may be viewing in their wireless device a document object containing news about a disaster in a region of the world. The user's interest in the news may be related to an investment in a company in that part of the world. The user's indirect search of the impact of the disaster on their investment requires the initial context of the disaster. A successful indirect search allows the user to find the impact on their investment related to the context of the disaster. A need exists to allow users to navigate and access document objects using complex relationships between document objects based on the context of their current search instance. A need further exists to narrow a search for document objects without excluding related document objects based on methods of narrowing a search.

Data entry may be limited depending on the type of device. Handheld information processing and communications devices may use handwriting recognition, miniaturized or portable QWERTY keyboards, or numeric keypads with extra function buttons. Entry of text using these devices can be difficult. A need exists to improve navigation of distributed information by facilitating selection and reducing entry of search query attributes.

SUMMARY

The systems, apparatus and methods of the present invention (hereinafter "Linkspace") incorporate and provide many improvements on existing methods for distributing, relating and searching document objects on computer networks, including the Internet.

Linkspace operates to provide many beneficial improvements in searching, and identifying information over computer networks.

Linkspace permits a user of a network or the Internet to establish relationships between document objects located on the network or the Internet. Those relationships may comprise link relationships and link references and are maintained by Linkspace in one or more link directories. The contents of link directories may be organized, categorized, sorted and filtered in groupings based on various criteria relating to, among other things, user interests and attributes, the types of document objects and the nature of the content of those document objects. Linkspace allows a network user to be presented with a selection of links to document objects related to the document object the user is currently accessing based upon the URL of the current document object, and link relationships created by the user and other users of the network stored in the link directories.

When a network user equipped with Linkspace identifies and locates a first document object on the network that is of interest to her, she may initiate one method of the present invention to mark the location, through its URL, as a start point of a link relationship. When she accesses a second document object on the network that she considers relevant to the first document object, she initiates another step of one method of the invention to mark the second document object as an end point of the link relationship. Upon marking the second document object as the end point, the link relationship is created and stored on a link directory selected to store similar link relationships. When a second network user equipped with Linkspace, and with access to the link directory, accesses the first document object, he is then presented with a link to the second document object as a relevant document object that may be of interest to him. Likewise, if the second network user accesses the second document object, he may then be presented with a link to the first document object as a relevant document object that may be of interest to him.

Linkspace consists of a system and method for creating and publishing link relationships, a system and method for storing and managing link relationships in link directories, and a system and method for presenting a network user with links related by link relationships to the document object the user is currently accessing.

In one respect what is described is a method for searching document object relationships. The method may include the step of selecting one or more initial search items from a group consisting of: (a) document objects, (b) link references to document objects, (c) link reference attributes, and (d) link relationship attributes. The method may also include steps for identifying one or more link relationships using the selected initial search items, and for presenting one or more link relationships attributes describing the identified link relationships.

In another respect what is described is a user interface for presenting and searching relationships between document objects located on a network. The user interface may include a first portion of a screen display for displaying one or more link relationship attributes and a second portion of the screen display for displaying one or more entries from a group consisting of: (a) link references that represent the document objects, (b) link relationship attributes describing the link relationships, (c) link reference attributes describing the link references, and (d) document objects. The displayed entries in the second portion of the user interface are related to the displayed one or more link relationship attributes in the first portion.

In yet another respect, what is described is a computer readable medium on which is embedded a program. The embedded program comprises modules that execute the above method.

The methods and computer readable medium may be used in conjunction with handheld and wireless devices.

Those skilled in the art will appreciate these and other advantages and benefits of various embodiments of the invention upon reading the following detailed description of a preferred embodiment with reference to the below-listed drawings.

DESCRIPTION OF THE DRAWINGS

The detailed description will refer to the following drawings, wherein like numerals refer to like elements, and wherein:

FIG. 3b is a diagram showing more detail of one embodiment of a user data store from FIG. 3a;

FIGS. 11a and 11b are flowcharts illustrating a method for providing a framework for document objects located on a network according to one embodiment of the invention.

DETAILED DESCRIPTION

Figure 1:
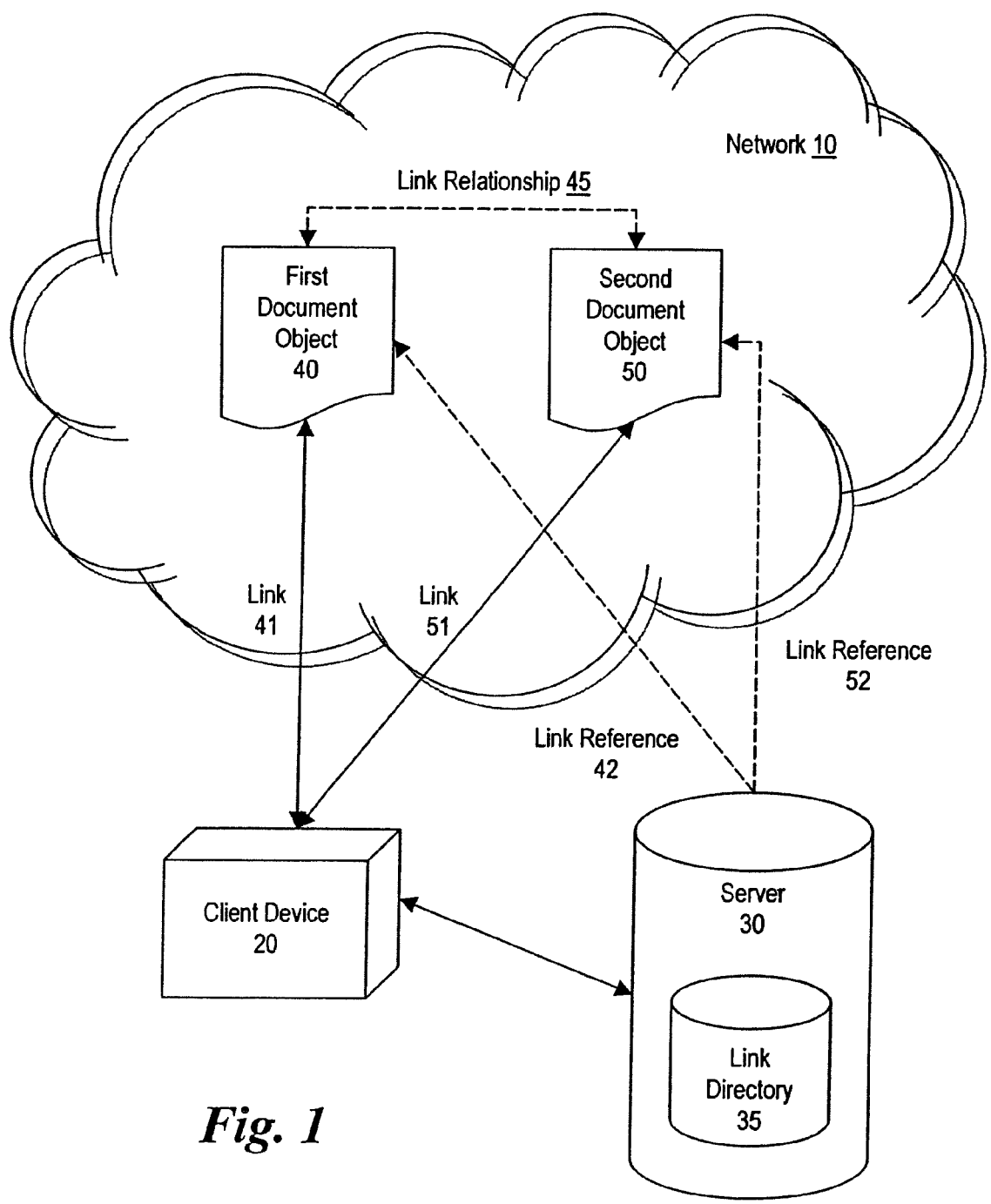
FIG. 1 is a diagram showing a system according to one embodiment of the invention.

FIG. 1 shows one embodiment of a system 100 for collecting, storing, managing and providing to network users categorized information related to an open document object. A document object may contain any form of information, including text documents and articles, financial data, statistical information, electronic mail, images and photos, music, voice data, animation, and even motion pictures, or may refer to a portion thereof. A document object may be dynamically created or formed. The system 100 includes a network 10, such as the Internet or other network of interconnected computers or a combination of networks and the Internet; one or more Linkspace-enabled client devices 20; one or more Linkspace-enabled servers 30, one or more first document objects 40; one or more second document objects 50; one or more link references 42 and 52, corresponding to the first document objects 40 and the second document objects 50 respectively; and one or more link relationships 45. The system 100 may also include one or more links 41 and 51 pointing to the first document objects 40 and second document objects 50 respectively. The client devices 20, as well as the server 30, are preferably Linkspace-enabled. The client device 20 may comprise a computer or other digital information device running software enabled by the present invention to create, filter, sort and display the link references 42, 52, and the link relationships 45. The server 30 may comprise a server computer or other digital information device running software enabling the present invention to store, index, search, filter, sort and transmit the link references 42, 52, and the link relationships 45 to client devices 20. The server 30 further comprises one or more link directories 35 for storing and indexing information regarding the link relationships 45 and link references 42 and 52 developed by the client devices 20 with respect to the one or more first documents 40 and second documents 50.

The link reference 42, 52 comprises a pointer to one document object 40, 50 on the network 10 and attributes associated with that document object 40, 50. The link relationship 45 comprises two pointers, one each to the first document object 40 and to the second document object 50, and attributes describing characteristics of the relationship between the two document objects 40, 50 related by the link relationship 45. The pointers included in a link relationship 45 may be comprised of pointers to a link reference 42, 52. The link relationship 45 establishes a meaningful relationship between two document objects 40, 50, whereas the locations of the document objects 40, 50 may be maintained within the Linkspace system 100 by means of the link references 42, 52.

The system 100 shown in FIG. 1 operates to create and store link relationships 45. The system 100 creates and stores link relationships 45 between a first document object 40 and a second document object 50, preferably on one or more servers 30 in one or more link directories 35 in the manner described as follows. The client device 20 is enabled by means of software or other devices to request, access and display document objects on the network 10. When the user of a client device 20 identifies one first document object 40 of interest to her that she wishes to associate with a second document object 50, she utilizes the software running on the Linkspace-enabled client device 20 to create a link relationship 45 between the first document object 40 and the second document object 50. This link relationship 45 is then stored on the server 30 in a link directory 35.

In an alternate embodiment, the system 100 may operate to perform the functions described above, including the creation of link relationships 45 and link references 42, 52, the storing of link relationships 45 and link references 42, 52, and providing access to and retrieval of link relationships 45 and link references 42, 52, by means of automated procedures requiring little or no user interaction.

When a client device 20 later requests and accesses a first document object 40 for which the server 30 has stored an associated link relationship 45 in one or more link directories 35, the server 30 delivers to the client device 20 the link references 42 and the link relationships 45, along with contextual information, or attributes, associated with the link references 42 and the link relationships 45. The client device 20 then displays to the user of the client device 20 the existence of a link relationship 45 between the first document object 40 being accessed by the client device 20 and the second document object 50. This enables the user of the client device 20 to be made aware of the second document object 50, the context of the second document object 50, and the context of the relationship between the second document object 50 and the first document object 40 as that relationship may be of interest to the user of the client device 20 while viewing the first document object 40.

Each link relationship 45 may also operate in the reverse direction. In this manner, when a user of the client device 20 is accessing the second document object 50 for which an associated link relationship 45 is stored in the one or more link directories 35 on the server 30, the server 30 then transmits the link references 42 and the link relationships 45, with contextual information, to the client device 20. This enables display of the availability of the related first document object 40 to the user of the client device 20 with the context of the first document object 40, and within the context of its relationship to the displayed second document object 50.

While the system 100 is generally described as having enabling software resident on the client device 20 and on the server 30, various other software configurations are possible, including having all of the software resident at either the server 30 (making the client device 20 essentially a "dumb terminal") or at the client device 20 (making the client device 20 essentially perform server functions), or various software sharing arrangements. For example, the client device 20 may include the one or more link directories 35, a communications module (described later in reference to FIG. 3a), and a user data store that may maintain information regarding authorized users of the client device 20 (described later in reference to FIGS. 2, 3a, and 3b).

Figure 2:
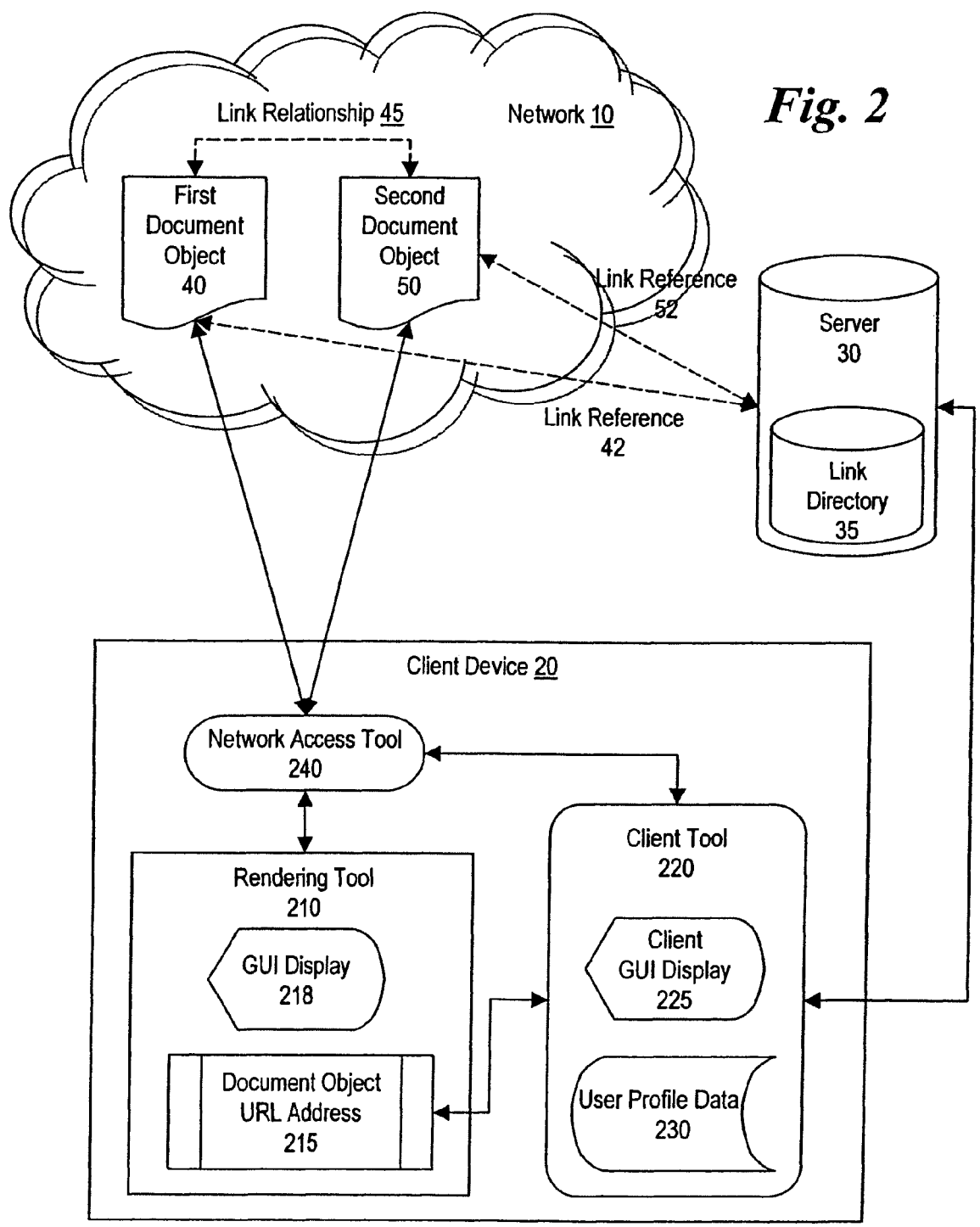
FIG. 2 is a diagram showing a client device which is Linkspace-enabled and its interaction with other hardware and software.

FIG. 2 is a diagram showing an example of the components of a Linkspace-enabled client device 20 and its interaction with other software and hardware. The client device 20 preferably includes a rendering tool 210, such as a web page browser like Microsoft® Internet Explorer, for rendering document objects located on the network 10 and displaying those document objects to users of the client device 20; a client tool 220, for allowing the user of the client device 20 to create and access link relationships 45 between document objects; and a network access tool 240, such as a TCP/IP stack or other interface, for allowing software modules on the client device 20 to connect to and communicate with other devices and document objects on the network 10. The client device 20 operates primarily to create and present link relationships 45 to users.

The rendering tool 210 may store a document object URL address 215 for referring to the document object currently being accessed and rendered by the rendering tool 210. The rendering tool 210 may also include a Graphic User Interface ("GUI") display 218, or other type of display, for displaying the document objects accessed and rendered by the rendering tool 210. In alternate embodiments of the invention, the client device 20 may include more than one rendering tool 210 enabling the user of the client device 20 to access multiple document objects.

The client tool 220 may include a client GUI display 225, or other display software and hardware, for displaying link references 42, 52 and link relationships 45 to the user of the client device 20. Typically, the displayed link references 42, 52 and link relationships 45 would be those link references 42, 52 and link relationships 45 relevant to the document object currently being rendered and displayed by the rendering tool 210 (as determined by the document object URL address 215 in the rendering tool 210). The client tool 220 may also include Linkspace user profile data 230 for storing information about the user of the client device 20, the link directories 35 the user may have access to, and the attributes of link references 42, 52, and attributes of link relationships 45 that the user may be interested in. The Linkspace user profile data 230 may also or alternatively be stored on the one or more servers 30, along with the Linkspace user profile data 230 of all other users of the system 100.

An example of how the client device 20 operates to create and present link relationships 45 to users of the client device 20 follows. While the network access tool 240 is active and placing the client device 20 in communication with the network 10, the user enables the rendering tool 210 and the client tool 220. The user may then request and access document objects stored on the network 10 by means of the rendering tool 210. Through the GUI display 218, the users enters or otherwise selects a document object URL address 215 associated with the first document object 40 of interest to the user. The client tool 220 connects to and uses the rendering tool 210 and accesses the document object URL address 215 associated with the first document object 40. The client tool 220 then establishes contact with the server 30 and passes to the server 30 the stored document object URL address 215 associated with the first document object 40, along with any relevant information that may come from the Linkspace user profile data 230. The connection to the server 30 may be initiated through the network access tool 240 or by other means not utilizing the network access tool 240.

The Linkspace-enabled server 30 searches the link directories 35 for any URLs in the link references 42, 52 matching, or similar to, the document object URL address 215. After searching, the server 30 retrieves the one or more link relationships 45 that include the document object URL address 215. Prior to searching, the URLs may be stripped of any information not relevant to the location of the document object 40, 50 on the network 10. Such information not relevant to the location of the document object 40, 50 may include query strings or other data attached to URLs for tracking or other purposes.

The server 30 then determines the link references 42, 52 which may be of interest to the user of the client device 20 by filtering the retrieved link references 42, 52 using the Linkspace user profile data 230 and the attributes assigned to the link references 42, 52 and to the link relationships 45. The filtering of link references 42, 52 and link relationships 45 may be accomplished by one of several methods of filtering data including matching, character and Boolean comparing, and other data comparison and filtering methods. The server 30 then transmits to the client tool 220 the filtered link references 42, 52 included in the one or more link relationships 45. The client tool 220 presents the transmitted link references 42, 52 within the context established by the link relationships 45 by means of the client GUI display 225.

To create a new link relationship 45, the user of the client device 20 must select a first document object 40 to begin the link relationship, a second document object 50 to complete the link relationship 45, and assign attributes to the link references 42, 52 and the link relationship 45 between the two document objects 40, 50. To select a first document object 40 to begin the new link relationship 45, the user interacts with the client GUI display 225 to activate a function of the client tool 220 to capture the document object URL address 215 associated with the first document object 40. To select a second document object 50 to complete the new link relationship 45, the user may interact with the GUI display 218 of the rendering tool 210 to request, access and display the second document object 50. The user may then interact with the client GUI display 225 again to activate a further function of the client tool 220 to capture the document object URL address 215 associated with the second document object 50, completing the selection of document objects 40, 50 participating in the new link relationship 45. Once the two document objects 40, 50 are established, attributes of the link references 42, 52 and the new link relationship 45 may be assigned.

The user may select or otherwise specify attributes associated with the link references 42, 52 and link relationship 45. These attributes aid in categorizing, sorting or filtering the link references 42, 52 and the link relationship 45 in the link directories 35 for delivery to other client devices 20. The attributes may be, for example, descriptive, temporal, spatial, or quantitative in nature, i.e., describe the link reference in terms of who or what, when, where, or how much. One such attribute (not shown) may be a plain language name for the link reference 42, 52, determined and entered by the user to describe the link reference in terms more useful to users of the system 100 than the document object URL address 215. Other examples of attributes may include description of the content of either of the document objects 40, 50 related by the link relationship 45, wherein that content may be described to include a product review, news article, product information page, competitor's product information, or product order forms, among other types of content.

Normally, upon completion of the endpoint capturing and attribute assignment functions, the client tool 220 connects to the server 30 to store the link references and the new link relationship 45 in the appropriate link directory 35. Generally, the new link relationship 45 is then made available to other users. Typically, other client devices 20 who have access to the server 30 and are assigned access privileges on the link directory 35 in which the new link relationship 45 has been stored are given access to the new link relationship 45.

Furthermore, if the user of the client device 20 determines that there is a relationship that is not already described by the transmitted link relationships 45 between the currently accessed document object 40 and a second document object 50, the user may proceed to create and publish a new link relationship 45 between the first document object 40 (currently accessed and displayed by the rendering tool 210) and the second document object 50. This may be accomplished without displaying the second document object 50.

Figure 3A:
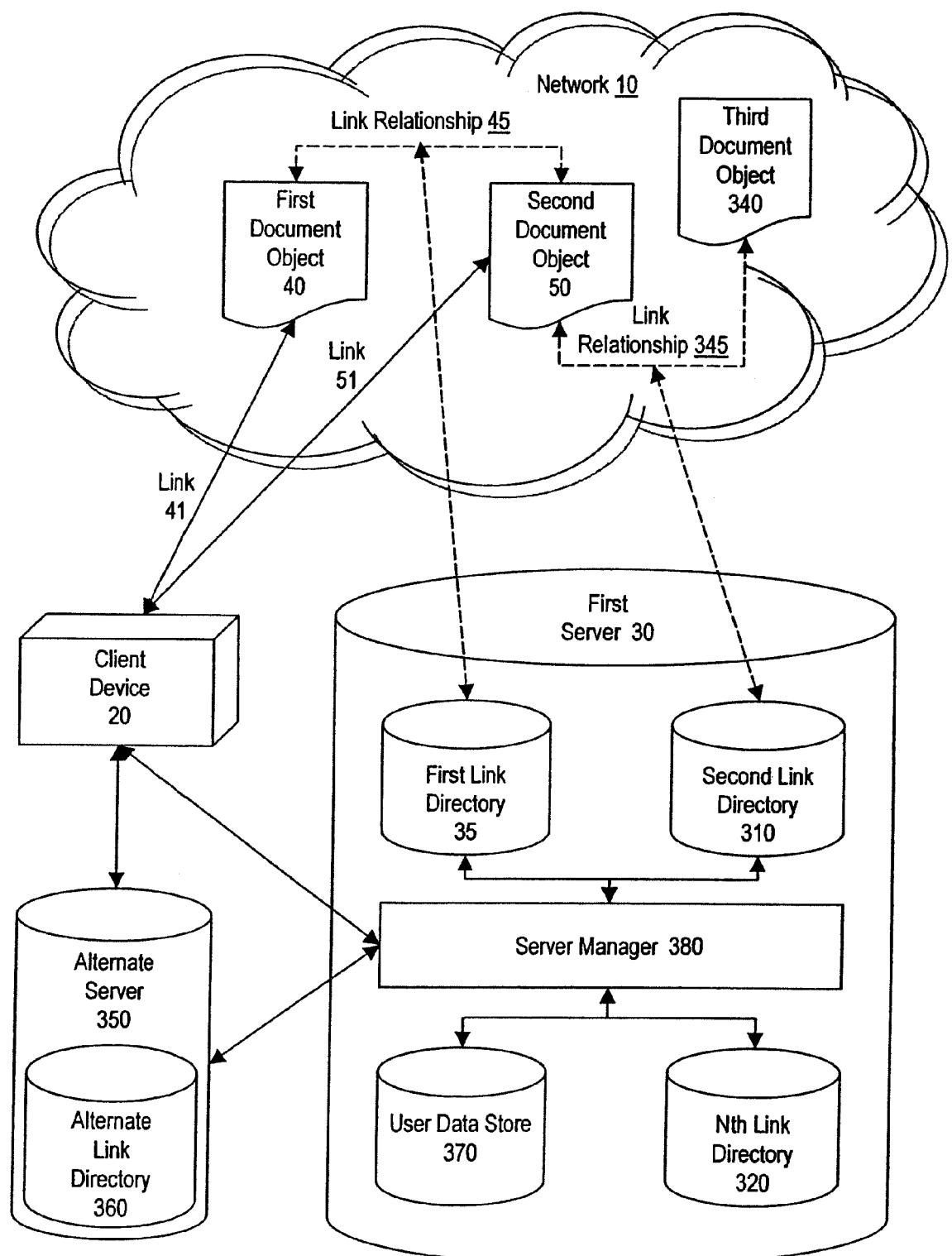
FIG. 3a is a diagram showing the components of a server which is Linkspace-enabled and its interaction with other hardware and software.

FIG. 3a is a diagram showing the components of the Linkspace-enabled server 30 and its interaction with other hardware and software. The server 30 includes a first link directory 35, a user data store 370, and a server manager 380. The server 30 may also include a second link directory 310 and one or more Nth link directories 320. The server manager 380 coordinates communications between the other components of the server 30. The server manager 380 also coordinates communications with outside objects, including the one or more client devices 20. The server manager 380 also performs the function of locating appropriate link directories 35, 310, 320 for the user to participate in based upon a document object presently displayed on the client device 20. The user of the client device 20 may request that the server manager 380 look in all link directories 35, 310, 320 across the system 100, regardless of whether the user has an affiliation with the specific link directory 35, 310, 320 (which may be set in the user's Linkspace user profile data 230), for the URL of the document object the user is currently accessing with the client device 20. The user data store 370 stores identification and user profile data regarding users authorized to access the server 30, which of the several link directories 35, 310, and 320 those users are permitted access to, and which attribute preferences the users have for each of the link directories 35, 310, 320. In alternate embodiments of the invention, portions of the information maintained in the user data store 370 may be stored in the link directories 35, 310, 320.

FIG. 3a also shows one or more alternate Linkspace-enabled servers 350 that may reside on the network 10. In alternate embodiments of the system of the invention, the one or more alternate servers 350 may be located off the network 10 but otherwise connected to or in communication with the client devices 20 and/or the first server 30. One or more alternate link directories 360 may reside on the one or more alternate servers 350. The one or more alternate servers 350 may include other elements duplicating the functions of the server manager 380 and user data store 370, as well as additional link directories 310 and 320. The existence of the alternate servers 350 provides for flexibility in the distribution of link directory data across several servers, redundancy and interoperability across multiple networks and/or sets of client devices 20 and users of the Linkspace system 100.

Each of the several link directories 35, 310, 320 or 360 may be associated with and store link references 42, 52 and link relationships 45. These link references 42, 52 and link relationships 45 may have attributes matching categories defined by an authorized user designated to manage such link directories 35, 310, 320 or 360. In this manner, each link directory 35, 310, 320 or 360 may be considered to be a community of interest. The authorized user designated to manage such link directories 35, 310, 320 or 360 may also establish attributes by which to organize, sort and filter the link references and link relationships 45. Attributes may describe the types and properties of the document objects 40, 50 and the link relationships 45. Any authorized user of the link directories 35, 310, 320 or 360 may then create and place link references and link relationships 45 in the link directories 35, 310, 320 or 360 and assign attributes to the link references and link relationships 45.

FIG. 3a further illustrates the provision for a further link relationship 345 between the second document object 50 and a third document object 340. The link relationship 345 may be created by an authorized user of one of the client devices 20, just as the link relationship 45 between the first document object 40 and the second document object 50 was created. The link relationship 345 may be stored in a second link directory 310, separated from the link relationship 45 stored in the first link directory 35. As such, the link relationships 45 and 345 may be considered to belong to differing communities of interest represented by the separate first link directory 35 and second link directory 310. A user of a client device 20 who is currently viewing or otherwise accessing the second document object 50 will only be presented with the link relationship 345 if the user is an authorized user of, and thus in the user directory 370 list for, the second link directory 310. Furthermore, a user of a client device 20 who is currently viewing or otherwise accessing the second document object 50 will only be presented with both the link relationship 45 and the link relationship 345 if the user is an authorized user of, and thus in the user data store 370 lists for, both the first link directory 35 and the second link directory 310. A user of the Linkspace system may be or may apply to be an authorized user for any combination of or all of the link directories 35, 310, 320, and 360.

Figure 3B:
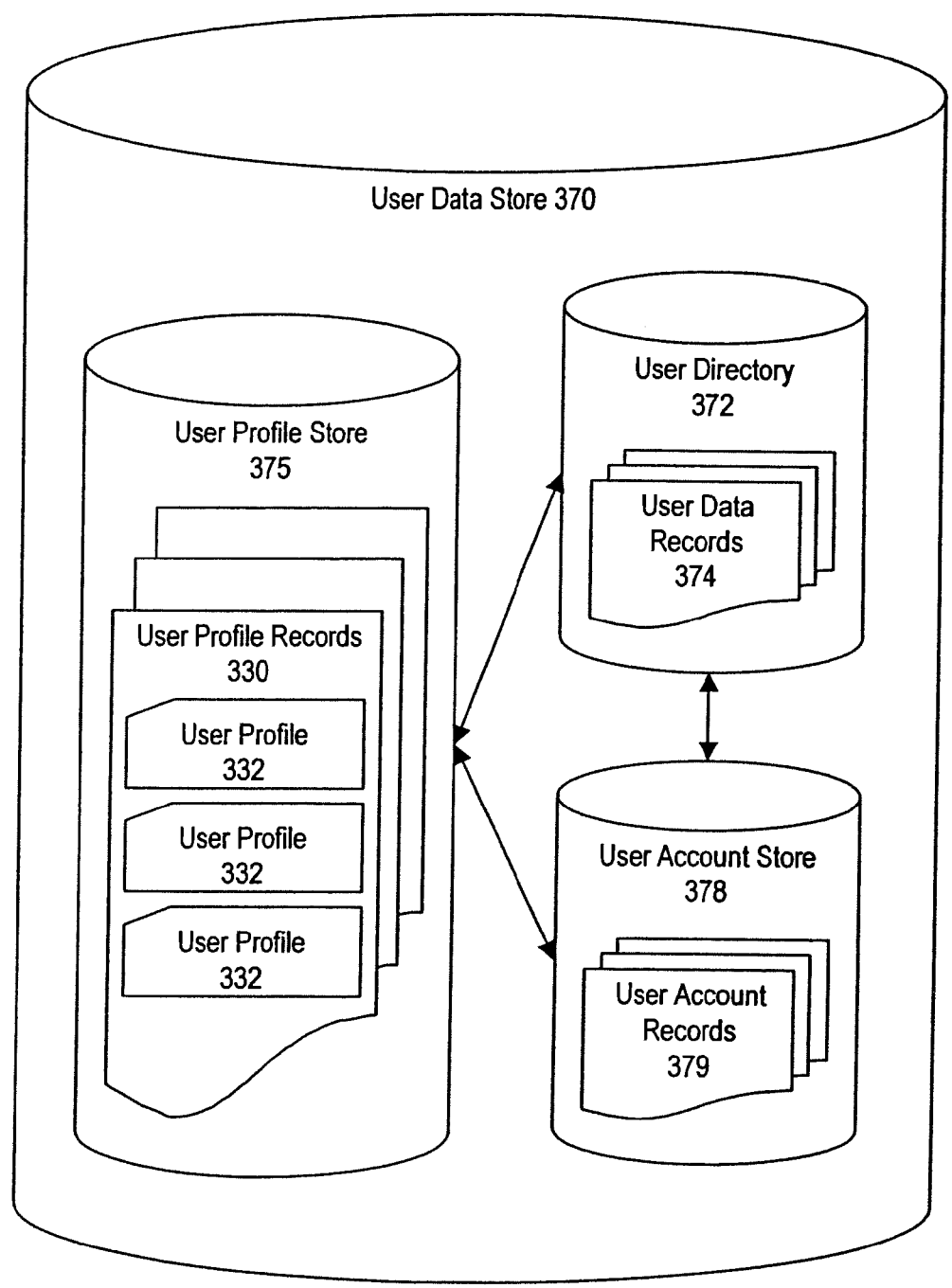

FIG. 3b is a diagram showing more detail of one embodiment of the user data store 370 from FIG. 3a. The user data store 370 may include a user directory 372, a user profile store 375, and a user account store 378.

The user directory 372 includes one or more user data records 374, typically one or more each for every authorized user of the servers 30, 350. The user data records 374 may include personal identifying data for an associated authorized user and data indicating the link directories 35, 310, 320, 360 to which each user has access.

The user profile store 375 includes one or more user profile records 330, typically one or more each for every authorized user of the servers 30, 350. The user profile records 330 for each authorized user may further include one or more user profiles 332.

Each user profile 332 may contain data regarding specific, differing configurations of the user's personal, professional, geographic and other interests, and the servers 30, link directories 35, 310, 320, 360, and attributes associated with those interests, as entered by the user or collected by the client tool 220. The data in the user profile 332 may be used to determine what link directories 35, 310, 320, 360 that the user may have engaged. The data in the user profile 332 may further determine what attributes of link references 42, 52, and of link relationships 45, will be considered by the server 30 in returning the link references 42, 52 and the link relationships 45 from the link directories 35, 310, 320, 360 to the user's client device 20.

The user account store 378 includes one or more user account records 379, usually one each for every authorized user of the servers 30, 350. The user account records 379 hold information regarding usage of the Linkspace system 100 by each authorized user. The information in the user account records 379 may include data on instances of the publication of link relationships 45, and the transmissions of link relationships 45 and link references 42, 52 based upon the document object displayed by the client tool 220 of each user. In alternate embodiments of the invention, data regarding the document objects 40, 50, 340 requested and accessed by users of the system 100 is not recorded in the user account records 379 against the individual authorized user in order to maintain user privacy with regard to what document objects 40, 50, 340 each individual user may request or access.

When an authorized user of a client device 20 creates a link relationship 45 that is stored in one or more of the link directories 35, 310, 320, 360, the server manager 380 records in the user account record 379 (associated with the authorized user creating the link relationship 45) the activity of creating and storing a link relationship 45. Each of the authorized users of the link directories 35, 310, 320, 360 may be allowed to create link relationships 45 to be stored in one or more of the link directories 35, 310, 320 or 360, to which that authorized user is permitted publication access. Each of the authorized users of each specific link directory 35, 310, 320, 360 may also be allowed access for display those link relationships 45 stored in the specific link directory 35, 310, 320,360 that relate to the first document object 40 or second document object 50 that the user is currently viewing on the user's client device 20.

The interaction of each of the elements of the server 30, alternate server 350, the client devices 20, and the first, second and third document objects 40, 50, and 340, along with the creation and presentation of the link relationships 45 and 345 may be illustrated by the application of the methods 600, 700, and 800 described below with reference to FIGS. 6, 7, and 8.

Figure 4A:
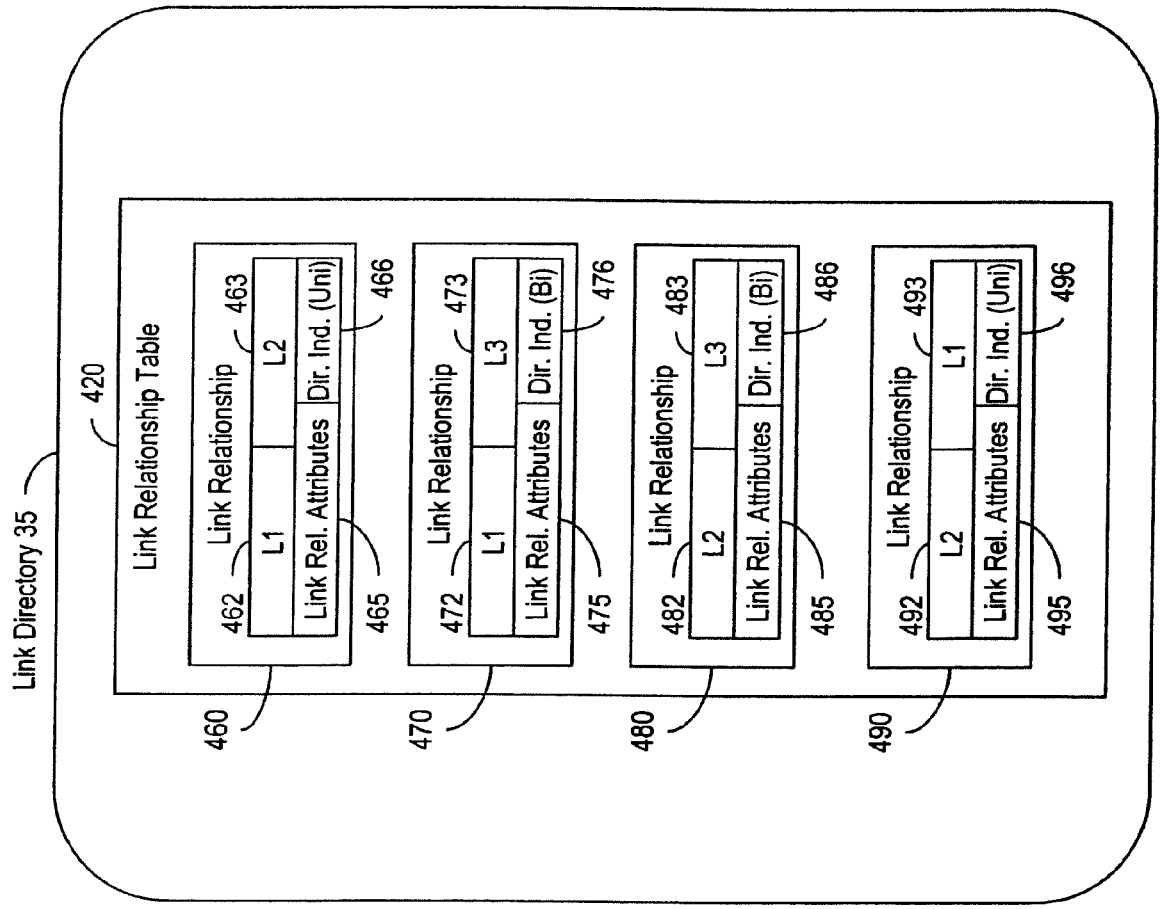
FIG. 4a is a diagram illustrating one embodiment of a link directory according to one embodiment of the invention.

FIG. 4a shows the general structure of one embodiment of the link directory 35. This embodiment of the link directory 35 includes a link relationship table 420.

The link relationship table 420 comprises a list of link relationships 460, 470, 480, 490. These link relationships 460, 470, 480, 490 correspond to the link relationships 45, 345 created by users of the client device 20 as they are stored in the link directory 35. The link relationship 460 comprises a field 462 containing a link reference 42 (L1) including the URL address of the first document object 40 related by the link relationship 460; a field 463 containing a link reference 52 (L2) including the URL address of the second document object 50 related by the link relationship 460; a set of link relationship attributes 465; and a directional indicator 466 showing the nature of the link relationship between the two document objects, either unidirectional or bi-directional. The link relationship 460 is shown with the directional indicator 466 specifying that the link relationship 460 is a unidirectional link relationship.

Some or all of the lists of link relationships 460, 470, 480, 490 comprising the link relationship table 420 may, in one embodiment of the invention, be stored on the server 30 in the form of relational database records. The relational database record corresponding to the link relationship 460 may be comprised of one or more relational database fields corresponding to the field (L1) 462, field (L2) 463, link relationship attributes 465, and directional indicator 466. Each of the one or more relational database fields may be formatted and designated to store various forms of relational database data types. In one embodiment of the invention, the relational database field corresponding to the field 462, as well as the relational database field corresponding to the field 463, may contain data specifying the appropriate URL as text or other format appropriate for the network upon which the invention may be implemented. In one embodiment of the invention, the relational database field corresponding to the directional indicator 466 may be formatted as a simple flag (i.e., Boolean) data type such as True/False, Yes/No, or On/Off. Alternatively, the relational database field corresponding to the directional indicator 466 may be formatted as a type to allow entry of a value indicating whether the link relationship attribute 465 applies forward, backward or in both directions across the link relationship 460. In one embodiment of the invention, the link relationship attributes 465 may be represented by one or more relational database fields. In this embodiment, the relational database fields comprising the link relationship attributes 465 may include a field of text data listing the assigned titles of the one or more specific link relationship attributes assigned to the link relationship 460. The relational database fields comprising the link relationship attributes 465 may then also include one or more attribute value fields containing data formatted appropriately for the corresponding link relationship attribute listed in the above described field of text data. For example, the plain language name link relationship attribute may have its corresponding value stored in a field formatted as text, whereas a zip code attribute may have its corresponding value stored in a field formatted as a 5 or 9 digit integer, and a date attribute may have its corresponding value stored in a field formatted in a date format. In an alternative embodiment, the relational database fields comprising the link relationship attributes 465 may utilize relational database key fields which point to additional database tables containing the records specifying each available type of link relationship attribute for the link relationship 460 and key fields which point to additional tables containing the values associated with each of link relationship attribute identified by a key.

As with the link relationship 460, the link relationship 470 comprises a field 472 containing a link reference 42 (L1) including the URL address of the first document object 40 related by the link relationship 470; a field 473 containing a third link reference (L3) including the URL address of the third document object 340 related by the link relationship 470; a set of link relationship attributes 475; and a directional indicator 476 showing the nature of the link relationship between the two document objects, either unidirectional or bi-directional. The link relationship 470 is shown with the directional indicator 476 specifying that the link relationship 470 is a bi-directional link relationship. The link relationship 480 comprises a field 482 containing a link reference 52 (L2) including the URL address of the second document object 50 related by the link relationship 480; a field 483 containing the third link reference (L3) including the URL address of the third document object 340 related by the link relationship 480; a set of link relationship attributes 485; and a directional indicator 486 showing the nature of the link relationship between the two document objects, either unidirectional or bi-directional. The link relationship 480 is shown with the directional indicator 486 specifying that the link relationship 480 is a bi-directional link relationship.

The link relationship 490 comprises a field 492 containing a link reference 52 (L2) including the URL address of the second document object 50 related by the link relationship 490; a field 493 containing a link reference 42 (L1) including the URL address of the first document object 40 related by the link relationship 490; a set of link relationship attributes 495; and a directional indicator 496 showing the nature of the link relationship between the two document objects, either unidirectional or bi-directional. The link relationship 490 is shown with the directional indicator 496 specifying that the link relationship 490 is a unidirectional link relationship.

The link relationship attributes 465, 475, 485, 495 may include a plain language name (not shown) associated with each of the link references 42, 52 participating in the respective link relationship 460, 470, 480, 490, as determined and entered by the user of the client tool 220. The plain language name serves to describe the link reference 42, 52 in terms better understood by the users of the system 100 than the URL associated with the link reference 42, 52. The link relationship attributes 465, 475, 485,495 serve to describe the link references 42, 52 in terms useful to users of the system 100, and to place the link references 42, 52 in a context that may attract users to select the link references 42, 52. Other examples of link relationship attributes 465, 475, 485, 495 may include descriptions of the content of either of the document objects 40, 50 related by the link relationship 460, 470, 480, 490, wherein that content may be described to include a product review, news article, product information page, competitor's product information, or product order forms, among other types of content.

The link relationship 470 may have a value assigned to the directional indicator 476 specifying that the link relationship 470 is a bi-directional link relationship. This indicates that the link relationship attributes 475 apply to either of the two document objects (40 and 340) equally in the context of the link relationship 470.

The link relationship 460 may, on the other hand, have a value assigned to the direction indicator 466 specifying that the link relationship 460 is a unidirectional link relationship. This signifies that the link relationship attributes 465 apply in only one direction between the two document objects 40 and 50 represented in the fields 462 and 463 through the link references 42 and 52 respectively. In this instance, a link relationship will not be transmitted and presented to the user of the client device 20 when requested in the direction opposite to that specified by the direction indicator 466. In the case of the link relationship 460 shown in FIG. 4a, the attributes 465 apply only as the link relationship 460 is traversed from the first link reference 42 to the second link reference 52, and not in the reverse direction. In a similar manner, the link relationship 490 may have a value assigned to the direction indicator 496 specifying that the link relationship 490 is a unidirectional link relationship. This signifies that the link relationship attributes 495 apply in only one direction between the two document objects 50 and 40 represented in the fields 492 and 493 through the link references 52 and 42 respectively. In the case of the link relationship 490 shown in FIG. 4a, the attributes 495 apply only as the link relationship 490 is traversed from the second link reference 52 to the first link reference 42, and not in the reverse direction. In this instance, a link relationship will not be transmitted and presented to the user of the client device 20 when requested in the direction opposite to that specified by the direction indicator 496.

In an alternate embodiment, the direction indicator 466 of the link relationship 460 may comprise a plurality of directional indicator fields (not shown). Each directional indicator field may then correspond to one of the one or more link relationship attributes 465 and indicate whether the corresponding link relationship attribute 465 may apply in one direction or in both directions between the two document objects 40 and 50 represented in the fields 462 and 463 through the link references 42 and 52 respectively. Likewise, the direction indicator 496 of the link relationship 490 may comprise a plurality of directional indicator fields (not shown). Each directional indicator field may then correspond to one of the one or more link relationship attributes 495 and indicate whether the corresponding link relationship attribute 495 may apply in one direction or in both directions between the two document objects 50 and 40 represented in the fields 492 and 493 through the link references 52 and 42 respectively. In the alternate embodiment, a similar arrangement may then be implemented for the remaining direction indicators 476, 486 of the link relationships 470, 480.

Figure 4B:
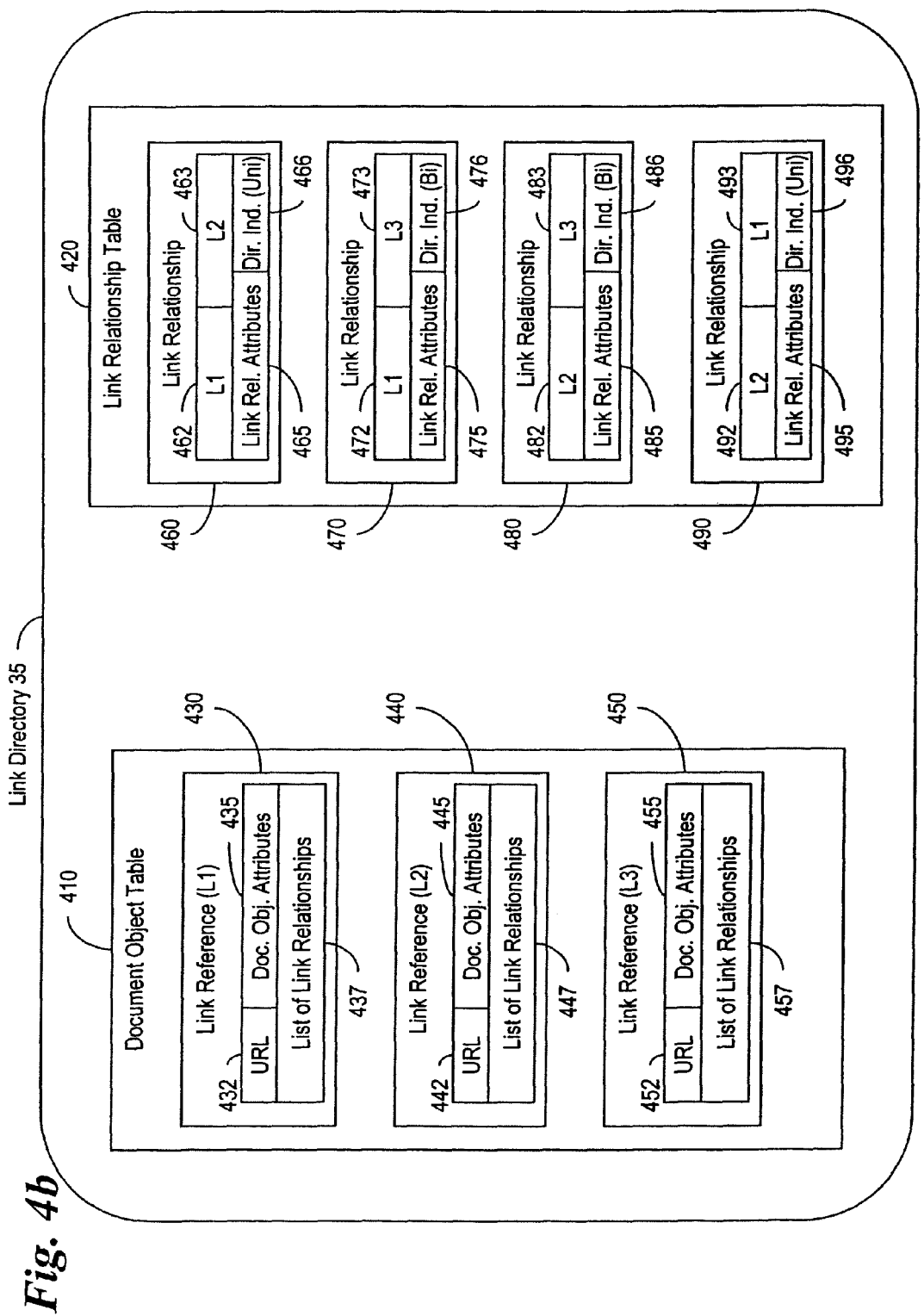
FIG. 4b is a diagram illustrating another embodiment of a link directory according to one embodiment of the invention.

FIG. 4b shows the general structure of another embodiment of the link directory 35. This embodiment of the link directory 35 includes a document object table 410, and a link relationship table 420, as described above for FIG. 4a.

The document object table 410 comprises a set of link references 430, 440, 450 to document objects located on the network 10 to which the link directory 35 is connected. Each link reference 430, 440, 450 further comprises the URL 432, 442, or 452 of the respective document object 40, 50, 340 of interest; a set of document object attributes 435, 445, 455 associated with the URL 432, 442, 452; and a list 437, 447, 457 of pointers to any of the link relationships 460, 470, 480, 490 by which the link references 430, 440, 450 may be connected to each other with context. In the case of a link relationship 460, 490 having the direction indicator 466, 496 set to indicate that the link relationship 460, 490 is unidirectional, the link relationship 460, 490 will be listed only in the list 437, 447, 457 of pointers for the link reference 430, 440, 450 that begins the unidirectional link relationship 460, 490. The link references 430, 440, and 450 in FIG. 4b correspond to the link references 42, 52, and the third link reference (not shown), as described in FIGS. 1-4a above, and which point to the URL addresses of the document objects 40, 50, and 340 respectively.

The document object attributes 435, 445, 455 serve to describe the link references 430, 440, 450 in terms useful to users of the system 100, and to place the link references 430, 440, 450 in a context that may attract users to select the link references 430, 440, 450. The document object attributes 435, 445, 455 may include a plain language name that serves to describe the document object 40, 50, 340 in terms better understood by the users of the system 100 than the URLs associated with the link references 430, 440, 450; descriptions of the content of the document object 40, 50, 340 associated with link references 430, 440, 450, wherein that content may be described to include a product review, news article, product information page, competitor's product information, or product order forms, among other types of content; and other descriptive characteristics associated with the document object 40, 50, 340.

The link references 430, 440, and 450 may be created and placed in the document object table 410 when a user of the client device 20 creates a link relationship 45 between a first document object 40 and a second document object 50 or a third document object 340.

The link relationship table 420 shown in FIG. 4b comprises the same list of link relationships 460, 470, 480, 490, detailed above in FIG. 4a. In FIG. 4b, the link relationship 460 comprises a field 462 containing a pointer to the link reference 430 for the first document object 40 related by the link relationship 460; a field 463 containing a pointer to the link reference 440 for the second document object 50 related by the link relationship 460; the link relationship attributes 465; and the directional indicator 466. In FIG. 4b, the link relationship 470 comprises a field 472 containing a pointer to the link reference 430 for the first document object 40 related by the link relationship 470; a field 473 containing a pointer to the link reference 450 for the third document object 340 related by the link relationship 470; the link relationship attributes 475; and the directional indicator 476. In FIG. 4b, link relationship 480 comprises a field 482 containing a pointer to the link reference 440 for the second document object 50 related by the link relationship 480; a field 483 containing a pointer to the link reference 450 for the third document object 340 related by the link relationship 480; the link relationship attributes 485; and the directional indicator 486. Likewise, in FIG. 4b, the link relationship 490 comprises a field 492 containing a pointer to the link reference 440 for the second document object 50 related by the link relationship 490; a field 493 containing a pointer to the link reference 430 for the first document object 40 related by the link relationship 490; the link relationship attributes 495; and the directional indicator 496.

Figure 5:
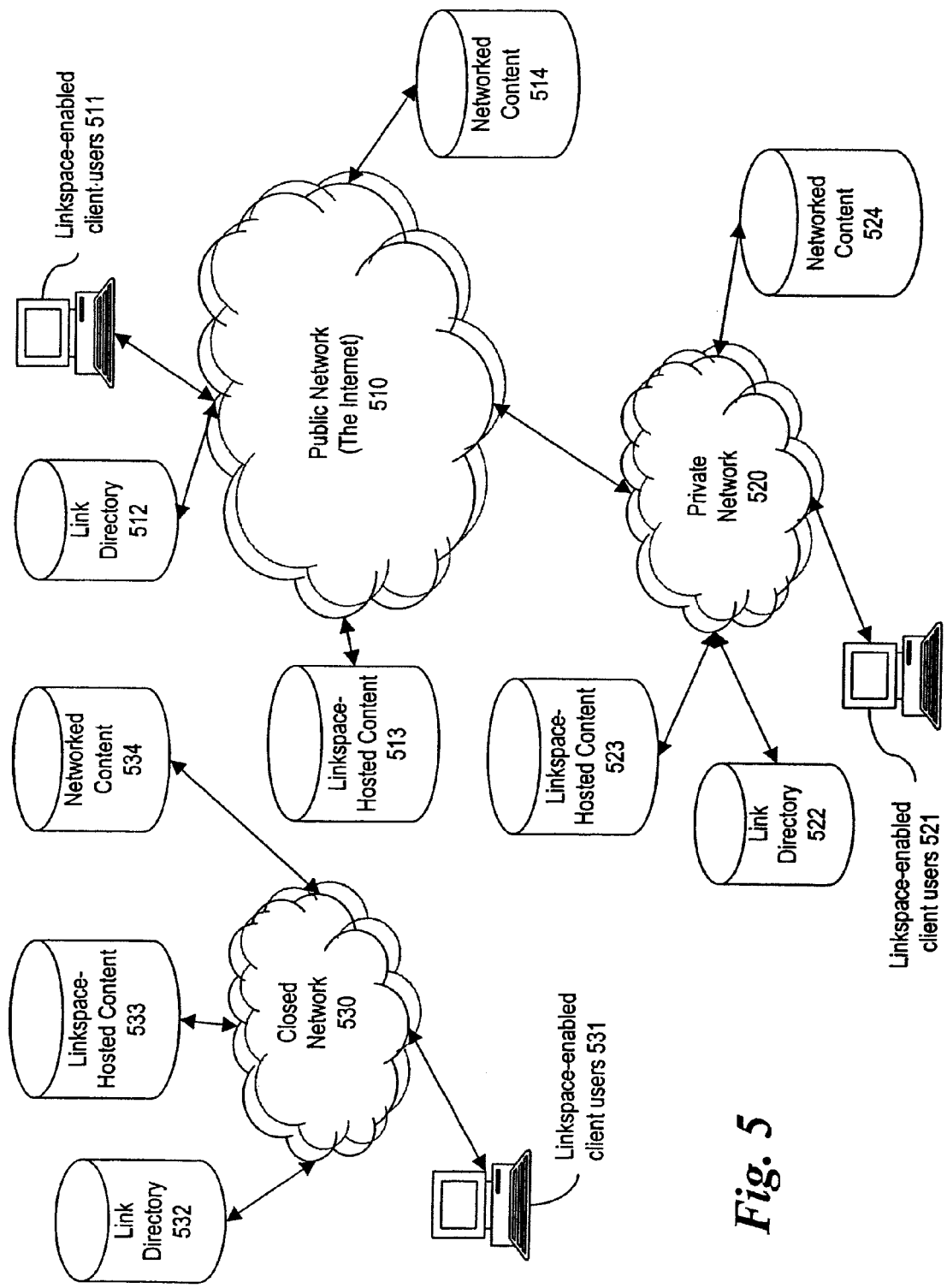
FIG. 5 is a diagram showing one embodiment of the invention implemented on public, private or closed computer networks.

FIG. 5 illustrates one embodiment of the present invention in which the invention may operate on multiple networks of varying degrees of network security. The different networks on which the systems and methods of the present invention may be implemented include a public network such as the Internet 510, a private network 520 that may be connected to the Internet 510, and a closed network 530 that is secure and not accessible to users not connected to the closed network 530. The closed network 530 is not connected to any public network such as the Internet 510, and is not connected to another private network 520.

The public network or Internet 510 may have components connected to it that implement the present invention, including one or more Linkspace-enabled client users 511, one or more link directories 512, one or more Linkspace-hosted content units 513, and one or more networked content units 514. The link directories 512 described here are functionally equivalent to the link directories 35, 310, 320, and 360 described above in connection with FIGS. 1, 2 and 3a. The Linkspace-hosted content units 513 comprise information storage devices connected to the network 510 that provide additional document object storage facilities to users of the Linkspace system 100 separate from the publicly or privately operated networked content units 514. The networked content units 514 may include networked data servers or web servers.

The Linkspace-hosted content units 513 are provided to accommodate the streamlined publication and/or distribution of content by users of the Linkspace system 100. The client tool 220 may allow a user of the Linkspace system 100 to store document objects of his or her own creation through a simplified procedure, i.e., a publish document function enabled through the client GUI display 225. The user of the client device 20 may select a document object 40 that she wishes to publish through the Linkspace-hosted content units 513, or she may create a document object (not shown) using the rendering tool 210 or other document object creation tool. The user of the client device 20 then selects the publish document function through the client GUI display 225 and selects the link directories 35, 310, 320, 360 in which she wishes to create and publish new link relationships 45, 345 referencing the user created or selected document object. The user of the client device 20 may then create and publish link relationships 45, 345 referencing the user created or selected document object. The client tool 220 may automatically upload the user created or selected document object from the user's client device 20, or from another location on the network, in this case the Internet 510, and save it on the Linkspace-hosted content unit 513. The client tool 220 may then publish the new link relationships 45, 345 referencing the user created or selected document object to the appropriate link directory 35, 310, 320, 360, and then make the user created or selected document object available to other users of the Linkspace system 100 through the new link relationships 45, 345. The activity of publishing a user created or selected document object in this manner is also recorded in the appropriate user account record 379 for the user creating or selecting the document object to be published.

Similarly, the private network 520 may have connected to it components that implement the present invention, including one or more Linkspace-enabled client users 521, one or more link directories 522, one or more Linkspace-hosted content units 523, and one or more networked content units 524.

Additionally, the closed network 530 may have connected to it components that implement the present invention, including one or more Linkspace-enabled client users 531, one or more link directories 532, one or more Linkspace-hosted content units 533, and one or more networked content units 534.

In FIG. 5, the private network 520 is shown connected to the public network or Internet 510. This may allow Linkspace-enabled client users 521 connected to the private network 520 to also be permitted access to any of the one or more link directories 512, Linkspace-hosted content units 513, and networked content units 514 that are connected to the public network or Internet 510. However, Linkspace-enabled client users 511 connected to the public network or Internet 510 that are not also among the group of authorized Linkspace-enabled client users 521 of the private network 520, may not be permitted to access the one or more link directories 522, Linkspace-hosted content units 523, and networked content units 524 that are connected to the private network 520.

A Linkspace client user 531 connected to the closed network 530, and therefore not connected to either the public network or Internet 510 nor to the private network 520, may only be permitted access to the one or more link directories 532, Linkspace-hosted content units 533, and networked content units 534 that are connected to the closed network 530.

Figure 6:
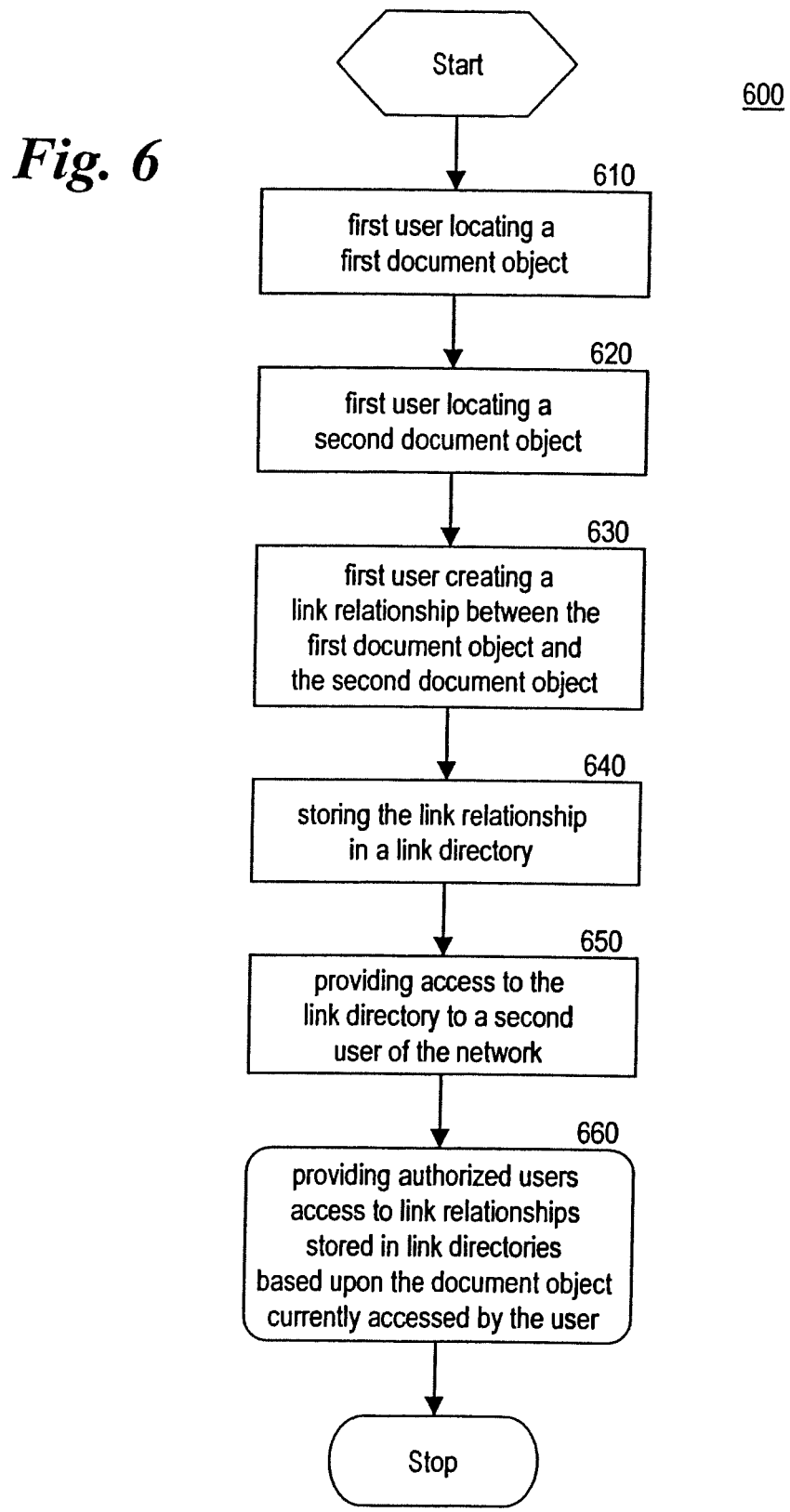
FIG. 6 is a flowchart illustrating a method according to one embodiment of the invention.

FIG. 6 is a flowchart showing the steps of a method 600 according to one embodiment of the present invention. The method 600 includes the steps of a first user (not shown) of a client device 20 locating a first document object 40 (step 610); the first user locating a second document object 50 (step 620); and the first user creating a link relationship 45 between the first document object 40 and the second document object 50 (step 630). The method 600 includes the additional steps of storing the link relationship 45 created by the first user in a link directory 35 (step 640); and providing access to the link directory 35 to a second user (not shown) of another client device 20 (step 650).

The method 600 may include a step for providing authorized users of client devices 20 access to the link relationships 45 stored in link directories 35, based upon the document object 40 currently accessed by the users on the users' client device 20 (step 660).

Figure 7:
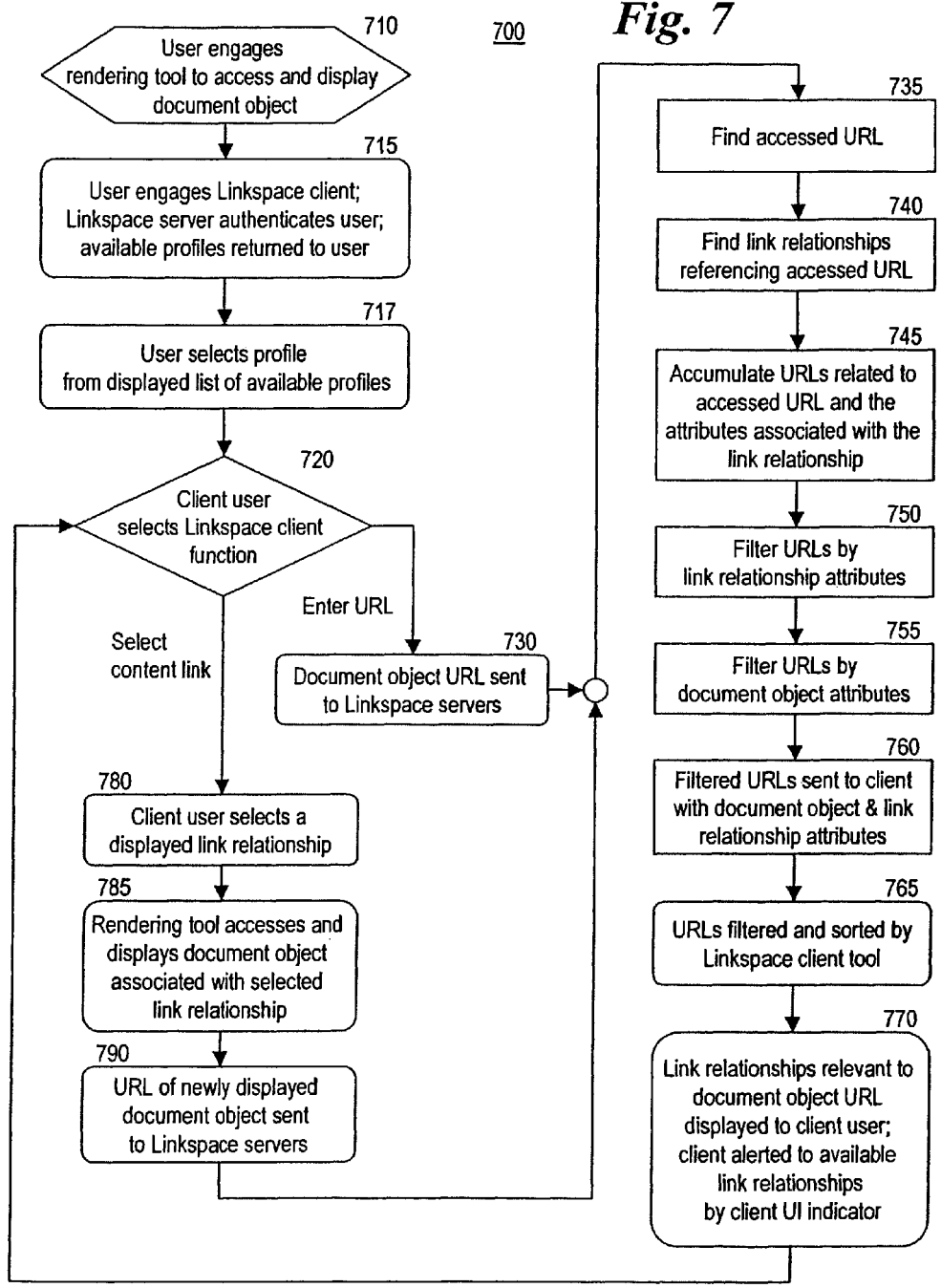
FIG. 7 is a flowchart illustrating a method for identifying link relationships between document objects according to one embodiment of the invention.

FIG. 7 is a flowchart showing the steps of a method 700 for accessing and displaying link relationships and related document objects on a network according to one embodiment of the present invention. The method 700 initiates when a user of a client device 20 engages the rendering tool 210 to request, access and display a document object 40 (step 710). The user of the client device 20 then engages the client tool 220 and is authenticated by a server 30 (step 715). The user of the client device 20 then selects a user profile 332 (step 717) that has been returned to the client device 20 upon authentication of the user by the server 30 in step 715. The selected user profile 332 may be used to determine what attributes of the link relationships 45 will be applied to filter and sort the link references 430, 440, 450 and link relationships 460, 470, 480 returned by the server 30. By filtering and sorting using attributes, a manageable and meaningful group of relevant link references 430, 440, 450 may be displayed to the user based on the user's needs and interests.

In alternate embodiments of the method 700, the steps 715 and 717 may occur before the step 710.

With the user profile 332 selected and the document object 40 displayed, the user then selects a client tool 220 function (step 720). The first function that the user may select is to enter a document object URL 215 into the rendering tool 210, whereupon that document object URL 215 is captured by the client tool 220 and transmitted to the servers 30 (step 730). The activity of transmitting the document object URL 215 to the servers 30 by the client tool 220 may be recorded and stored in an appropriate location within the user data store 370.

The server 30 then processes the transmitted document object URL 215 across the various link directories 35 to which the user is authorized access. One method of processing by the server 30 is according to the following steps. The server 30 performs a search of the document object tables 410 of all link directories 35 to find all instances of the document object URL 215 (step 735). The server 30 then searches the Link relationship tables 420 in the link directories 35 where the URL 215 was found. This search by the server 30 locates all link relationships 460, 470, 480, 490 referencing the URL 215 as one of the pointers to link references 462 or 463, 472 or 473, 482 or 483, 492 or 493 included in those link relationship 460, 470, 480, 490 (step 740). The server 30 then accumulates all the URLs 432, 442, 452 related, through the link relationships 460, 470, 480, 490 identified in step 740, to the URL 215. The server 30 also accumulates the document object attributes 435, 445, 455 associated with the identified URLs 432, 442, 452 and the link relationship attributes 465, 475, 485, 495 associated with the link relationships 460, 470, 480, 490 identified in step 740 (step 745).

The accumulated URLs 432, 442, 452 are then filtered by link relationship attributes 465, 475, 485, 495 (step 750), and then filtered again by document object attributes 435, 445, 455 (step 755). In alternate embodiments of the method 700, the accumulated URLs 432, 442, 452 may be filtered first by document object attributes 435, 445, 455 (step 755) and then by link relationship attributes 465, 475, 485, 495 (step 750). The user profile 332 is applied to determine what link relationship attributes 465, 475, 485, 495, and document object attributes 435, 445, 455 to use in filtering the accumulated URLs 432, 442, 452. The filtered URLs 432, 442, 452 are then sent back to the client device 20 that transmitted the URL 215, along with the associated document object attributes 435, 445, 455, and associated link relationship attributes 465, 475, 485, 495 (step 760). The activity of transmitting the filtered URLs 432, 442, 452, along with the associated document object attributes 435, 445, 455, and associated link relationship attributes 465, 475, 485, 495, to the client device 20 may be recorded and stored in an appropriate location within the user data store 370. Alternatively, the first filtering steps 750, 755 may be performed by the client device 20.

The client tool 220, upon receiving the filtered URLs 432, 442, 452 from the server 30, may further filter and sort the returned URLs 432, 442, 452 according to data stored in the selected user profile 332 (step 765). In this manner, the data in the user profile 332 may be applied to the filtered and sorted URLs 432, 442, 452 on either the server 30 or the client tool 20.

The filtered and sorted URLs 432, 442, 452 are then displayed to the user of the client device 20 by the client GUI display 225 and the client tool 220 alerts the user of the client device 20 to the availability of related links (in the form of the returned URLs 432, 442, 452) by means of an indicator in the client GUI display 225 (step 770). The method 700 then returns to step 720 to await further action by the user of the client device 20.

If, at step 720, the user of the client device 20 selects one of the URL links 432, 442, 452 displayed by the Linkspace GUI display as being related by link relationships 460, 470, 480, 490 to the presently accessed document object 40 with the URL 215 (step 780), the rendering tool 210 then accesses the new document object 50 associated with the selected URL and displays that document object 50 in the GUI display 218 of the rendering tool 210 (step 785). The new document object URL address 215 of the selected document object 50 is then passed on to the servers 30 (step 790) and the method 700 continues with step 735, as above, using the URL 215 of the new document object 50 as the URL to search for.

Figure 8:
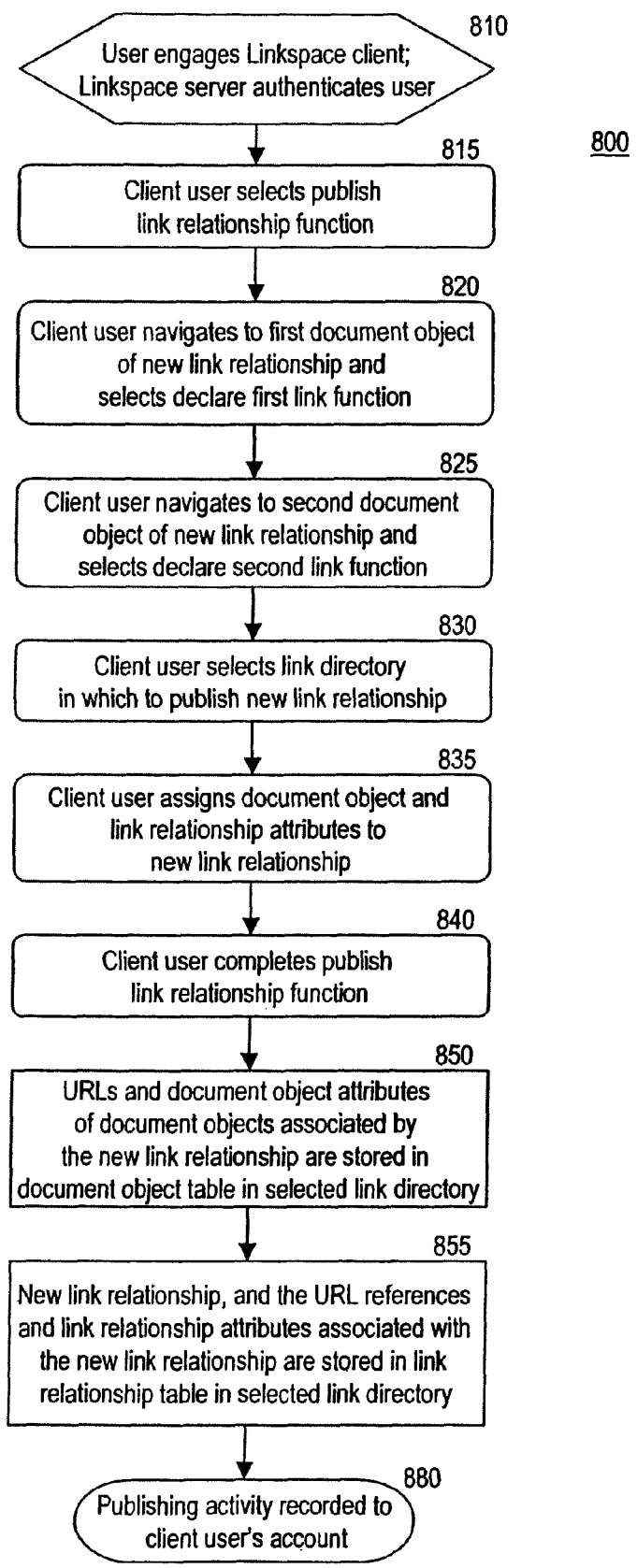
FIG. 8 is a flowchart illustrating a method for publishing link relationships between document objects according to one embodiment of the invention.

FIG. 8 is a flowchart showing the steps of a method 800 for creating and publishing link relationships according to one embodiment of the present invention. The method 800 initiates when a user of the client device 20 engages the client tool 220 and is authenticated by a server 30 (step 810). The user of the client device 20 may then select a publish link relationship function of the client tool 220 (step 815).

The user of the client device 20 may then navigate, using the rendering tool 210, to the first document object 40 of the new link relationship 45 that the user of the client device 20 wishes to create and publish. The user may then select a declare first link function of the client tool 220 (step 820). The user of the client device 20 may then navigate, again using the rendering tool 210, to the second document object 50 that the user of the client device 20 wishes to associate by means of a link relationship 45 with the first document object 40. The user can then select the declare second link function of the client tool 220 (step 825). The user of the client device 20 has now selected both ends of a link relationship 45.

The user now may select which of the link directories 35 in which the user wishes to publish the new link relationship 45 (step 830). The user of the client device 20 may then further assign link relationship attributes, such as those shown in FIG. 4 (465, 475, 485, 495) to the link relationship 45, along with assigning any document object attributes, such as those shown in FIG. 4 (435, 445, 455), to the first document object 40 and second document object 50 of the link relationship 45 (step 835). The user may then interact with a Linkspace GUI 225 button or element to complete the link relationship publish function (step 840). Upon completion of the link relationship publish function on the client device, the URLs and document object attributes of the document objects 40 and 50 associated by the new link relationship 45 are stored in the document object table 410 in the selected link directory 35 (step 850). Additionally, the new link relationship 45, along with the URL references to the first document object 40 and second document object 50 and the link relationship attributes, such as those shown in FIG. 4 (465, 475, 485, 495), are stored in the link relationship table 420 in the selected link directory 35 (step 855). The method 800 for creating and publishing link relationships completes by recording the publishing activity to the user account record 379 associated with the user of the client device 20 for later tracking and billing purposes (step 880).

Figure 9:
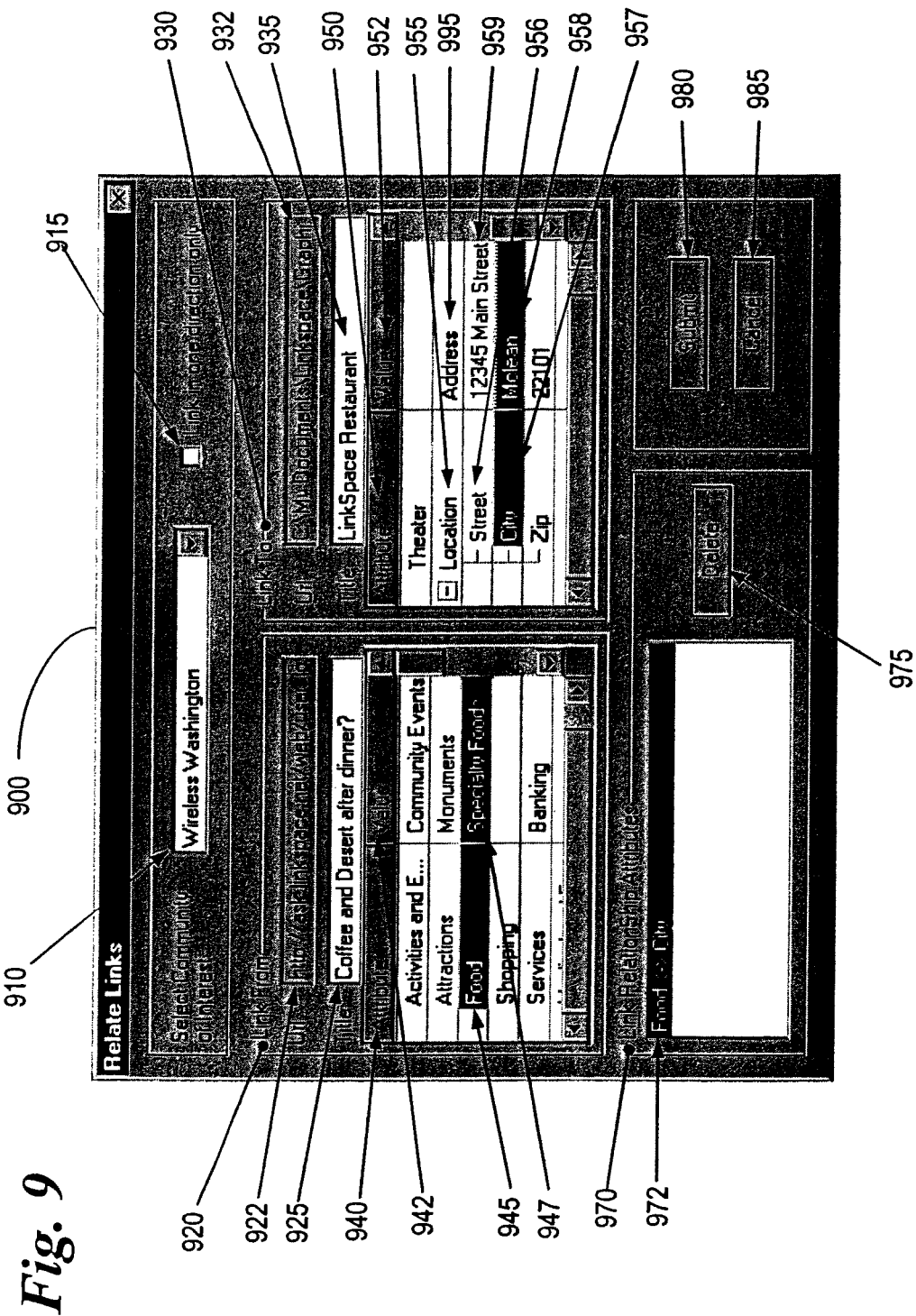
FIG. 9 is one example screen view of a user interface for a relate links dialog box according to one embodiment of the invention.

FIG. 9 is an example of a user interface, more specifically, a screen view of a user interface for a relate links dialog box 900, one element of the user interface of one embodiment of the invention. The relate links dialog box 900 is invoked when a user of the client tool 220 engages the publish link relationship function of the client tool 220. In the embodiment shown in FIG. 9, the relate links dialog box 900 includes a drop down list 910 for selecting a community of interest, a user interface term referring to one of the one or more link directories 35, and a checkbox 915 for indicating whether the link relationship 45 being created is to operate bi-directionally or unidirectionally. If the checkbox 915 is checked, then the link relationship 45 being created will only apply in one direction. In the example illustrated in FIG. 9, the user has selected the community of interest (link directory 35) referred to as "Wireless Washington," a link directory 35 storing link references 42, 52 and link relationships 45 considered by their creators as relevant to wireless device users in the Washington, D.C. metropolitan area.

The relate links dialog box 900 further includes a link-from section 920, a link-to section 930, a link relationship attributes display box 970, a submit link relationship button 980 and a cancel button 985. The submit link relationship button 980 is selected by the user when the user has selected and/or entered all information associated with the link references 42, 52 and the link relationship 45 that the user wishes to publish. Upon selection of the submit link relationship button 980, the client tool 220 closes the relate links dialog box 900 and transmits the information associated with the created link relationship 45 to one of the one or more servers 30. The cancel button 985 may be selected by the user to abort the creation and publication of the link relationship 45 that the user initiated and to close the relate links dialog box 900.

In the embodiment shown in FIG. 9, the link-from section 920 may include a first document object URL 922 associated with the first document object 40 included in the link relationship 45 being created, where the first document object URL 922 was captured when the publish link relationship function was engaged; a first plain language name field 925; and a listing of first document object attributes 940 and the attribute values 942 associated with those first document object attributes 940. In the example illustrated by FIG. 9, the first document object URL 922 is the address of a first document object 40 that is a web page for a coffee and dessert shop. The first plain language name field 925 may be captured when the publish link relationship function was engaged and/or may be edited by the user creating the link relationship 45. An exemplary first document object attribute for food 945, and the value of specialty foods 947 assigned to the first document object attribute 945 by the user creating the link relationship 45, are also shown.

The link-to section 930 similarly may include a second document object URL 932 associated with the second document object 50 included in the link relationship 45 being created, where the second document object URL 932 was captured when the publish link relationship function was engaged; a second plain language name field 935; and a listing of second document object attributes 950 and the attribute values 952 associated with those second document object attributes 950. In the example illustrated by FIG. 9, the second document object URL 932 is the address of a second document object 40 that is a web page for a "LinkSpace Restaurant" located in McLean, Va. (a suburb of Washington). The second plain language name field 935 may be captured when the publish link relationship function was engaged and/or may be edited by the user creating the link relationship 45. An exemplary second document object attribute for location 955, and the value of address 995 assigned to the second document object attribute 955 by the user creating the link relationship 45, are also shown. In addition, in the example illustrated by FIG. 9, a subordinate attribute for city 957, subordinate under the attribute for location 955, and a value of address 995 along with the assigned value of McLean 958 for the subordinate attribute for city 957, are also shown in the link-to section 930. Further subordinate attributes may include a street 956 with a value 959 of 12345 Main Street.

The link relationship attributes display box 970, as shown for the embodiment illustrated by FIG. 9, includes a list of link relationship attributes 972 and a delete link relationship attribute button 975. The link relationships 972 are formed by pairs of first document object attributes 940 and second document object attributes 950 that the user creating the link relationship 45 has selected to describe the nature of the link relationship 45. These link relationship attributes 972 may form the link relationship attributes 465, 475, 485, 495 described in FIG. 4a. The delete link relationship attribute button 975 may be used to delete a selected link relationship attribute 972 displayed in the link relationship attributes display box 970.

The exemplary link relationship attribute 972 shown in FIG. 9 indicates that the user creating the link relationship 45 has declared that the city subordinate attribute 957 (one selected second document object attribute 950) of the Linkspace Restaurant associated with the second document object 50, having a value of McLean 958, is related to the food attribute 945 (one selected first document object attribute 940), having a value of specialty foods 947, of the coffee shop associated with the first document object 40. As a result, once the exemplary link relationship 45 shown in FIG. 9 is created and published, other users of Linkspace-enabled client devices 20 that request and/or access the Linkspace Restaurant web page may be presented with a link reference 42, 52 pointing to the web page for the coffee and dessert shop, as illustrated in the link reference display window 1020 shown in FIG. 10.

In one embodiment of the invention, the link relationship attribute 972 may be declared by the user performing a drag-and-drop operation wherein the document object attribute 957 is dragged and dropped onto the document object attribute 945, creating the link relationship attribute 972 which relates the two document objects 40, 50 by the association of the city subordinate attribute 957 to the food attribute 945. In an alternate embodiment, the creation and selection of link relationship attributes 972 may be performed in a manner similar to that used in the link-to section 930 and link-from section 920 described above, utilizing a set of link relationship attribute types along with data input fields for entering or otherwise selecting values for those attributes.

Figure 10:
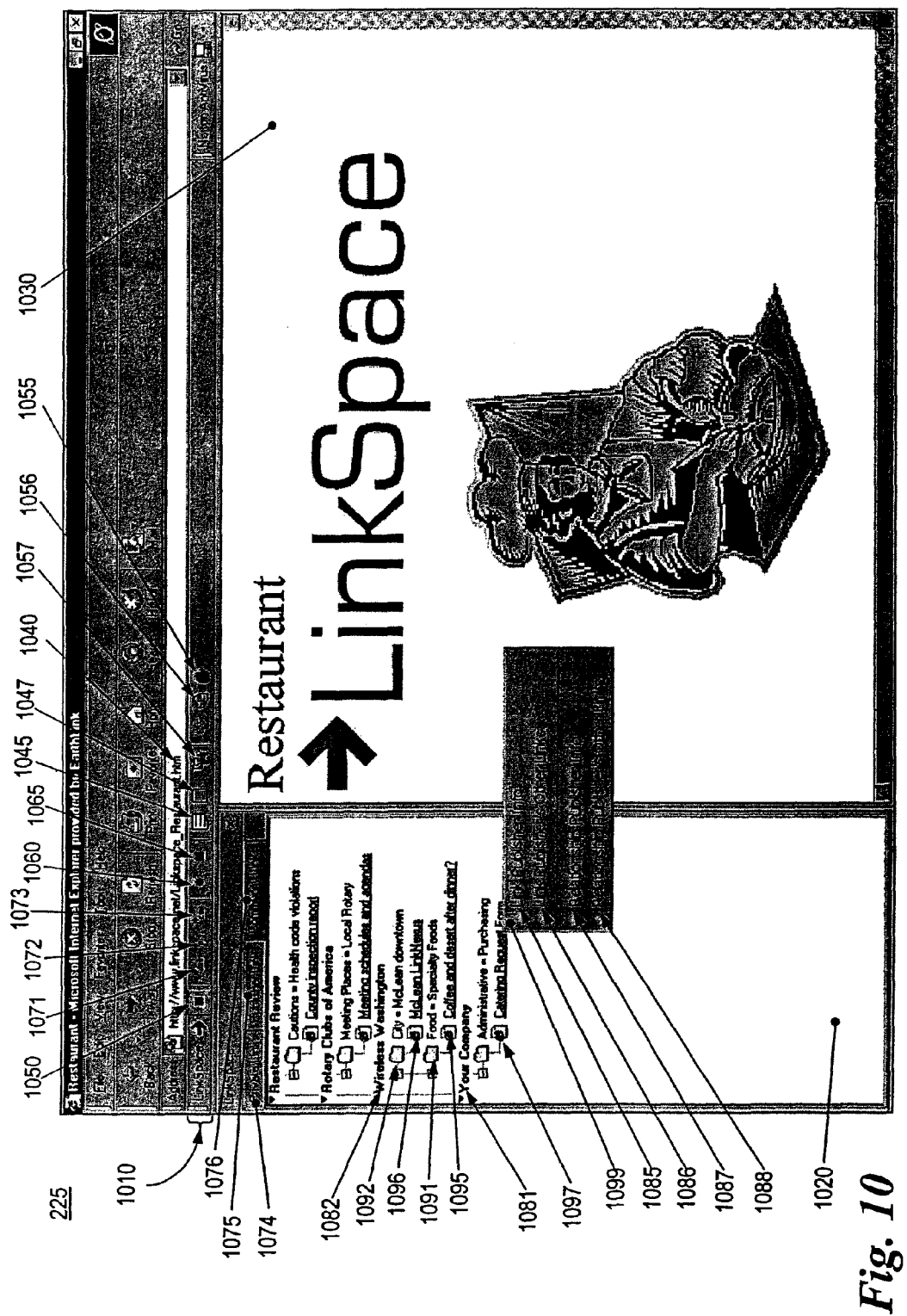
FIG. 10 is an example of a screen view for a client user interface according to one embodiment of the invention.

FIG. 10 is an example of a screen view for one embodiment of the client GUI display 225 for one embodiment of the invention, wherein the client GUI display 225 is integrated into the GUI display 218 of the rendering tool 210. Also, FIG. 10 depicts one example or manner of organizing link relationships for presentation. In the embodiment shown in FIG. 10, a client toolbar 1010 and a link reference display window 1020 together comprise the client GUI display 225. A browser window 1030 displays the document object (40, 50) being requested and accessed by the rendering tool 210 and having the document object URL address 215 displayed in an address bar field 1040.

The client toolbar 1010 includes a number of GUI buttons that initiate various functions of the client tool 220. A client logon button 1050 initiates a connection between the client tool 220 and one or more servers 30. A client logoff button 1055 ends a user session for the client tool 220 and disconnects the client tool 220 from the one or more servers 30. A mark starting page button 1060 may be engaged to initiate the publish link relationship function of the client tool 220 by setting the currently displayed document object 40 shown in the browser window 1030 and referenced by the document object URL address 215 displayed in the address bar field 1040 as the first document object 40 in the link relationship 45. After the user navigates to a second document object 50, a mark ending page button 1065 may be engaged to complete the selection of participating document objects 40, 50 for the publish link relationship function of the client tool 220. Engaging the mark ending page button 1065 sets the newly displayed document object 50 shown in the browser window 1030 and referenced by the document object URL address 215 displayed in the address bar field 1040 as the second document object 50 in the link relationship 45, and opens a relate links dialogue box 900 (shown and described in FIG. 9 above) to allow the user of the client tool 220 to assign attributes to the link relationship 45.

The client toolbar 1010 also may include three icons that indicate the availability and type of link references 42, 52 related to the document object 40 open in the browser window 1030. These icons may include a publisher links indicator 1071, a private links indicator 1072, and a community links indicator 1073.

The link reference display window 1020 presents the user with a hierarchical listing of any link references 42, 52, delivered by the server 30, that may be related to the document object 40 that is currently displayed in the browser window 1030 and has the document object URL address 215 shown in the address bar field 1040. The link reference display window 1020 may be presented in a tabbed format, wherein each tab may contain a different set of link references 42, 52 depending on the type of link reference and link relationship involved. In one embodiment of the invention, there may be three different tabs at the top of the link reference display window 1020, each corresponding to one of the indicator icons (1071, 1072, 1073) in the client toolbar 1010. The first tab may be a private links tab 1074, corresponding to the private links indicator 1072. The second tab may be a publisher links tab 1075, corresponding to the publisher links indicator 1071. The third tab may be a community links tab 1076, corresponding to the community links indicator 1073.

The publisher links tab 1075 displays an embodiment of the link reference display window 1020 presenting link references 42, 52 created by an entity responsible for the document object 40 displayed in the browser window 1030. The private links tab 1074 displays an embodiment of the link reference display window 1020 presenting link references 42, 52 created by the user of the client tool 220. The community links tab 1076 displays an embodiment of the link reference display window 1020 presenting link references 42, 52 created by the other users of the system 100.

The document object 40 displayed in the browser window 1030 in FIG. 10 is a representative web page, in this case for a restaurant named Linkspace. When this page is displayed, and the client tool 220 is engaged, as indicated by the recessed display of the client logon button 1050 in the client toolbar 1010, one or more of the indicator icons (1071, 1072, 1073) in the client toolbar 1010 will become highlighted if there are any link references 42, 52 available of the corresponding type.

For example, as illustrated in FIG. 10, the community links indicator 1073 is highlighted, while the publisher links indicator 1071 and the private links indicator 1072 are grayed out. This indicates that the server 30 has returned one or more link references 42, 52 that are categorized as community links and has not returned any link references 42, 52 categorized as publisher or private links. The returned link references 42, 52 are displayed in the link reference display window 1020 under the community links tab 1076. In this case, the link references 42, 52 are displayed in a hierarchical listing under affinity directory headings 1081, 1082. The affinity directory heading 1082 shown represents one community of interest, corresponding to one link directory 35 on a server 30, maintaining one set of link relationships 45 and link references 42, 52, that may include the document object 40 displayed in the browser window 1030. In addition, under each affinity directory heading 1081, 1082, there may be displayed one or more attribute folders 1091, 1092. Each attribute folder 1091, 1092 may contain a grouping of listed hyperlinks 1095, 1096 drawn from the respective affinity directory heading 1082 and related to the document object 40 displayed in the browser window 1030 by a particular link relationship attribute 972.

In the example shown in FIG. 10, affinity directory heading 1082 indicates a link directory 35 focusing on wireless devices in the Washington, D.C. area. Also shown in the example in FIG. 10, the attribute folder 1091 groups listed hyperlinks 1095 by the link relationship attribute 972, further relating document objects 40 to specialty food document objects 50. The listed hyperlink 1095, listed under the attribute folder 1091, comprises the text of the plain language name attribute of a document object concerning coffee and dessert after dinner. In this manner, the listed hyperlink 1095, displayed under the affinity directory heading 1082 and the attribute folder 1091, represents a link reference 52 to a document object 50 that is related, as a document object of interest to wireless device users in the Washington area, and as a specialty food document object, to the document object 40, the restaurant web page, displayed in the browser window 1030.

The attribute folder 1092 shown in the example in FIG. 10 groups listed hyperlinks 1096 by the link relationship attribute 972 further relating documents objects 40 to document objects 50 concerning the downtown area of the Washington, D.C. suburb of McLean. The listed hyperlink 1096 is to a LinkNexus document object for the city of McLean. A LinkNexus document object may comprise a listing of further link references 42, 52 to document objects 40, 50 relating to a particular subject. In the case illustrated in FIG. 10, the LinkNexus document object indicated by the listed hyperlink 1096 may contain link references 42, 52 concerning the suburban city of McLean. In this manner, the listed hyperlink 1096, displayed under the affinity directory heading 1082 and the attribute folder 1092, represents a link reference 52 to a document object 50 that is related, as a document object of interest to wireless device users in the Washington area, and as a link to content relevant to downtown McLean, to the document object 40, the restaurant web page, displayed in the browser window 1030.

The affinity directory heading 1081 shown in the example in FIG. 10 indicates a community related to "Your Company," the user's company. This affinity directory heading 1081 may contain link references 42, 52 to document objects 40, 50 maintained on the user's company's private network 520, accessible to users within the company, but not to the general public, as shown and described in FIG. 5.

The example of a screen view for one embodiment of the client GUI display 225 in FIG. 10 may further include a publish document object button 1045, a submit link relationship annotation button 1047, a find link directories button 1057, and a user controls button 1056. The publish document object button 1045 activates a publish document object function of the client tool 220. The submit link relationship annotation button 1047 activates a submit link relationship annotation function of the client tool 220. The find link directories button 1057 activates a function of the client tool 220 and the server 30 which identifies link directories 35 which include link references 42, 52 pointing to the currently accessed document object 40 and opens a find link directories dialog box (not shown) within the client user interface 225.

The user controls button 1056 activates a user controls selection function of the client tool 220 and the server 30 and opens a user controls dialog interface (not shown) which permits the user of the client tool 220 to select from a plurality of user controlled document object management interfaces, including but not limited to a link reference attribute management interface 1200, a link relationship attribute management interface 1300, and a user profile configuration interface 1400.

When the find link directories button 1057 is selected the client tool 220 captures the URL of the currently accessed document object 40 and transmits that current URL to the server 30 with a request to search all link directories 35 accessible to the user for link references 42, 52 and link relationships 45 that include the current URL. If one or more link directories 35 are found that include a link reference 42, 52 or link relationship 45 containing the current URL, the user of the client tool 220 is informed of the existence of the one or more directories 35 and instructed by the server 30 through the client tool 220 about how to learn more about the one or more link directories 35 containing the current URL and how to gain access to those link directories 35.

The systems and methods described above provide a framework for organizing, managing, and presenting document objects 40, 50 stored on a network 10. The link directories 35, link relationships 45, and link references 42, 52 enable users of the network 10 to organize the document objects 40, 50 on the network 10 without altering the document objects 40, 50 or changing the location of the document objects 40, 50 on the network 10. Link relationship attributes describing link relationships 45 and document object attributes describing document objects 40, 50 referred to by link references 42, 52 provide the mechanism to organize and describe document objects 40, 50. User profiles 230, 332 provide a mechanism by which users of the network 10 may further manage document objects 40, 50 by determining which link references 42, 52 to document objects 40, 50 may be presented to the user as potentially of interest to the user.

In an alternate embodiment of the invention, the user of the client tool 220 may search link directories 35 for link relationships 45 or link references 42, 52 that have been assigned selected attributes of interest to the user. In this embodiment, the user may engage a function of the client tool 220 to present a search GUI (not shown) where the user may select one or more link directories 35 the user wishes to search and select one or more attributes of link relationships 45 and link references 42, 52 the user wishes to locate. The search GUI may also allow the user to constrain the search to selected values or ranges of values of the selected attributes of the link relationships 45 and link references 42, 52. Upon execution of the search function, the server 30 retrieves from the one or more selected link directories 35 one or more link relationships 45 and one or more link references 42, 52 that have been assigned the attributes selected by the user for the search, and the server 30 further filters the retrieved link references 42, 52 and link relationships 45 based on the constraints applied by the user to the one or more selected link relationship attributes or link reference attributes.

Figure 11B:
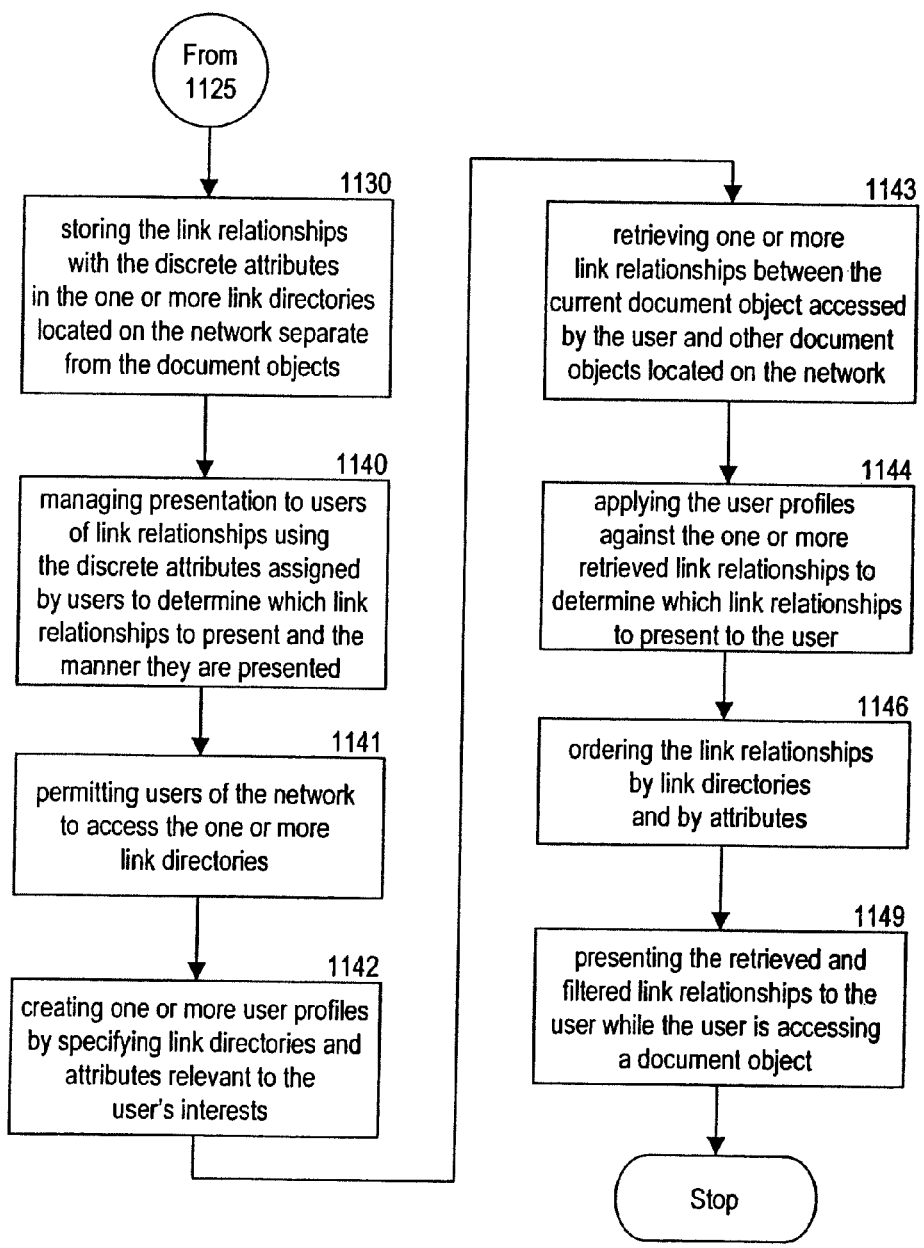

FIG. 11*a* and FIG. 11*b* ("FIG. 11") are flowcharts illustrating a method 1100 for providing a framework for managing document objects 40, 50 located on a network 10, according to one embodiment of the invention. The method 1100 includes a step for creating one or more link directories 35 storing the link relationships 45 between document objects 40, 50 (step 1105); a step for enabling users to create link relationships 45 between a first document object 40 and a second document object 50 located on the network 10 (step 1110) and a step allowing users to assign discrete attributes describing the link relationship 45 and the document objects 40, 50 related by the link relationship 45 (step 1120).

The allowing step 1120 may include further steps for defining link relationship attributes describing the link relationships 45 stored in the one or more link directories 35 (step 1122); and for defining document object attributes describing link references 42, 52 to the document objects 40, 50 related by the link relationships 45 stored in the one or more link directories 35 (step 1123). The creating step 1105 and the defining steps 1122 and 1123 may be performed by a user of the network 10 authorized to create and manage link directories 35. Such a user may be considered a link directory administrator (not shown). By defining link relationship attributes describing the link relationships 45 stored in the one or more link directories 35 (step 1122) and defining document object attributes describing link references 42, 52 to the document objects 40, 50 related by the link relationships 45 stored in the one or more link directories 35 (step 1123), the link directory administrator determines the type and qualities of the link relationships 45 and link references 42, 52 contained in the link directory 35 the link directory administrator manages. This enables the link directory administrator to set up a framework of management and presentation for the link relationships 45 and link references 42, 52 contained in the link directory 35 and to establish the link directory 35 as a community of interest tailored to interests and topics as defined by the link directory administrator.

The allowing step 1120 may also include steps for assigning one or more relevant document object attributes describing a specific link reference 42, 52 to a document object 40, 50 located on the network 10 included in a link relationship 45 being created and stored in the one or more link directories 35 by a user of the network 10 (step 1124); and assigning one or more relevant link relationship attributes describing a specific link relationship 45 being created and stored in the one or more link directories 35 by a user of the network 10 (step 1125). The assigning steps 1124 and 1125 may be performed by any user of the network 10 authorized to create link relationships 45 and link references 42, 52 to be stored in the one or more link directories 35.

The step 1125 of assigning one or more relevant link relationship attributes may include selecting one or more defined and assigned document object attributes associated with each of the two document objects 40, 50 that define the link relationship 45 to create a link relationship attribute describing the link relationship 45.

The selecting steps 1124 and 1125 of the method 1100 may be performed by any user of the network 10 authorized to create link relationships 45 and link references 42 by interaction with the client tool 220 through the relate links dialog box 900 illustrated in and described for FIG. 9.

The allowing step of the method 1100 may also include a step for storing the link relationships 45 with the defined and assigned discrete attributes in the one or more link directories 35 located on the network 10 separate from the document objects 40, 50 (step 1130).

The method 1100 also includes a step for managing presentation of link relationships 45 to users of the network 10 using the discrete attributes assigned by users of the network 10 to determine which link relationships 45 to present to users and the manner in which those link relationships will be presented to users (step 1140). The managing step 1140 may include steps for permitting users of the network 10 to access the one or more link directories 35 (step 1141); for creating one or more user profiles 230, 332 by specifying one or more link directories 35 and one or more attributes describing the link relationships 45 and/or attributes of the document objects 40, 50 that may be relevant to the interests of the user creating the user profiles 230, 332 (step 1142); for retrieving from the one or more link directories 35 one or more link relationships 45 between the document object 40 the user is currently accessing and other document objects 50 located on the network (step 1143); for applying the user profiles 230, 332 as filters against the one or more retrieved link relationships 45 to determine which link relationships 45 to present to the user (step 1144); for ordering the retrieved link relationships 45 by link directories 35 and by attributes describing the link relationships 45 and/or attributes of the document objects 40, 50 (step 1146); and for presenting the retrieved and filtered link relationships 45 to the user while the user is accessing a first document object 40 (step 1149). By application of this method, a user or an administrator is provided the capability necessary to manage the presentation to the user of link relationships 45 between document objects 40, 50 on the network 10, and thereby improve the user's awareness of, access to and navigation through those document objects 40, 50 located on the network 10.

Figure 12:
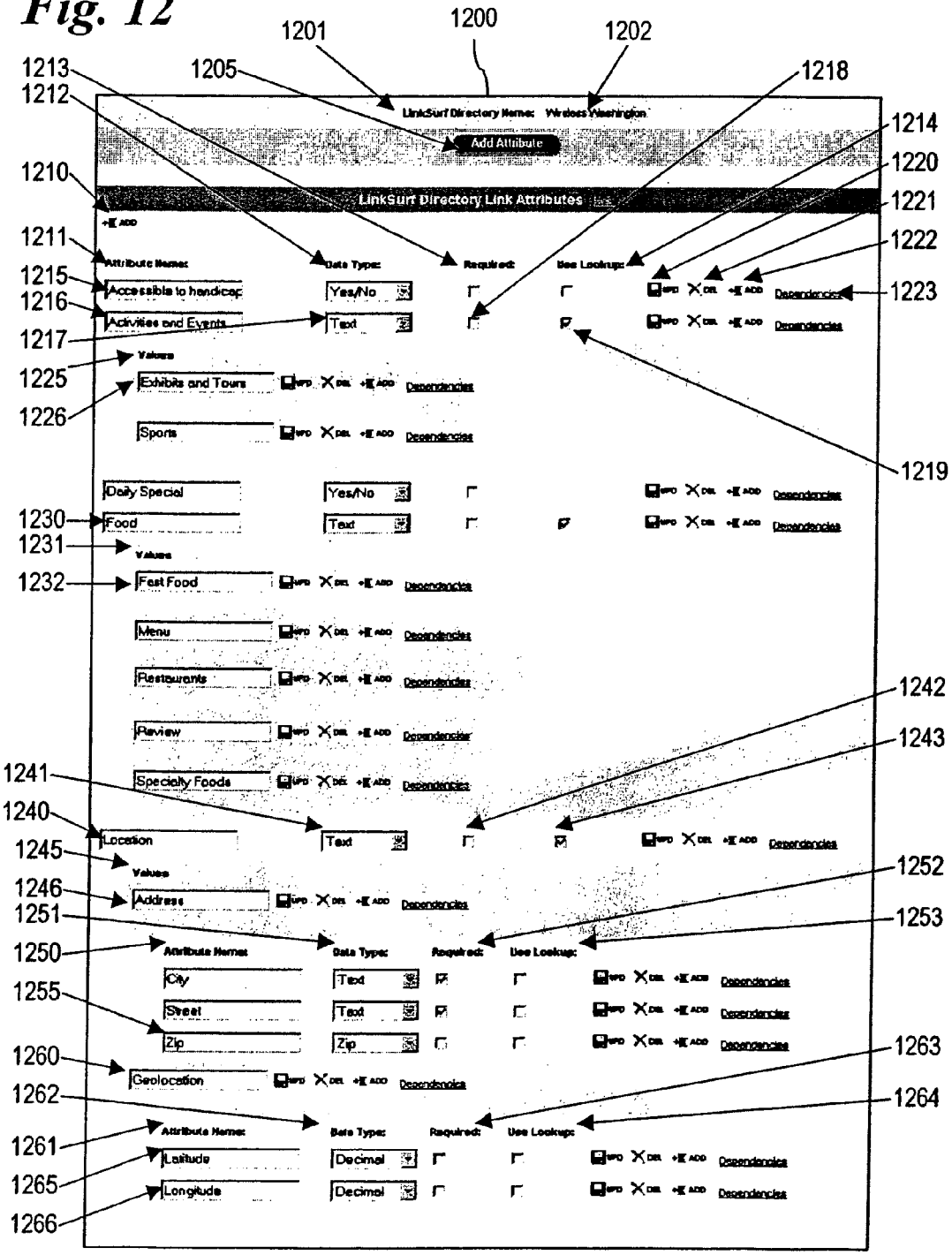
FIG. 12 is one example screen view of a user interface for assigning attributes to document objects in a link directory according to one embodiment of the invention.

FIG. 12 is one example screen view of a user interface 1200 for defining attributes allowed for document objects 40, 50 in a link directory 35 according to one embodiment of the invention. The example user interface shown in FIG. 12 may be used by a link directory administrator (not shown) to determine the types of link references 42, 52 that she wishes to be managed and stored in the specific link directory 35 she is managing. The link directory administrator determines the type of link references 42, 52 she intends to maintain in the link directory 35 she controls by defining one or more document object attributes allowed to describe the link references 42, 52. The document object attributes that the link directory administrator defines, when assigned by a user for the link references 42, 52, serve to place the link references 42, 52 in a useful context for users of the network 10 accessing the link references 42, 52 stored in the link directory 35.

In one embodiment of the invention, the link directory administrator opens the link reference attribute management interface 1200 by starting a management session with a server 30 that contains the link directory 35 the link directory administrator wishes to manage. In one embodiment of the invention, the link reference attribute management interface 1200 is opened inside the rendering tool 210, which may comprise a web page browser. The link reference management interface 1200 includes a link directory name label 1201 with an associated value 1202 indicating the name of the link directory 35 that will be managed by the link reference management interface 1200. An add attribute button 1205 is included beneath the link directory name label 1201 in the embodiment of the link reference attribute management interface 1200 shown in FIG. 12. The add attribute button 1205 allows the user to assign a new document object attribute to the link directory 35, and presents the new attribute in the link reference attribute management interface 1200. Each new document attribute includes fields for specifying unique values having assigned meanings associated with the created document object attribute which may be edited and expanded upon to provide additional information.

Each new document object attribute created within the link reference attribute management interface 1200 includes an attribute name 1211, an attribute data type 1212, a required attribute checkbox 1213, and a use-lookup checkbox 1214. The attribute name 1211 allows the link directory administrator to create and modify a descriptive text name associated with the new document object attribute 1216. For the document object attribute 1216, the link directory administrator has entered an attribute name 1211 of "Activities and Events." The attribute data type 1212 allows the link directory administrator to specify the form of data that the document object attribute may contain. The link directory administrator selects the data type 1212 from several allowable data types (including but not limited to Boolean (yes/no), integer, text, and others permitted by the system 100) using a data type selection list box 1217. The attribute data type 1212 selected using the data type selection list box 1217 allows the system 100 to ensure that valid document object attribute data is entered for each document object attribute selected by a user of the network 10 accessing and creating link relationships 45 and link references 42, 52. For the document object attribute 1216, the link directory administrator has selected a data type 1212 of "Text" from the data type selection list box 1217.

The required attribute checkbox 1213 allows the link directory administrator to specify whether the system 100 requires that a document object attribute defined by the link directory administrator for the link directory 35 may be required to be selected, and a value entered, by users creating link relationships 45 and link references 42, 52 in the link directory 35. This ensures that link references 42, 52 and link relationships 45 associated with document objects 40, 50 entered in the link directory 35 have managed document object attributes, as assigned by the users, that are required by the link directory administrator to effectively manage the link relationships 45 and link references 42, 52 associated with the document objects 40, 50 on the network 10.

If the checkbox 1218 for the second document object attribute 1216 listed in the link reference management interface 1200 were to be checked, then that document object attribute 1216 would be required to have values selected by users of the link directory 35. The use-lookup checkbox 1214 allows the link directory administrator to specify a managed set of possible values for each document object attribute. The use of the use-lookup checkbox 1214 is illustrated for the second document object attribute 1216 shown in FIG. 12 where a use-lookup checkbox 1219 corresponding to the second document object attribute 1216 has been checked. Under this document object attribute 1216, a list of values 1225 is displayed, including the value 1226 of "Exhibits and Tours." This allows the link directory administrator to limit the possible values of document object attributes to the selected list of values 1225. This aspect of document object attribute management prevents uncontrolled variation of possible values in fields with attribute data types 1212 that require few or no constraints.

The first document object attribute 1215 listed in the link reference attribute management interface 1200, with an attribute name 1215 of "Accessible to Handicapped," is an example of a document object attribute that may be important to a user interested in a document object 40 which may describe a restaurant. The indication that a restaurant is or is not accessible to the handicapped may be a determining factor in selection of document objects 40, 50 for viewing by a user. Using the invention, users wishing to promote a document object 40 describing a restaurant may assign a document object attribute 1215 of "Accessible to Handicapped" to a link reference 42 pointing to the document object 40. A user of the invention seeking information regarding restaurants may only be interested in document objects 40,50 about restaurants that are handicapped accessible and may filter out any document objects 40,50 that are not handicapped accessible through the selection of the document object attribute 1215 in one or more user profiles 230, 332. In the example of document object attribute 1215, the link directory administrator has specified that the data type 1212 is a simple "yes/no" value, and has not checked the required field 1213 and therefore specified that the document object attribute 1215 is not required to be assigned by users. The use-lookup field 1214 for the document object attribute 1215 is unchecked. In this example, the "yes/no" data type does not require specification of possible values. By defining the document object attribute 1215 of "Accessible to Handicapped" and permitting users to select that document object attribute 1215, the link directory administrator is provided with the capability to manage document objects 40, 50 that may describe a facility or event that is handicapped accessible.

The invention, through the use of the link reference attribute management interface 1200 shown in FIG. 12, enables the link directory administrator to manage document objects by relating document object attributes to other document object attributes based on hierarchical dependencies and common dependencies. In a hierarchical dependency a selected document object attribute may have subordinate document object attributes which further described document objects with the selected document object attribute. For example, the selected document object attribute may be "restaurant," and a subordinate document object attribute may be "cuisine."

In a common dependency, a selected document object attribute may have a common document object attribute that is dependent on but not unique to the selected document object attribute. For example, the selected document object attribute may be "address," which is a common document object attribute that should not be a unique subordinate document object attribute of the "restaurant" document object attribute. These two forms of document object attribute dependencies allow more detailed description of document objects 40, 50 with each selected document object attribute. Such a more detailed description of the document objects 40, 50 referenced by the link directory 35 enables the users to more readily determine the relevance of the document objects 40, 50 to the users' needs and interests.

A representative document object attribute for location 1240 may have the associated use-lookup field 1243 checked, indicating that there will be a list of values 1245 associated with the document object attribute for location 1240. In the example shown in FIG. 12, the link directory administrator has entered two possible values 1246, 1260 in the list of values 1245 below the document object attribute for location 1240. Each of these values 1246, 1260 are alternative ways to further describe the document object attribute for location 1240. The document object attribute for location 1240 may be a document object attribute of particular importance to a user's selection of a document object 40, 50 where the user is seeking document objects describing a restaurant. The document object attribute for location 1240 may also be a document object attribute of particular importance to a user creating a link relationship 45 between document objects 40, 50. Depending on the parameters of the user's search for document objects 40, 50, the common document object attribute for address 1246, the common document object attribute for geolocation 1260, or both, may be important discriminators in a user's search for a restaurant document object 40, 50.

The link reference attribute management interface 1200 allows the link directory administrator to further assign document object attributes that may be dependent upon the location document object attributes in the list of values 1245. These document object attributes are illustrated by the document object attributes listed below the document object attribute of address 1246, including the common document object attribute with the name "zip" 1255. The common dependency of the "zip" document object attribute 1255 to the location document object attribute 1240 and address document object attribute 1246 clarify that the "zip" document object attribute 1255 is a value of the zip code further describing the address of a location associated with the document object 40 for which a user may be creating link references 42.

By creating subordinate and common dependent document object attributes, the link directory administrator facilitates management of document objects by assigning document object attributes that further define a specific document object attribute. If the document object attribute to which the common or subordinate document object attribute is subordinate is selected, only then are the subordinate or common document object attributes relevant. In addition, common document object attributes distinguish these document object attributes from other uses of similar, or even identical document object attribute names 1211. For instance, the document object attribute with the name "zip" 1255 might also be used to specify a delivery service area of a restaurant described in a document object 40, 50. The delivery area may include zip codes including but not limited to the zip code of the restaurant.

The action word "dependencies" 1223 also allows the link directory administrator to manage document objects by identifying common or subordinate document object attributes associated with the document object attribute 1215 adjacent to the action word 1223. These common or subordinate dependent document object attributes allow the directory administrator to manage the attributes of document objects by reducing redundant subordinate document object attributes. For example, by making the location document object attribute 1240 not dependent on the activities and events document object attribute 1216 and fast food document object attribute 1232, the system 100 permits definition and assignment of just one location document object attribute 1240 rather than a location document object attribute 1240 subordinate to each of the activities and events document object attribute 1216 and the fast food document object attribute 1232.

Three additional action buttons may be associated with each document object attribute, including subordinate document object attributes. These additional action buttons include an update button 1220, a delete button 1221, and an add subordinate document object attribute button 1222. The update button 1220 allows the link directory administrator to refresh the data in the link directory 35 regarding the document object attributes defined for that link directory 35. The delete button 1221 deletes the associated document object attribute, its values, and its subordinate and common document object attributes. The add subordinate document object attribute button 1222 adds a subordinate document object attribute that is subordinate to the document object attribute adjacent to the button 1222.

When no document object attribute has been defined in the link reference attribute management interface 1200, an add document object attribute button 1210 allows the link directory administrator to enter a new top-level document object attribute 1215, 1216, 1230, 1240. The add document object attribute button 1210 may also allow the link directory administrator to add another top-level document object attribute 1215, 1216, 1230, 1240, when one or more top-level document object attributes 1215, 1216, 1230, 1240 have already been assigned.

Figure 13:
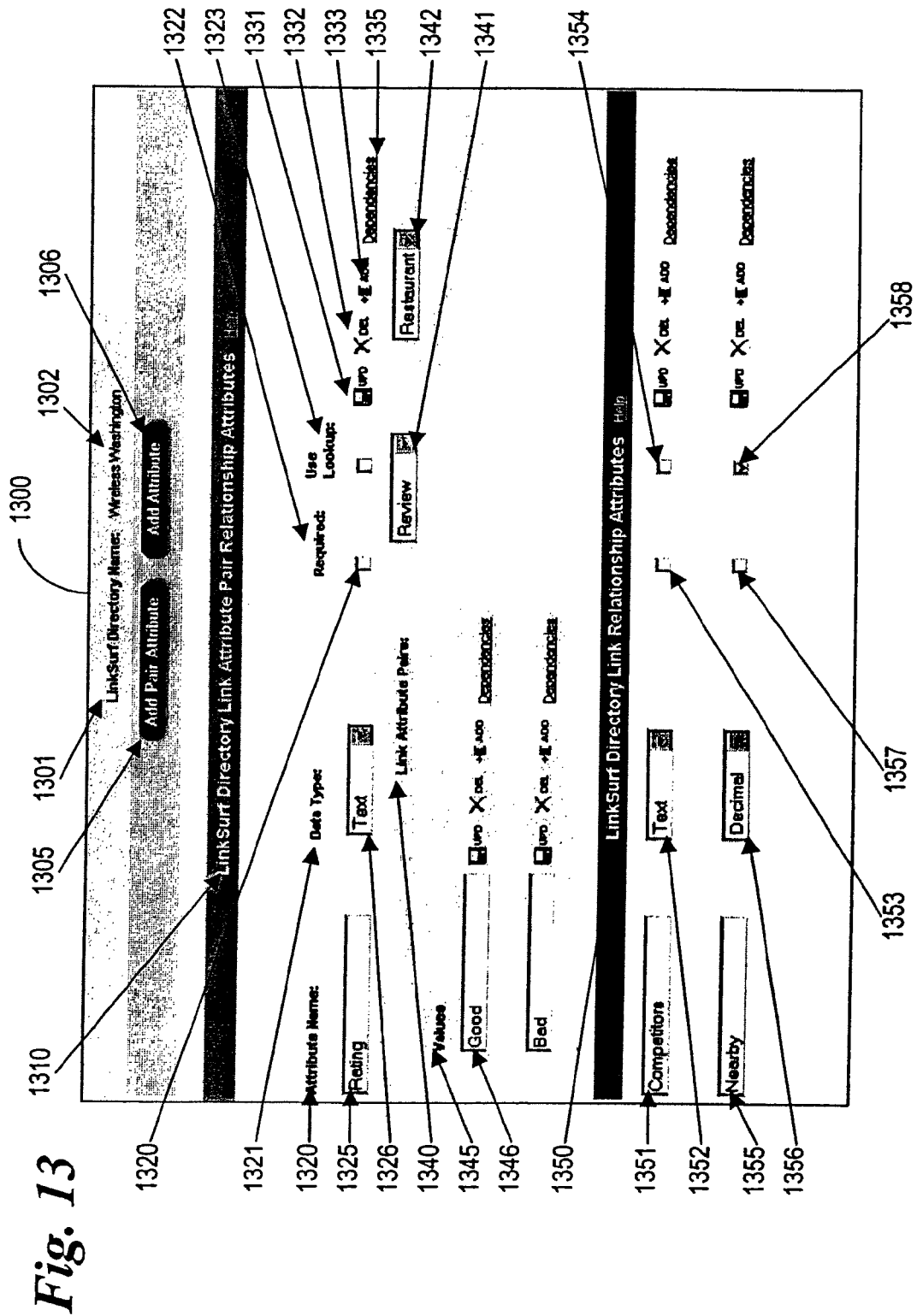
FIG. 13 is one example screen view of a user interface for assigning attributes to link relationships in a link directory according to one embodiment of the invention.

FIG. 13 is one example screen view of a user interface 1300 for defining attributes for link relationships 45 in a link directory 35 according to one embodiment of the invention. The example user interface shown in FIG. 13 may be used by a link directory administrator (not shown) to determine the types of link relationships 45 that she wishes to be managed and stored in the specific link directory 35 she is managing. The link directory administrator determines the type of link relationships 45 she intends to maintain in the link directory 35 she controls by defining one or more link relationship attributes to describe the link relationships 45. The link relationship attributes serve to place the link relationships 45 in a useful context for presentation to users of the network 10. This ensures that link relationships 45 between document objects 40, 50 entered in the link directory 35 have managed link relationship attributes, as assigned by the users, that are required by the link directory administrator to effectively manage the link relationships 45 and link references 42, 52 associated with the document objects 40, 50 on the network 10.

By using the example link relationship management interface 1300 illustrated in FIG. 13, the link directory administrator may define link relationship attributes to describe link relationships 45 maintained in the link directory 35. The link relationship attributes may be defined by associating pairs of defined document object attributes. The link relationship attributes may also be defined without regard to document object attributes.

In one embodiment of the invention, the link directory administrator opens the link relationship attribute management interface 1300 by starting a management session with a server 30 that contains the link directory 35 the link directory administrator wishes to manage. In one embodiment of the invention, the link relationship attribute management interface 1300 may be opened inside the rendering tool 210, which may comprise a web page browser. The link relationship management interface 1300 includes a link directory name label 1301 with an associated value 1302 indicating the name of the link directory 35 that will be managed by the link relationship management interface 1300. An add pair attribute button 1305 and an add attribute button 1306 are included beneath the link directory name label 1301 in the embodiment of the link relationship attribute management interface 1300 shown in FIG. 13. The add pair attribute button 1305 allows the link directory administrator to create a new link relationship attribute in the link directory 35 and presents the new link relationship attribute for editing in the paired link relationship attribute section 1310 of the link relationship attribute management interface 1300. The add attribute button 1306 allows the link directory administrator to create a new link relationship attribute in the link directory 35 and presents the new link relationship attribute for editing in the stand-alone link relationship attribute section 1350 of the link relationship attribute management interface 1300.

The paired link relationship attribute section 1310 of the link relationship management interface 1300 shows an example interface for defining paired link relationship attributes 1325 formed by relating two document object attributes defined for the link directory 35 by the link directory administrator in the link reference management interface 1200. Each new link relationship attribute defined within the link relationship attribute management interface 1300 includes an attribute name 1320, an attribute data type 1321, a required attribute checkbox 1322, and a use-lookup checkbox 1323. The attribute name 1320 allows the link directory administrator to create and modify a descriptive text name associated with the new link relationship attribute 1325. For the link relationship attribute 1325, the link directory administrator has entered an attribute name 1320 of "Rating." The attribute data type 1321, required attribute checkbox 1322, and use-lookup checkbox 1323 perform substantially similar functions in relation to the link relationship attribute 1325 as the document object attribute data type 1212, required attribute checkbox 1213, and use-lookup checkbox 1214 performed for document object attributes in FIG. 12.

The action word "dependencies" 1335 allows the link directory administrator to add subordinate link relationship attributes (not shown) below the link relationship attribute 1325 associated with the action word 1335. Three additional action buttons may be associated with each link relationship attribute, including subordinate link relationship attributes. These additional action buttons include an update button 1331, a delete button 1332, and an add subordinate link relationship attribute button 1333. The update button 1331 allows the link directory administrator to refresh the data in the link directory 35 regarding the link relationship attributes defined for that link directory 35. The delete button 1332 deletes the associated link relationship attribute. The add subordinate link relationship attribute button 1333 adds a subordinate link relationship attribute that is subordinate to the link relationship attribute associated with the button 1333.

In the embodiment of the link relationship management interface 1300 illustrated in FIG. 13, the paired link relationship attribute section 1310 further includes a link reference attribute pairs selection section 1340. The link reference attribute pairs selection section 1340 includes two link reference attribute selection list boxes 1341, 1342 which enable the link directory administrator to select two document object attributes from among the document object attributes defined for the link references 42, 52 stored in the link directory 35 (through the link reference attribute management interface 1200 in one embodiment of the invention). By selecting the two document object attributes using the link reference attribute selection list boxes 1341, 1342, the link directory administrator specifies that the paired link relationship attribute 1325 may describe the link relationships 45 stored in the link directory 35 as relationships between two document objects 40, 50 considered by the users creating the link relationships 45 to be significant as document objects 40, 50 having the respective document object attributes selected in the link reference attribute selection list boxes 1341, 1342.

Each paired link relationship attribute 1325 assigned through the link relationship management interface 1300 shown in FIG. 13 may also have a values section 1345 associated with it. The values section 1345 may include one or more link relationship attribute value entries 1346 which may be defined by the link directory administrator to enable the users creating the link relationships 45 to select from specific values for the paired the link relationship attributes 1325. In the example shown in FIG. 13, the selection list boxes 1341 and 1342 have selected values of "review" and "restaurant," respectively. This paired link relationship attribute 1325 may be assigned by users of the link directory 35 to describe link relationships 45 created where one of the document objects 40, 50 may be described as a review of a restaurant and the other of the document objects 40, 50 may be described as a restaurant document object. In the example for the link relationship management interface 1300 shown in FIG. 13, the link relationship attribute value entries 1346 for the paired link relationship attribute 1325 qualify the "review" and the "restaurant" as either "good" or "bad." Many other qualifications or quantifications are possible.

In one embodiment of the link relationship management interface 1300, as shown in FIG. 13, a stand-alone link relationship attribute section 1350 follows the paired link relationship attribute section 1310. The stand-alone link relationship attribute section 1350 enables the link directory administrator to define stand-alone link relationship attributes 1351, 1355 in much the same manner as document object attributes may be defined using the link reference attribute management interface 1200 shown in FIG. 12. The example stand-alone link relationship attribute 1351 includes an assigned attribute name 1351 of "competitors," an attribute data type 1352 of "text," a required attribute checkbox 1353 that is left unchecked, and a use-lookup checkbox 1354, also left unchecked. The example stand-alone link relationship attribute 1355 includes an defined attribute name 1355 of "nearby," an attribute data type 1356 of "decimal," a required attribute checkbox 1357 that is left unchecked, and a use-lookup checkbox 1358, that has been checked to indicate that the link directory administrator may define a set of managed attribute values for users to select from for the stand-alone link relationship attribute 1355.

Figure 14:
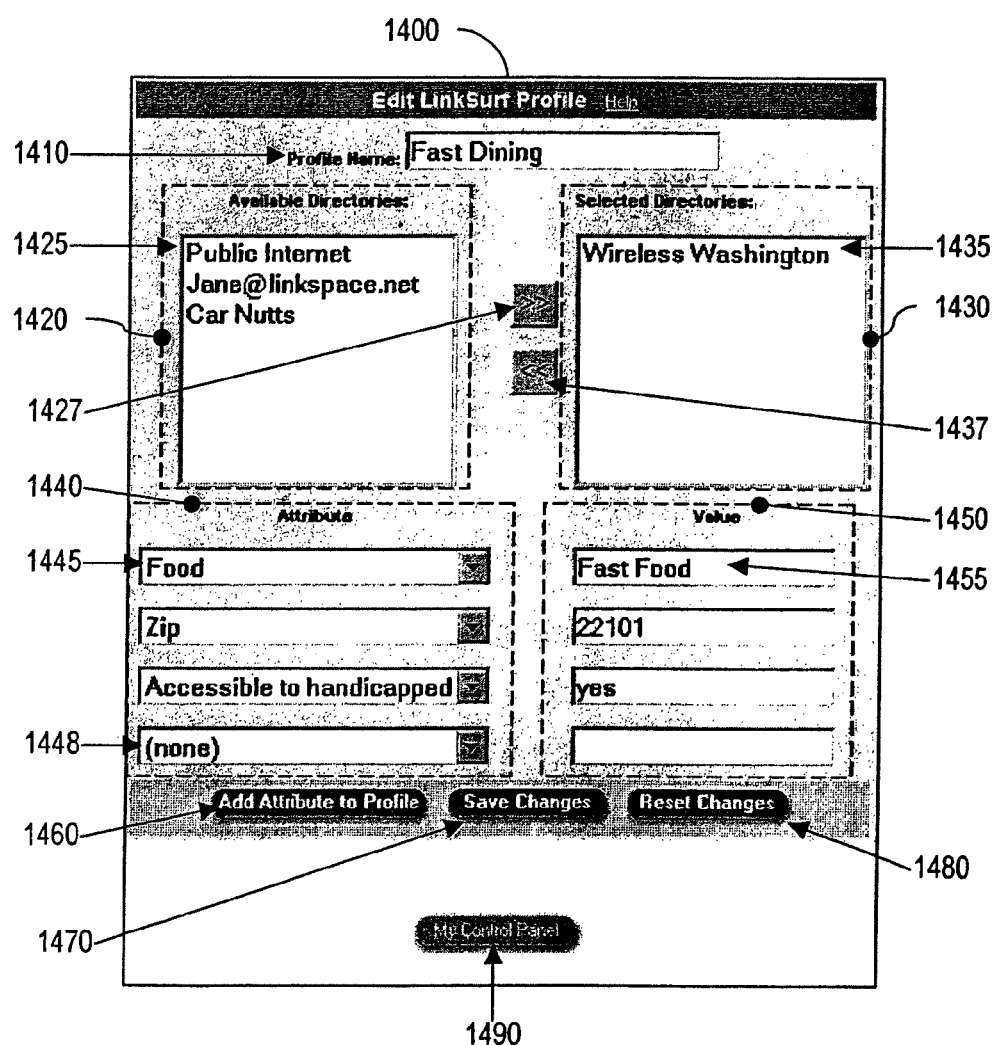
FIG. 14 is one example screen view of a user interface for configuring user profiles according to one embodiment of the invention.

FIG. 14 is one example screen view of a user interface 1400 for configuring user profiles 230, 332 according to one embodiment of the invention. The user profile configuration interface 1400, as shown in FIG. 14, enables a user of the network 10 to select one or more link directories 35 and specify one or more selected link relationship attributes and/or document object attributes defined for the one or more link directories 35 that the user is particularly interested in. The user profile 230, 332 created by the user profile configuration interface 1400 may be utilized by the invention to filter link relationships 45 and link references 42, 52 retrieved from the one or more link directories 35 and presented to the user based upon a document object 40 currently accessed by the user. The user profile 230, 332 created by the user profile configuration interface 1400 may also be utilized to ensure that the filtered link relationships 45 and link references 42, 52 presented to the user represent document objects 40, 50 that match the user's interests.

The user profile configuration interface 1400 includes a profile name field 1410, an available link directories section 1420, a selected link directories section 1430, an add selected link directory button 1427, a delete selected link directory button 1437, a selected attributes section 1440, and a selected attribute values section 1450. The profile name field 1410 permits the user to assign a name to the user profile 230, 332 the user is creating with the user profile configuration interface 1400. The available link directories section 1420 lists the names 1425 of link directories 35 that the user has been authorized to access but has not already selected as being of interest to the user in the user profile 230, 332 being created with the user profile configuration interface 1400. The selected link directories section 1430 lists the names 1435 of link directories 35 that the user has selected to be of interest to the user for the user profile 230, 332 being created with the user profile configuration interface 1400. An available link directory 1425 may be selected and moved to the selected link directories section 1430 by highlighting the available link directory 1425 and activating the add selected link directory button 1427. A selected link directory 1435 may be deleted from the selected link directories list section 1430 by highlighting the selected link directory 1435 and activating the delete selected link directory button 1437.

With one or more selected link directories 1435 added to the selected link directories section 1430, the user may then select one or more link relationship attributes or link reference attributes that have been defined for the selected link directories 1435 and add them to the selected attributes section 1440. The selected attributes section 1440 includes one ore more selected attributes 1445. Each selected attribute 1445 is selected by the use of a dropdown selection list-box allowing the user to pick from among the link relationship attributes and link relationship attributes defined for the selected link directories 1435 listed in the selected link directories section 1430. For each selected attribute 1445, a corresponding attribute value field 1455 is available in the selected attribute values section 1450. The user may enter a value in the attribute value field 1455 that further describes the selected attribute 1445 of interest to the user.

In the example shown in FIG. 14, the selected link directories section 1430 includes one selected link directory 1435 named "Wireless Washington." In this example, the user has selected one selected attribute 1445 named "Food," and assigned it the selected attribute value 1455 of "Fast Food." This enables the user profile 230, 332 given the name "Fast Dining" in the profile name field 1410 to permit filtering of link relationships 45 and link references 42, 52 and to permit presentation to the user through the client GUI display 225 of only those link relationships 45 and link references 42, 52 pertaining to "Fast Food" in the "Wireless Washington" link directory 35.

The user profile configuration interface 1400 also includes an add attributes button 1460, a save changes to profile button 1470, a reset changes button 1480, and a return to user controls button 1490. The add attributes button 1460 inserts an additional selected attribute 1445 into the selected attributes section 1440, enabling the user to assign multiple selected attributes 1445. The save changes to profile button 1470 saves all the information selected and edited in the user profile configuration interface 1400 for the user profile 230, 332 indicated in the profile name field 1410 to that user profile 230, 332. The reset changes button 1480 clears any changes made to any of the fields in the user profile configuration interface 1400 for the user profile 230, 332 indicated in the profile name field 1410. The return to user controls button 1490 exits the user profile configuration interface 1400 and opens a user control panel interface (not shown) enabling the user to add, delete and modify other user parameters, including but not limited to the link directories 35 the user may be permitted access to, identifying personal information for the user, and other data regarding the user's access to and presentation of the link relationships 45 stored in the one or more link directories 35.

The document objects 40, 50 managed by the method 1100 may be presented to the user accessing a document object through the link reference display window 1020 shown in the example of a screen view for one embodiment of the client GUI display 225 in FIG. 10. Link relationships 45 between document objects 40, 50 referenced by link references 42, 52 may be presented to the user in a hierarchical listing under affinity directory headings 1081, 1082 in the link reference display window 1020. Each affinity directory heading 1081, 1082 corresponds to one of the one or more link directories 35 on a server 30. In addition, under each affinity directory heading 1081, 1082, there may be displayed one or more attribute folders 1091, 1092. Each attribute folder 1091, 1092 under each affinity directory heading 1082, 1082 corresponds to one of the one or more link relationship attributes or document object attributes that the link directory administrator has defined for the corresponding link directory 35, and that the user has determined through one or more user profiles 230, 332, to be of interest to the user while viewing a document object 40 in the browser display window 1030.

Furthermore, each attribute folder 1091, 1092 may contain one or more listed hyperlinks 1095, 1096 drawn from the respective affinity directory headings 1081, 1082. The listed hyperlinks 1095, 1096 represent link references 52 to second document objects 50 on the network 10 related to the first document object 40 in the browser display window 1030. The link references 52 enable the user to navigate to the second document objects 50 by selecting the listed hyperlinks 1095, 1096. A link reference 52 includes a pointer to the network address, or URL, of the second document 50. The URL of a document object 50 may also permit the rendering tool 210 to present or highlight a particular location (e.g., a bookmark) in the second document object 50 upon opening the document object 50 when the user selects a listed hyperlink 1095, 1096. Alternatively, the document object 50 accessed when the user selects a listed hyperlink 1095, 1096 may be generated on the network 10 at the time of selection of the listed hyperlink 1095, 1096.

The example of a screen view for one embodiment of the client GUI display 225 also illustrates the capability provided by the one embodiment of the invention to present information regarding the users creating link references 42, 52 and link relationships 45 to users accessing document objects 40, 50 on the network 10 using the client GUI display 225. The example of a screen view for one embodiment of the client GUI display 225 includes a publisher information popup box 1099. The publisher information popup box 1099, in one embodiment of the invention, may be activated when a user of the client GUI display 225 right-clicks the pointing device of the client device 20 over one of the listed hyperlinks 1097 presented in the link reference display window 1020.

The publisher information popup box 1099 includes a document object publisher information selector 1085, a document object publisher other links selector 1086, a link relationship publisher information selector 1087, and a link relationship other link relationships selector 1088. Selecting the document object publisher information selector 1085 displays to the user of the client GUI display 225 a listing of information regarding the user of the network 10 identified as the entity responsible for the network domain where the document object 50 referenced by the listed hyperlink 1097 is located. Selecting the document object publisher other links selector 1086 displays to the user of the client GUI display

225 a listing of other link references 42, 52 created by the user of the network 10 identified as the entity responsible for the network domain where the document object 50 referenced by the listed hyperlink 1097 is located. The user of the network 10 identified as the entity responsible for the network domain where the document object 50 referenced by the listed hyperlink 1097 is located may be determined by the use of a special document object attribute defined for and assigned to the document object 50 referenced by the listed hyperlink 1097.

Selecting the link relationship publisher information selector 1087 displays to the user of the client GUI display 225 a listing of information regarding the user of the network 10 who created the link relationship 45 referenced by the listed hyperlink 1097. Selecting the link relationship publisher information selector 1087 displays to the user of the client GUI display 225 a listing of other link relationships 45 created by the user of the network 10 who created the link relationship 45 referenced by the listed hyperlink 1097. The user of the network 10 who created the link relationship 45 referenced by the listed hyperlink 1097 is located may be determined by the use of a special link relationship attribute defined for and assigned to the link relationship 45 referenced by the listed hyperlink 1097.

Figure 15A:
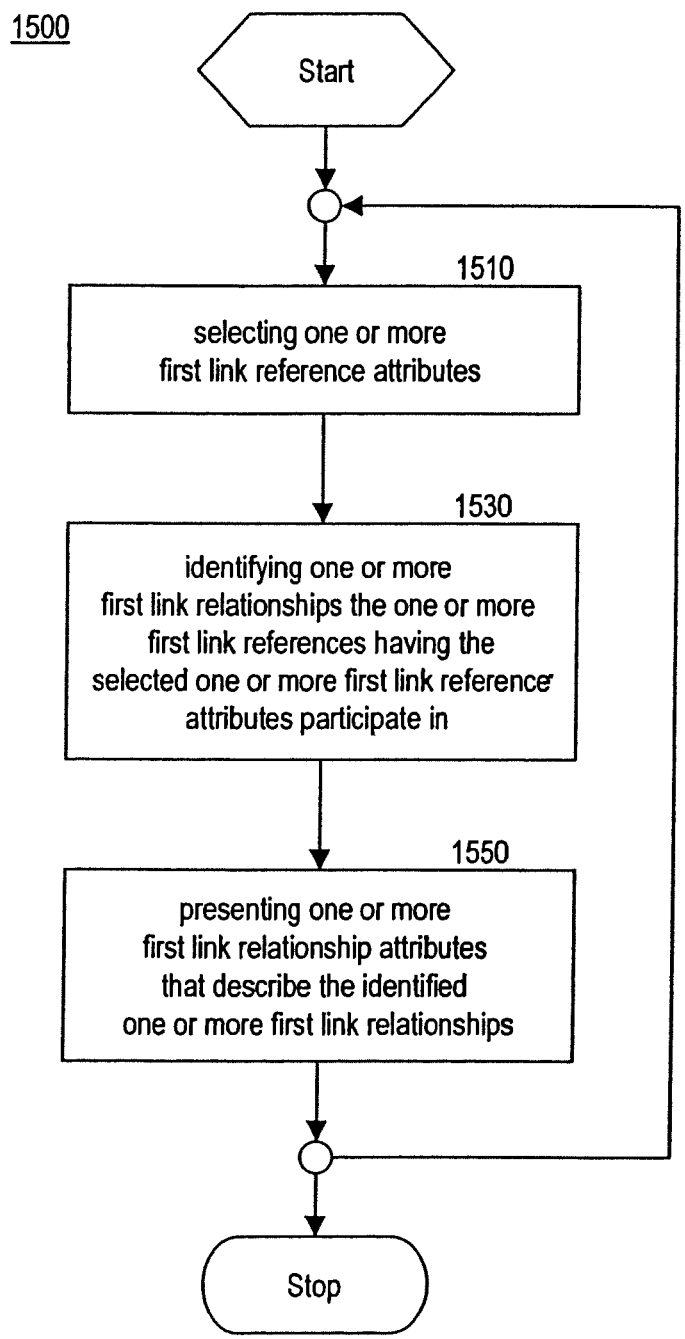
FIGS. 15a, 15b, and 15c are flowcharts illustrating a method for searching relationships among document objects on a network according to one embodiment of the invention.
Figure 15B:
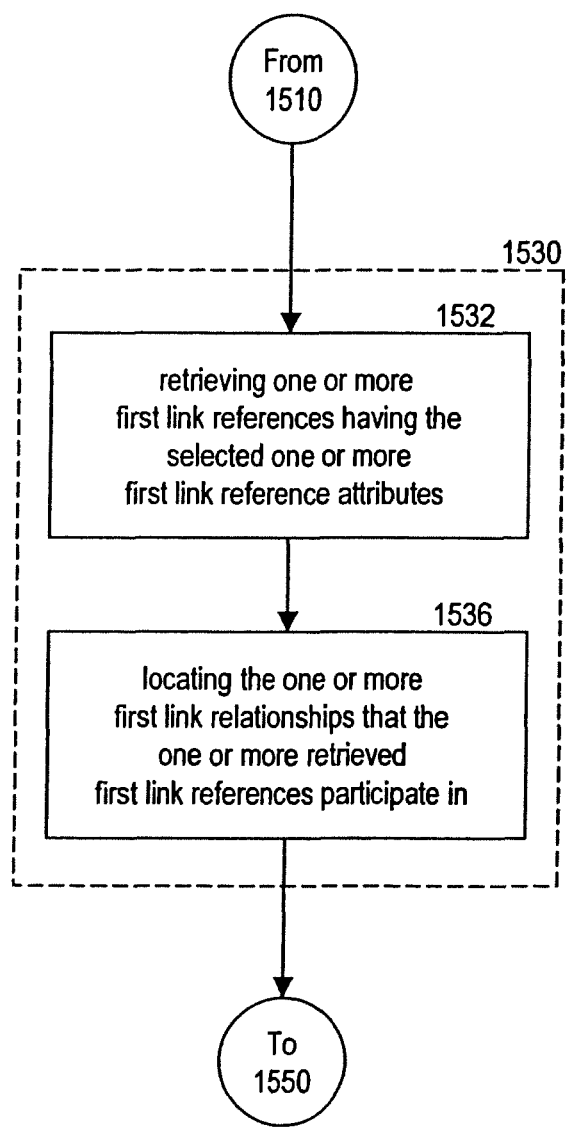
Figure 15C:
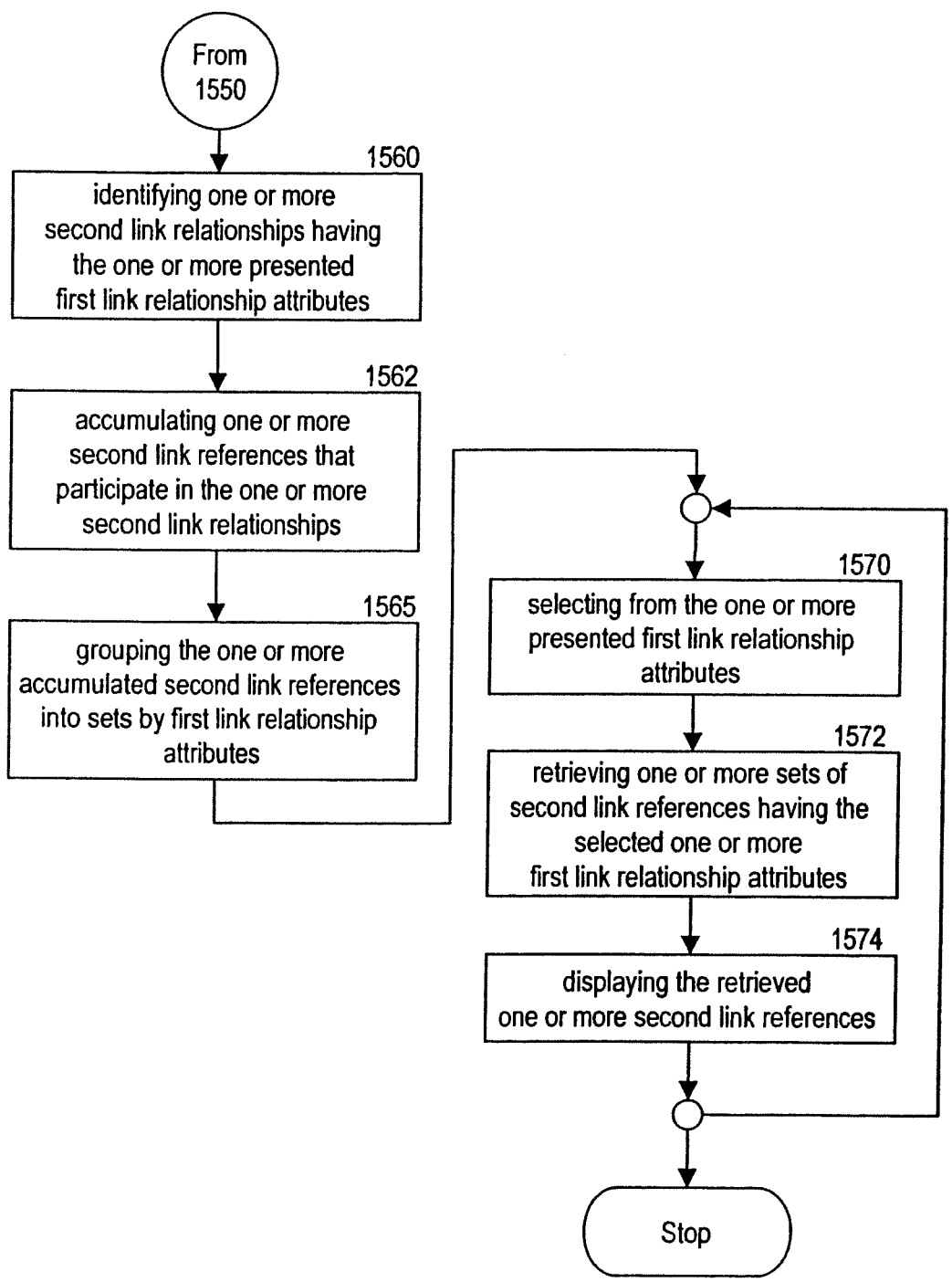

FIGS. 15a, 15b, and 15c are flowcharts illustrating a method 1500 for searching relationships among document objects 40, 50 on the network 10 according to one embodiment of the invention. The searches performed by the method 1500 may be conducted on link relationships 45 established between the document objects 40, 50. The results of the searches may be presented based upon link relationship attributes describing the link relationships 45 as well as other manners of presentation such as lists of document objects 40, 50.

The method 1500 shown in FIG. 15a includes a step for selecting one or more first link reference attributes (step 1510), wherein the one or more first link reference attributes describe one or more first link references 42 that represent one or more particular document objects 40. The method 1500 also includes a step for identifying one or more first link relationships 45 the one or more first link references 42 having the selected one or more first link reference attributes participate in (step 1530); and a step for presenting one or more first link relationship attributes that describe the identified one or more link relationships 45 (step 1550). The steps of the method 1500 shown in FIG. 15a may be repeated by selecting one or more other first link reference attributes (step 1510) after the step of presenting one or more first link relationship attributes (step 1550). The steps of the method 1500 shown in FIGS. 15a and 15b may also be repeated in a manner such that the one or more first link references attributes are the results of a search.

FIG. 15b shows steps of one embodiment of the method 1500. According to the embodiment shown in FIG. 15b, the step of identifying one or more first link relationships 45 (step 1530) includes further steps of retrieving one or more first link references 42 having the selected one or more first link reference attributes (step 1532); and a step of locating the one or more link relationships 45 that the one or more retrieved first link references 42 participate in.

FIG. 15c shows steps of one embodiment of the method 1500. The embodiment of the method 1500 shown in FIG. 15c includes the step of identifying one or more second link relationships 345 having the one or more presented first link relationship attributes (step 1560). The method 1500 shown in FIG. 15c proceeds with a step of accumulating one or more second link references 52 that participate in the one or more second link relationships 345 (step 1562), and a step of grouping the one or more accumulated second link references 52 into sets by first link relationship attributes (step 1565). In the grouping step (step 1565), each set of second link references 52 comprises one or more second link references 52 that participate in one or more first link relationships 45 having one of the one or more presented first link relationship attributes. In another embodiment of the method 1500, the grouping step (step 1565) operates to group the one or more accumulated second link references 52 into sets by first link relationship attributes in such a manner that each set includes only those one or more second link references 52 that have been assigned one of the one or more presented first link relationship attributes. In another embodiment, the step of identifying one or more second link relationships 345 (step 1560) may include a step of identifying only those one or more second link relationships 345 that include one or more of the one or more first link references 42.

The embodiment of the method 1500 shown in FIG. 15c also includes the step of selecting one or more of the one or more presented first link relationship attributes (step 1570); the step of retrieving one or more sets of second link references 52 having the selected one or more first link relationship attributes (step 1572); and the step of displaying the retrieved one or more second link references 52 (step 1574).

In one embodiment of the method 1500, the method 1500 may include the further step of displaying the one or more retrieved first link references 42 having the selected one or more first link reference attributes (not shown). In one embodiment, the method 1500 may also include steps for selecting one or more of the retrieved one or more second link references 52 and rendering for display the one or more document objects 50 represented by the selected one or more second link references 52 (not shown). The steps of the method 1500 shown in FIG. 15c may be repeated by selecting one or more other link relationship attributes (step 1570) after the step of displaying the retrieved one or more second link references 52 (step 1574).

Figure 16A:
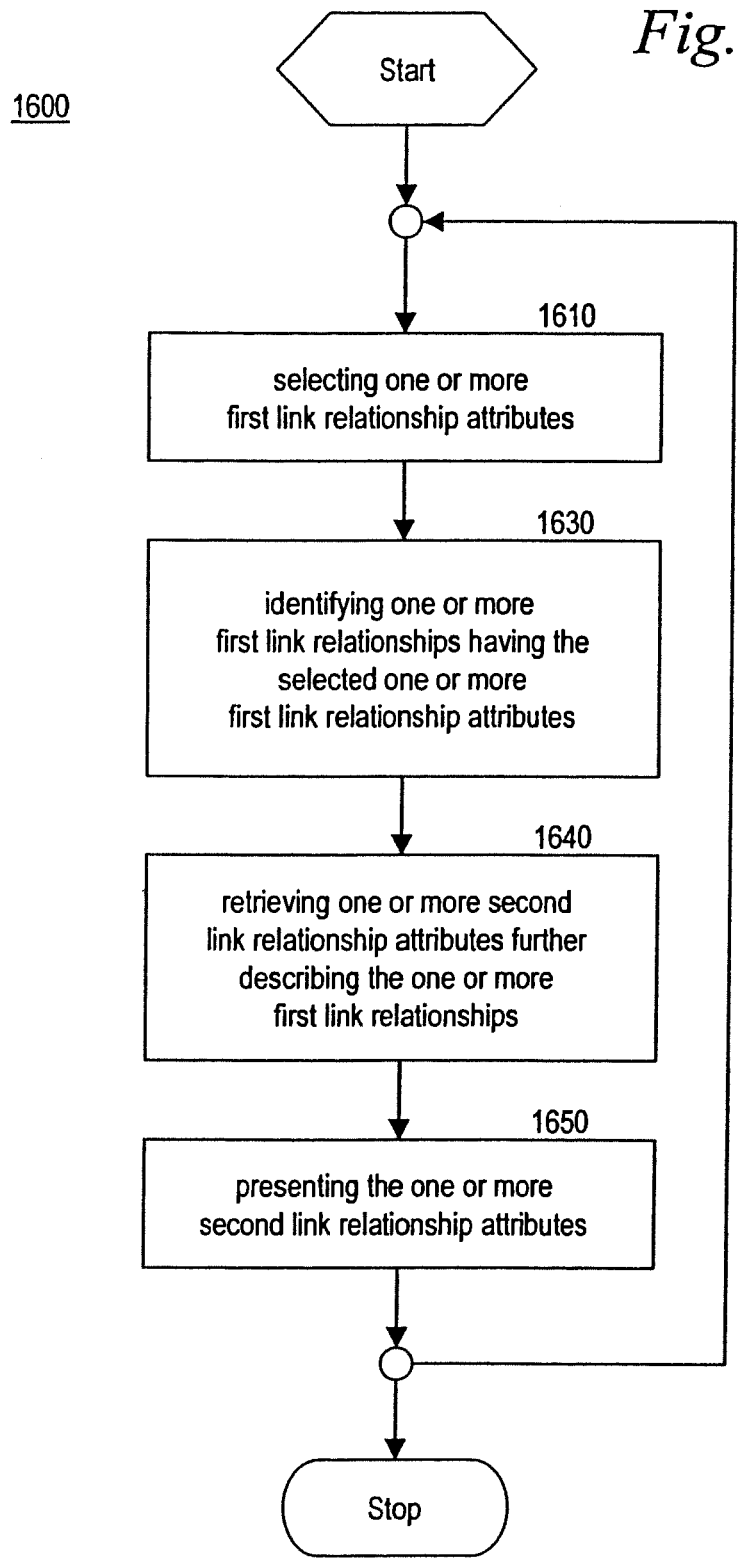
FIGS. 16a and 16b are flowcharts illustrating a method for searching relationships among document objects on a network according to one embodiment of the invention.
Figure 16B:
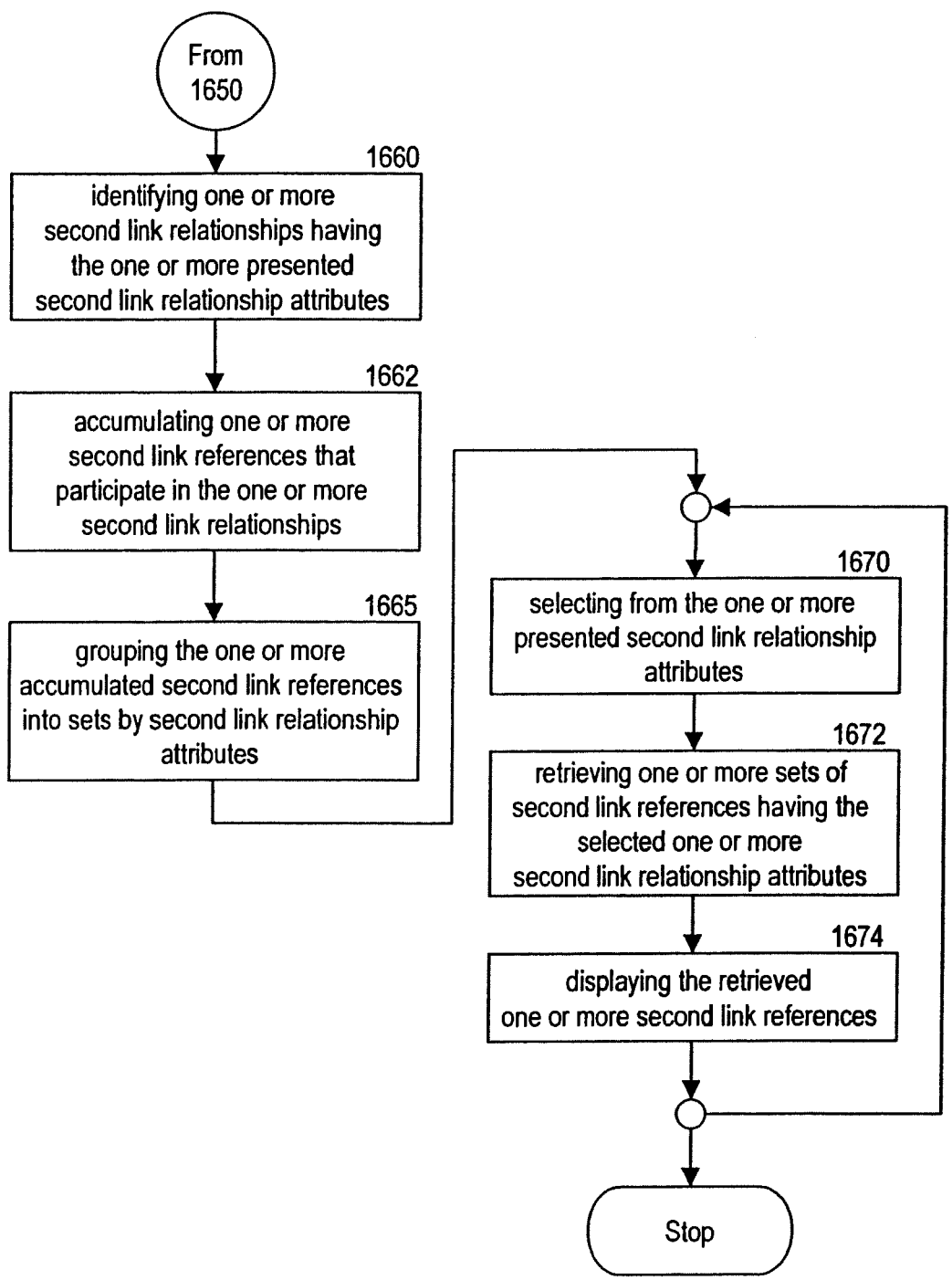

FIGS. 16a and 16b are flowcharts illustrating a method 1600 for searching relationships among document objects 40, 50 on the network 10 according to one embodiment of the invention. The searches performed by the method 1600 may be conducted on link relationships 45 established between the document objects 40, 50. The results of the searches performed by the method 1600 may be presented based upon link relationship attributes of the link relationships 45 or other methods of presentation. The method 1600 shown in FIG. 16a includes a step of selecting one or more first link relationship attributes (step 1610); a step of identifying one or more first link relationships 45 having the selected one or more first link relationship attributes (step 1630); a step of retrieving one or more second link relationship attributes further describing the one or more first link relationships 45 (step 1640); and a step of presenting the one or more second link relationship attributes (step 1650). The steps of the method 1600 shown in FIG. 16a may be repeated by selecting one or more other first link relationship attributes (step 1610) after the step of presenting the one or more second link relationship attributes (step 1650). The steps of the method 1600 shown in FIG. 16a may also be repeated in a manner such that the one or more first link relationships 45 are the results of a search.

FIG. 16b shows additional steps of one embodiment of the method 1600. The embodiment of the method 1600 shown in FIG. 16b includes a step of identifying one or more second link relationships 345 having the one or more presented second link relationship attributes (step 1660). The method 1600 shown in FIG. 16b proceeds with a step of accumulating one or more second link references 52 that participate in the one or more second link relationships 345 (step 1662), and a step of grouping the one or more accumulated second link references into sets by second link relationship attributes (step 1665). In the grouping step (step 1665), each set of second link references 52 comprises one or more second link references 52 that participate in one or more second link relationships 345 having one of the one or more presented second link relationship attributes. In another embodiment of the method 1600, the grouping step (step 1665) operates to group the one or more accumulated second link references 52 into sets by second link relationship attributes in such a manner that each set comprises only those one or more second link references 52 that have been assigned one of the one or more presented second link relationship attributes. The embodiment of the method 1600 shown in FIG. 16*b* may further include a step of displaying the one or more sets of the one or more accumulated first link references 42 (not shown).

In one embodiment of the method 1600, the method 1600 may further include a step of retrieving one or more second link reference attributes describing the one or more accumulated second link references 42 (not shown); and a step of displaying the one or more retrieved second link reference attributes (not shown). In one embodiment of the method 1600, as shown in FIG. 16*b*, the method 1600 may further include a step of selecting from the one or more presented second link relationship attributes (step 1670); a step of retrieving one or more accumulated second link references 52 having the selected one or more second link relationship attributes (step 1672); and a step of displaying the retrieved one or more second link references 52 (step 1674).

In one embodiment, the method 1600 may also include steps for selecting one or more of the retrieved one or more second link references 52 and rendering for display the one or more document objects 50 represented by the selected one or more second link references 52 (not shown). The steps of the method 1600 shown in FIG. 16*b* may be repeated by selecting one or more other second link relationship attributes (step 1670) after the step of displaying the retrieved one or more second link references 52 (step 1674).

Figure 17A:
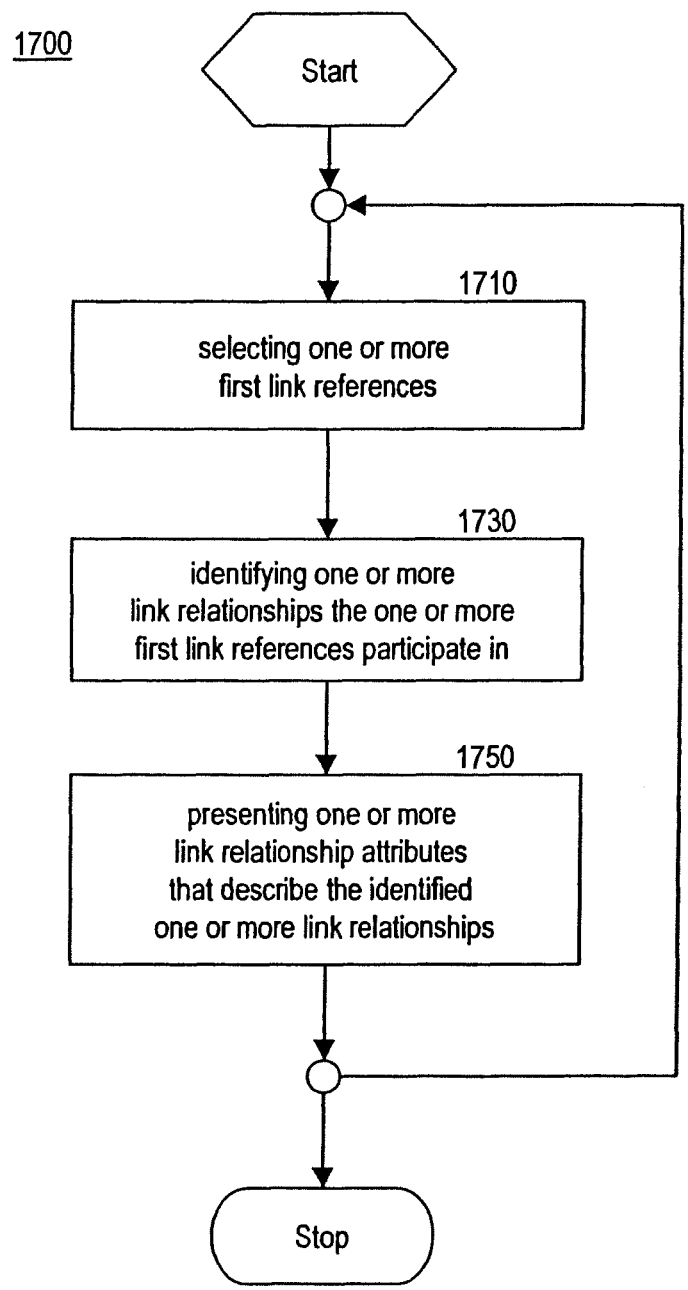
FIGS. 17a and 17b are flowcharts illustrating a method for searching relationships among document objects on a network according to one embodiment of the invention.
Figure 17B:
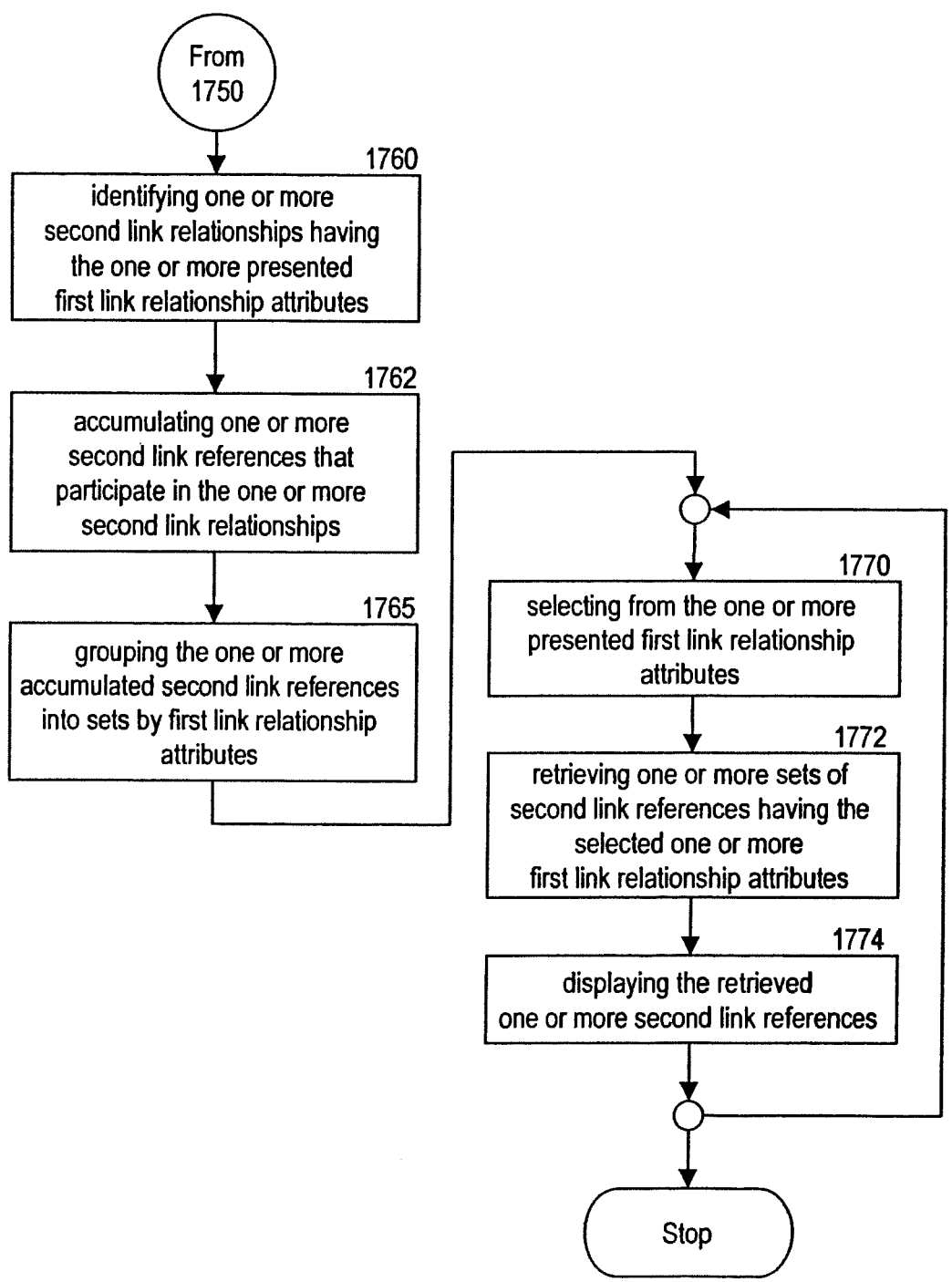

FIGS. 17*a* and 17*b* are flowcharts illustrating a method 1700 for searching relationships among document objects 40, 50 on the network 10 according to one embodiment of the invention. The searches performed by the method 1700 may be conducted on link relationships 45 established between the document objects 40, 50. The results of the searches performed by the method 1700 may be presented based upon link relationship attributes of the link relationships 45 or other methods of presentation. The method 1700 shown in FIG. 17*a* includes a step of selecting one or more first link references 42 (step 1710); a step of identifying one or more first link relationships 45 that the selected one or more first link references 42 participate in (step 1730); and a step of presenting one or more first link relationship attributes that describe the identified one or more first link relationships 45 (step 1750). The steps of the method 1700 shown in FIG. 17*a* may be repeated by selecting one or more other first link references (step 1710) after the step of presenting one or more link relationship attributes (step 1750). The steps of the method 1700 shown in FIG. 17*a* may also be repeated in a manner such that the one or more first link references 42 are the results of a search.

FIG. 17*b* shows additional steps of one embodiment of the method 1700. The embodiment of the method 1700 shown in FIG. 17*b* may include a step of identifying one or more second link relationships 345 having the one or more presented first link relationship attributes (step 1760). The method 1700 shown in FIG. 17*b* proceeds with a step of accumulating one or more second link references 52 that participate in the one or more second link relationships 345 (step 1762), and a step of grouping the one or more accumulated second link references 52 into sets by first link relationship attributes (step 1765). In the grouping step (step 1765), each set of second link references 52 comprises one or more second link references 52 that participate in one or more first link relationships 45 having one of the one or more presented first link relationship attributes. In another embodiment of the method 1700, the grouping step (step 1765) operates to group the one or more accumulated second link references 52 into sets by first link relationship attributes in such a manner that each set includes only those one or more second link references 52 that have been assigned one of the one or more presented first link relationship attributes. In another embodiment, the step of identifying one or more second link relationships 345 (step 1760) may include a step of identifying only those one or more second link relationships 345 that include one or more of the one or more first link references 42.

One embodiment of the method 1700 may include a step of retrieving one or more first link reference attributes describing the selected one or more first link references 42 (not shown). One embodiment of the method 1700 shown in FIG. 17*b* may further include a step of displaying the one or more retrieved first link reference attributes (not shown).

In one embodiment of the method 1700, as shown in FIG. 17*b*, the method 1700 may further include a step of selecting from the one or more presented first link relationship attributes (step 1770); a step of retrieving one or more sets of the one or more second link references 52 having the selected one or more first link relationship attributes (step 1772); and a step of displaying the retrieved one or more second link references 52 (step 1774).

The steps of the method 1700 shown in FIG. 17*b* may be repeated by selecting from the one or more presented first link relationship attributes (step 1770) after the step of displaying the retrieved one or more second link references 52 (step 1774).

In one embodiment of the method 1700, the step of retrieving the one or more second link references 52 (step 1772) includes a step of retrieving those one or more second link references 52 that participate in one or more of the identified first link relationships 45 that the selected first link references 42 participate in (not shown).

In one embodiment of the method 1700, the step of selecting one or more first link references 42 (step 1710) may include a step of rendering for display on the client device 20 the one or more document objects 40 represented by the selected one or more first link references 42 (not shown). In one embodiment, the method 1700 may also include steps for selecting one or more of the retrieved one or more second link references 52 and rendering for display the one or more document objects 50 represented by the selected one or more second link references 52 (not shown).

FIGS. 18*a* through 18*g* illustrate one example set of screen views of a user interface 1800, 1810, 1820, 1830, 1840, 1850, 1860 for navigating, searching and presenting link relationships 45 between document objects 40, 50 located on the network 10, link relationships 45 between link references 42, 52 that represent the document objects 40, 50, link relationships 45 of link relationship attributes describing the link relationships 45, and link relationships 45 of link reference attributes describing the link references 42, 52 that participate in link relationships 45 according to one embodiment of the invention. The embodiment of the example user interface shown in FIGS. 18*a* through 18*g* are directed to computing and communication devices possessing limited display space, including but not limited to handheld computers, personal digital assistants ("PDAs") and intelligent wireless phones.

The user interface illustrated in FIGS. 18a through 18g includes a highlight feature and includes a select feature for highlighting or selecting one or more entries on the user interface screens 1800, 1810, 1820, 1830, 1840, 1850, 1860.

Figure 18A:
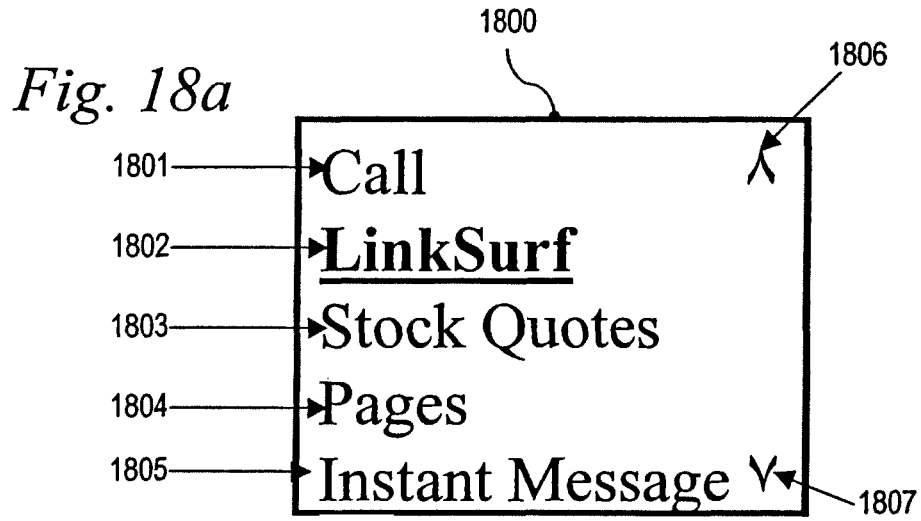
FIGS. 18a, 18b, 18c, 18d, 18e, 18f, and 18g are example screen views of a user interface for presenting and searching relationships among document objects located on a network according to one embodiment of the invention.

FIG. 18a shows one embodiment of the example user interface screen 1800 for a handheld device such as a wireless phone, PDA or handheld computer, wherein the example user interface screen 1800 displays the handheld device's primary service menu 1800. The primary service menu 1800 includes one or more menu entries 1801, 1802, 1803, 1804, 1805 corresponding to functions that may be performed by the handheld device. The primary service menu 1800 may also include a scroll up icon 1806 and a scroll down icon 1807 that enable the user to scroll the screen display 1800 through additional menu entries that are not currently displayed on the primary service menu screen 1800 due to display size limitations. To perform the methods 1500, 1600, and 1700 of the invention, the user of the handheld device may select a LinkSurf menu option 1802 to begin accessing one or more link relationships 45. Selection of the LinkSurf menu option 1802 initiates an embodiment of the client tool 220 on the handheld device, making the handheld device a client device 20 in the system 100. Selection of the LinkSurf menu option 1802 also serves to authenticate the user of the handheld device 20 as a permitted user of the one or more link directories and engages one of the user profiles 230, 332 defined for the user of the handheld device 20.

Figure 18B:
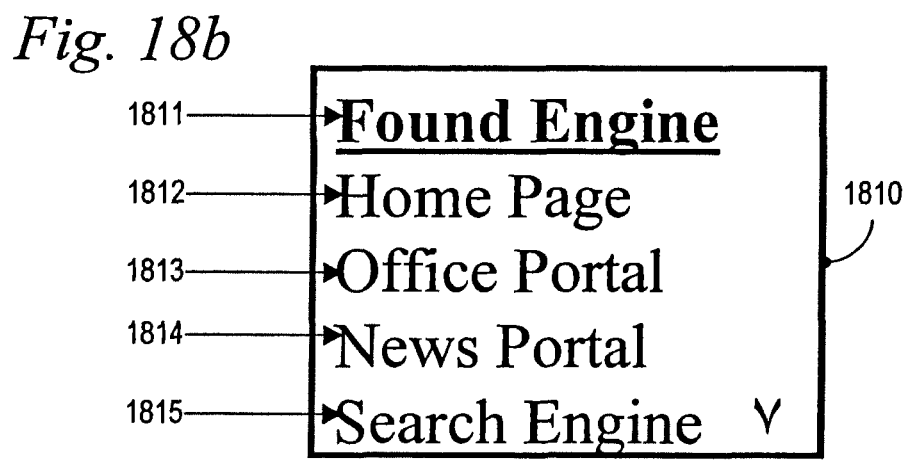

FIG. 18b shows one embodiment of an example user interface screen 1810 for a handheld device 20. The example user interface screen 1810 displays a LinkSurf options menu 1810. In the LinkSurf options menu 1810, the user is offered a link directory search option (or "found engine function") 1811 and a list of link references 42, 52, displayed as menu items, 1812, 1813, 1814, 1815, to preferred document objects 40, 50, such as Internet portal sites or search engines. Activation by the user of any of these selections will enable the user to begin navigation or search of document objects 40, 50 on the network 10 utilizing link relationships 45. In the example shown in FIG. 18b, the user selects the found engine function 1811 and the handheld device 20 proceeds to display a screen shown in FIG. 18c. The found engine function 1811 provides access to the methods 1500, 1600 and 1700, to locate document objects 40, 50 on the network 10 that may be referenced in the link directories 35 to which the user has subscribed.

The found engine function 1811, through the methods 1500, 1600, and 1700, allows the user to find document objects 40, 50 referenced in the one or more link directories 35, using search techniques based on the link reference attributes of link references 42, 52 to the document objects 40, 50, These search techniques may serve to narrow the presented selections. However a benefit of the found engine function 1811, and the methods 1500, 1600, and 1700, is that while users of client devices 20 may be navigating (i.e., viewing and selecting) document objects 40, 50 using attributes of the link references 42,52, the client tool 220, in communication with the one or more servers 30, may simultaneously retrieve from the one or more link directories 35 one or more link relationships 45, related to the narrowing list of link references 42, 52 that may not be constrained by the selected link reference attributes of the link reference 42,52. In addition, the found engine function 1811, through the methods 1500, 1600, and 1700, may also return corresponding lists of one or more link references 42, 52 to document objects 40, 50, to which other users have found and assigned link relationship attributes describing why the document objects 40, 50 are related to the document object 50, 40 being viewed by a user.

Figure 18C:
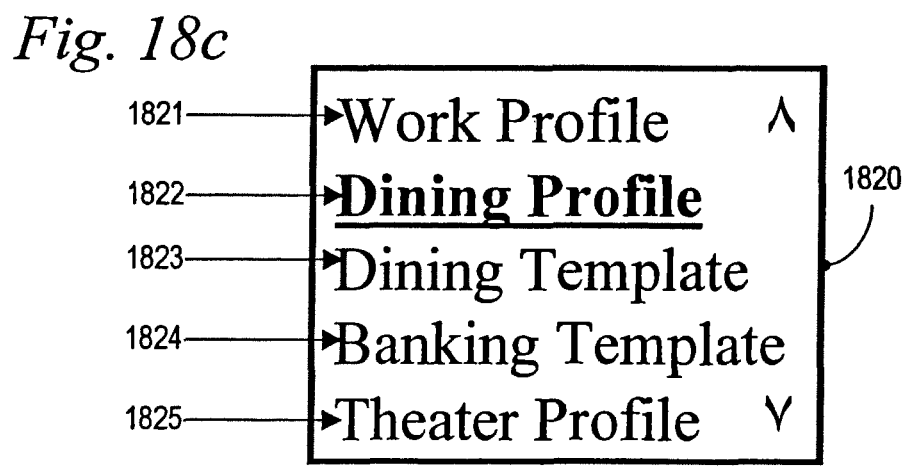

FIG. 18c shows one embodiment of an example user interface screen 1820 for a handheld device 20. The example user interface screen 1820 displays a list of one or more user profile menu entries 1821, 1822, 1823, 1824, 1825 corresponding to defined user profiles 230, 332 for the user of the handheld device 20. The user of the handheld device 20 selects one or more user profile menu entries 1822, corresponding to one or more user profiles 230, 332, which specify one or more link directories 35, and the system 100 applies filters using the link reference attributes and link relationship attributes defined in the selected one or more user profiles 230, 332 against the link reference attributes and link relationship attributes of the link references 42, 52 and link relationships 45 stored in the one or more link directories 35 associated with the selected one or more user profiles 230, 332.

In a search according to methods 1500, 1600, and 1700, the user may desire that the selected user profile 332 apply different filters to the returned list of link reference attributes than to the returned list of link relationship attributes. In one embodiment of user profile selection interface 1820, selection of a user profile 332 may include customizing a user profile template by selection of one or more link reference attributes or link relationship attributes, or values of the link reference attributes and link relationship attributes that will cause the template to enable search of one or more appropriate link directories 35 and provide for filtering the link reference attributes and link relationship attributes. For example, entering a zip code and range into a dining user profile 332 may configure a template to only engage link directories 35 that contain link references 42, 52 to document objects 40, 50 relevant to dining in the geographical area defined by the entered zip code, and therefore instruct the system 100 to present to the user only link references 42, 52 for document objects 40, 50 that pertain to locations within the specified range of the entered zip code, as determined by attributes of the link references 42, 52. When the user of the handheld device 20 has selected one or more user profile entries from the listed user profile entries 1821, 1822, 1823, 1824, and 1825, the handheld device 20, in communication with the one or more link directories 35 and one or more servers 30, performs the methods 1500, 1600, and 1700 to search the link directories 35, and displays a user interface as shown in FIGS. 18d, 18e, 18f, and 18g.

Figure 18D:
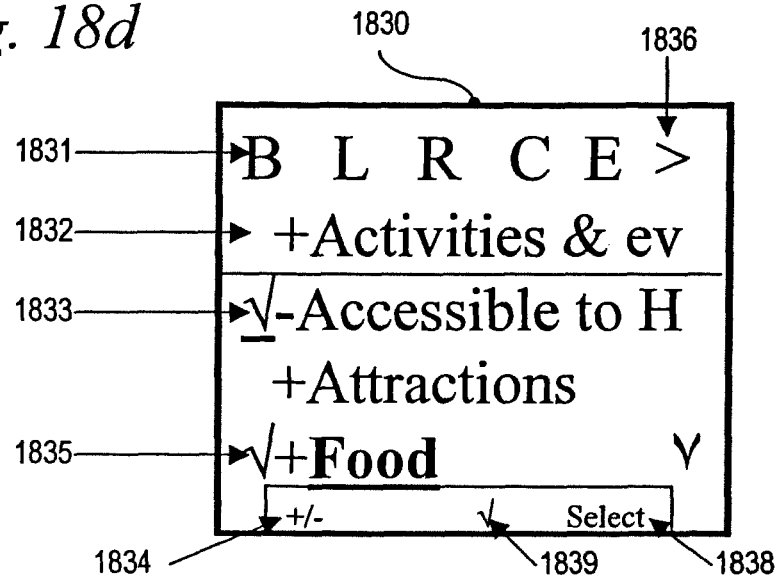

FIG. 18d shows one embodiment of an example user interface screen 1830 for a handheld device 20. The example user interface screen 1830 displays a list of icons representing defined link relationship attribute types 1831 in the first line of the user interface screen 1830. In the example shown in FIG. 18d, the icons representing defined link relationship attribute types 1831 shown, "B," "L," "R," "C," and "E" denote link relationship attributes that may include Banks, Libraries, Restaurants, Competitors, and Events, respectively. Many other link relationship attribute types and icons may be used with this embodiment. In the example shown in FIG. 18d, the first line of the user interface screen 1830 further includes a scroll arrow 1836 enabling the user to scroll through the list of icons representing defined link relationship attribute types 1831 where the list is longer than the size of the screen permits display of. The example user interface screen 1830 further displays a list of menu entries 1832, 1833, and 1835 representing defined link reference attribute types in each successive line of the user interface screen 1830. The list of link relationship attribute types 1831 and link reference attribute types 1832, 1833, 1835 are derived from the link relationship attributes and link reference attributes defined for the selected one or more user profiles 230, 332 corresponding to the selected one or more user profile menu entries 1822 from FIG. 18*c*. A user of the handheld device 20 may highlight one (food 1835) of the one or more link reference attribute types 1832, 1833, 1835, on the example user interface screen 1830 and, in so doing, initiate a search of link relationships 45 having the highlighted link reference attribute food 1835. The results of the initiated search of link relationships causes the example user interface screen 1830 to display a new list of link relationship attribute types 1831 in the first line of the example user interface screen 1830, wherein the new list of link relationship attribute types 1831 represents the link relationship attribute types that have the highlighted link reference attribute food 1835 and the highlighted link reference attribute accessible to handicapped 1833.

The user interface illustrated in FIG. 18*d* includes a highlight feature and includes a select feature for highlighting or selecting one or more entries on the user interface screen 1830.

The plus and minus symbols in front of each link reference attribute type 1832, 1833, 1835, indicate whether there may be a plurality of selectable values or selectable subordinate link reference attributes for the listed link reference attributes 1832, 1833, 1835. A check mark appearing in front of the link reference attribute types 1833 and 1835 indicates that the link reference attributes 1833 and 1835 have been selected by the user. In the example user interface screen 1830, the bold-font check mark in front of the link reference attribute type 1833 indicates that the link reference attribute of accessible to handicapped 1833 has been selected. In the example user interface screen 1830 the plain-font check mark in front of the link reference attribute type 1835 indicates that a subordinate link reference attribute or value of the link reference attribute of food 1835 has been selected.

In the example user interface screen 1830 the user may select a "+/−" symbol 1834 or depress a button below the "+/−" symbol 1834 at the bottom of the example user interface screen 1830 to expand the highlighted link reference attribute 1835 to display any subordinate link reference attributes, or available values of the highlighted link attribute 1835, for further highlighting and selection. The user may also select a check mark icon 1839 or depress a button below the check mark icon 1839 at the bottom of the example user interface screen 1830 to create a check mark beside the highlighted link reference attribute 1835, and thereby indicate the user's desire to include all possible link reference attribute values and subordinate link reference attribute values in subsequent presentations of link references 42, 52.

In the example user interface screen 1830 shown in FIG. 18*d*, a check mark displayed with an underline or other highlighting mark in front of the "Accessible to the handicapped" link reference attribute entry 1833 indicates to the user that the "Accessible to the handicapped" link reference attribute entry 1833, and all its subordinate link reference attributes and values, have been selected for further search and display. In one embodiment of the user interface screen 1830, if there is only a subordinate link reference attribute, or its value, selected, the check mark is not highlighted to the user, and the user must use the "+/−" symbol 1834 to expand that view of link reference attribute entries 1832, 1833, 1835 to determine what subordinate link reference attribute, or its value, is selected.

In the embodiment shown in FIG. 18*d*, the list of icons representing available link relationship attribute types 1831, corresponding to the selected and highlighted link reference attributes 1833 and 1835, are presented in the first line of the user interface screen 1830. Selecting one or more of the listed link reference attribute types 1832, 1833, 1835, causes the system 100 to: retrieve link references 42, 52 having the selected link reference attributes 1833 and 1835, filter the retrieved link references 42, 52 according to the selected user profile 332, and return the retrieved link references 42, 52 for presentation as shown in the example user interface screen of FIG. 18*e*. Selection of one of the listed link reference attribute types 1832, 1833, 1835, may be accomplished by highlighting one (food 1835) of the listed link reference attribute types 1832, 1833, 1835 and activating the select icon 1838 or button on the handheld device 20 corresponding to the select icon 1838. The user interface screen 1830 also permits the user to highlight and select one of the list of icons representing defined link relationship attribute types 1831 in the first line of the user interface screen 1830. Selecting one of the list of icons representing defined link relationship attribute types 1831 causes the system 100, using the methods 1500, 1600, and 1700, to search the link directories 35 to retrieve link references 42, 52 that may be associated with the selected link relationship attribute type indicator.

Figure 18E:
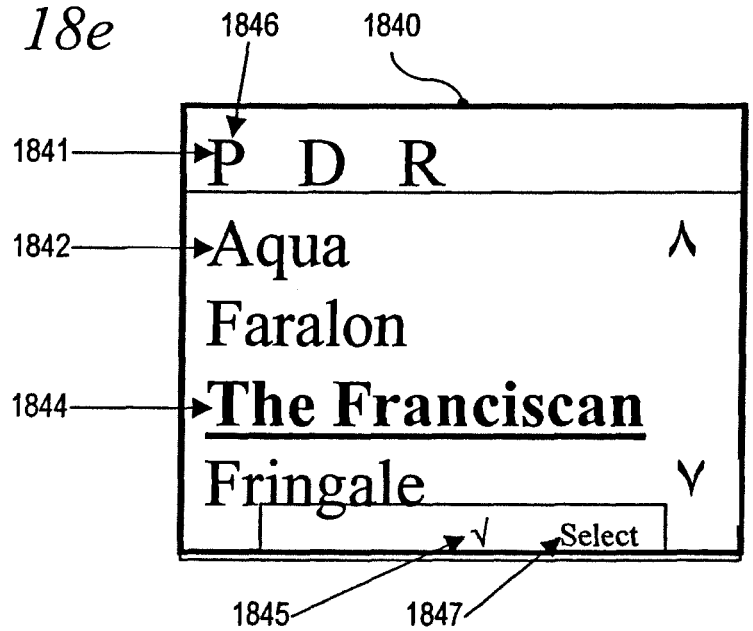

FIG. 18*e* shows one embodiment of an example user interface screen 1840 for a handheld device 20. The example user interface screen 1840 displays a list of icons ("P," "D," and "R" in the example shown) representing defined link relationship attribute types 1841 in the first line of the user interface screen 1840. The example user interface screen 1840 further displays a list of menu entries of restaurant names 1842, 1844, representing retrieved link references 42, 52 in each successive line of the user interface screen 1840. When the user of a handheld device 20 highlights one of the one or more link reference entries 1842, 1844, the one or more link directories 35 are queried for link relationships 45 that the link reference 42, 52 corresponding to the highlighted link reference entries 1844 participate in. Based on the results of the search for link relationships 45, the icons representing defined link relationship attribute types 1841 that the highlighted link reference 42, 52 participates in are presented in the first line of user interface screen 1840 as shown in FIG. 18*e*. The user may also select a check mark icon 1845 or depress a button below the check mark icon 1845 at the bottom of the example user interface screen 1840 to create a check mark beside the highlighted link reference 1844, and thereby indicate the user's desire to include all such selected (or checked) and highlighted link references 42, 52 in subsequent queries of link relationships 45.

The user interface illustrated in FIG. 18*e* includes a highlight feature and includes a select feature for highlighting or selecting one or more entries on the user interface screen 1840.

Selection of one of the listed link references 1842, 1844 for viewing may be accomplished by highlighting one ("The Franciscan" 1844) of the listed link references 1842, 1844 and activating the select icon 1847 or button on the handheld device 20 corresponding to the select icon 1847.

The list of link relationship attribute types 1841 is retained at the top of the user interface screen 1840 to indicate to the user the types of link relationships 45 that the highlighted link reference 42, 52 in the list of restaurant names 1842, 1844 representing retrieved link references 42, 52 participates in. However, in the example shown in FIG. 18*e*, the "P" symbol 1846 indicates that the highlighted link reference 42, 52 in the list of restaurant names 1842, 1844 participates in link relationships 45 to document objects 50 created by publishers of the document objects 50, i.e., a publisher link. Indicating publisher links in the above manner allows users publishing document objects 50 to present link references 52 to the published document objects 50 without embedding a link reference 52 in the publishing user's document object 50. This manner of presenting link relationship attributes provides an opportunity to save screen display real estate in the size-constrained formats of handheld devices, and enables users of the system 100 to target link references 42, 52 to users that possess certain attributes determined by the publishing user.

Figure 18F:
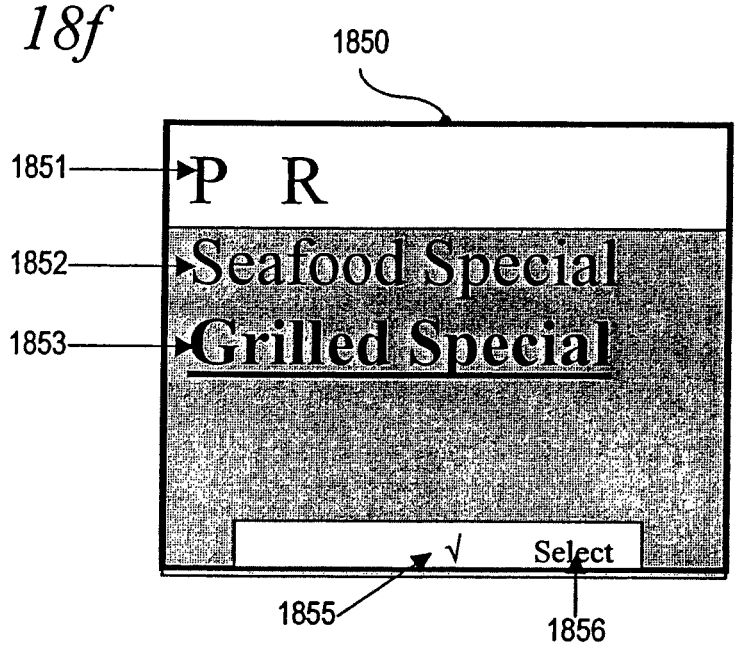
Figure 18G:
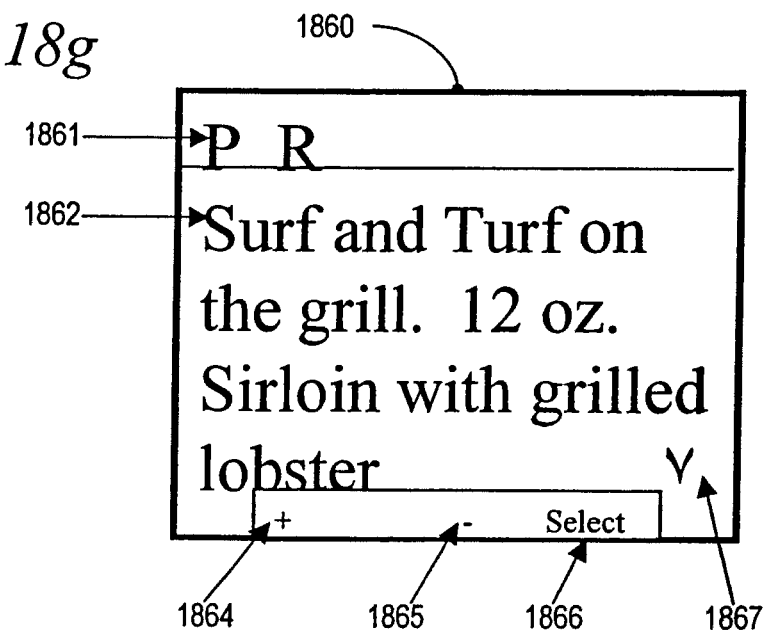

If the user of a handheld device 20 with a user interface display 1840, as in the example of FIG. 18e, highlights a link reference 42, 52 and presses a button below the word "select" 1847 at the bottom of the user interface screen 1840, the document object 40, 50 associated with the link reference 42, 52 may be presented in the display of the handheld device 20 (as shown in FIG. 18g) along with a link relationship attribute type 1841 for the link relationships 45 that the document object 40, 50 participates in.

If the user highlights a link relationship attribute 1841 and presses the button below the word "select" 1847 at the bottom of the user interface screen 1840, the user may be presented with one or more link references 42, 52 associated with the highlighted link relationship attribute type 1841. In the example shown in FIG. 18e, the user has selected the link relationship attribute type indicator 1846 that represents available publisher link relationships 45 and the methods 1500, 1600, 1700 display a new user interface screen as shown in FIG. 18f. Alternatively, the list of link relationship attribute types 1841 may be narrowed by selecting more than one link reference 42, 52. In the example user interface display 1840 more than one link reference entries 1842, 1844 may be selected by applying check marks to a plurality of highlighted link reference entries 1842, 1844.

FIG. 18f shows one embodiment of an example user interface screen 1850 for a handheld device 20. The example user interface screen 1850 displays a list of icons representing defined link relationship attribute types 1851 in the first line of the user interface screen 1850. The example user interface screen 1850 further displays a list of menu entries 1852, 1853, representing retrieved link references 42, 52 in each successive line of the user interface screen 1850. In the example shown in FIG. 18f, the list of menu entries 1852 and 1853 display publisher link references 42, 52 to the user as a result of the user highlighting the link relationship attribute type indicator 1846 that represents available publisher link relationships 45 and selecting the link reference entry 1844 in the user interface display 1840 of FIG. 18e. The link relationship attribute type list 1851 is retained at the top of the user interface screen 1850 to indicate the existence of link relationships 45 that the highlighted link reference entry 1853 participates in. If the user of the handheld device 20 selects the highlighted link reference entry 1853, the system 100 displays the user interface screen 1860 of FIG. 18g to the user of the handheld device 20. If a plurality of the link reference entries 1842, 1844 are highlighted and more than one publisher link is returned, the publisher link references 42,52 will be associated with the corresponding link reference entries 1842, 1844 (not shown).

The user interface illustrated in FIG. 18f includes a highlight feature and includes a select feature for highlighting or selecting one or more entries on the user interface screen 1850.

Selection of one of the listed link references 1852, 1853 for viewing may be accomplished by highlighting one ("Grilled Special" 1853) of the listed link references 1852, 1853 and activating the select icon 1856 or button (not shown) on the handheld device 20 corresponding to the select icon 1856. The user may also select a check mark icon 1855 or depress a button (not shown) below the check mark icon 1855 at the bottom of the example user interface screen 1850 to create a check mark beside the highlighted link reference 1853, and thereby indicate the user's desire to include all such selected (or checked) and highlighted link references 42, 52 in subsequent queries of link relationships 45.

FIG. 18g shows one embodiment of an example user interface screen 1860 for a handheld device 20. The example user interface screen 1860 displays a list of icons representing defined link relationship attribute types 1861 in the first line of the user interface screen 1860. Various other items may be used to represent the defined link relationship attribute types 1861. The example user interface screen 1860 further displays a document object 50 associated with the link reference entry 1853 highlighted and selected in the user interface screen 1840 of FIG. 18f. In the embodiment of the user interface screen 1860 shown in FIG. 18g, the user of the handheld device 20 may view document objects 40, 50. Simultaneously, the user may be presented with a list of link relationship attribute types 1861 indicating that the viewed document objects 40, 50 participate in one or more link relationships 45 having link relationship attributes of the types indicated in the list of link relationship attribute types 1861. The user interface illustrated in FIG. 18g includes a highlight feature and includes a select feature for highlighting or selecting one or more entries on the user interface screens 1860, 1850. Selection of another of the link references 1852, 1853, as listed in the user interface screen 1850, for viewing may be accomplished without returning to the user interface screen 1850 by activating the + or − icon 1864 or 1865 or a button on the handheld device 20 corresponding to the + or − icon 1864 or 1865.

The user may also highlight a hyperlink embedded within the displayed document object 40 (not shown) and activate the select icon 1866 or button on the handheld device 20 corresponding to the select icon 1856. Upon selection, the one or more link directories 35 are queried using the network address (or URL) of the highlighted hyperlink for link relationships 45 that the highlighted hyperlink (not shown) 1844 participates in.

Figure 19:
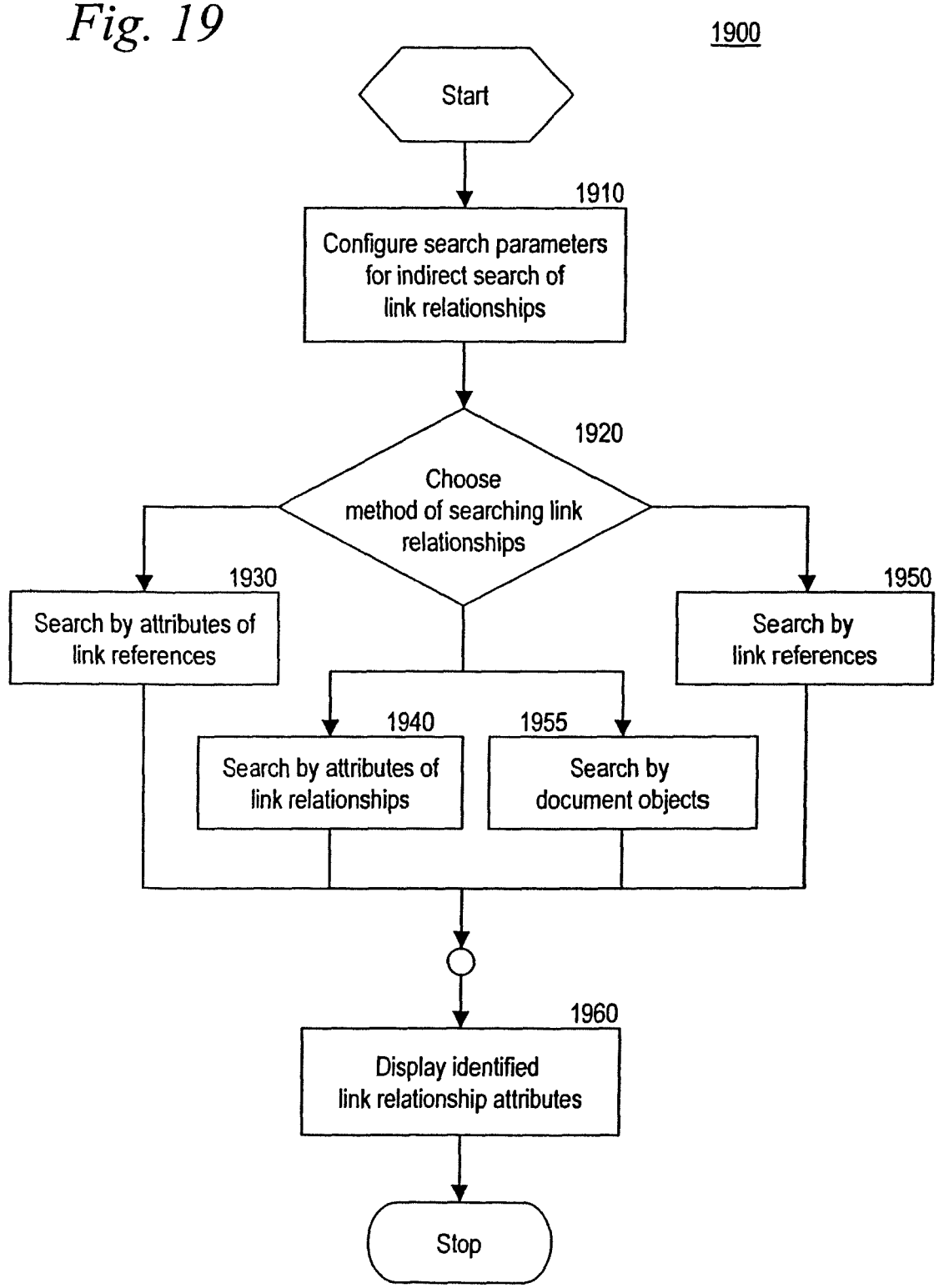
FIG. 19 is a flowchart illustrating a method for searching relationships among document objects on a network according to one embodiment of the invention.

FIG. 19 is a flowchart illustrating a method 1900 for searching relationships, typically established document object relationships 45, on the network 10 according to one embodiment of the invention. The method 1900 enables a user of a client device 20 to determine which of the methods 1500, 1600, and 1700, or combination of those methods or other methods, the user wishes to utilize in an indirect search for document objects 40, 50 on the network 10. The search makes use of relationships, usually link relationships 45, established between link references 42, 52 to the document objects 40, 50. The method can improve the user's search by simultaneously presenting the user with additional selections of link references 42, 52 in the context of their relationship to document objects 40, 50, where the document objects 40, 50 may be of interest to the user based on the user's currently selected search items.

Often at the outset of a search for document objects 40, 50, a user may not perceive which document object 40, 50 may satisfy the user's search, where the document object 40, 50 is located, the path to access the document object 40, 50, or who offers the document object 40, 50. Therefore, a user may be required to perform an indirect search. Commonly called browsing, an indirect search may be considered a search in which a user views multiple document objects in search of a satisfactory document object 40, 50 or a reference to a satisfactory document object 40, 50. Such browsing may be considered an indirect search that often begins with a document object 40, 50 that the user is familiar with. An indirect search relies on the user selecting and viewing referenced document objects 40, 50. The method 1900 allows the user to perform such an indirect search by searching and selecting the link relationships 45 between document objects 40, 50.

The method 1900 includes a step of configuring parameters of the user's desired indirect search of the link relationships 45 (step 1910). The step of configuring search parameters (step 1910) enables a user to select a frame of reference (i.e., an original context) from which to begin the search of document objects 40, 50 related by link relationships 45 stored in the link directories 35. In one embodiment of the invention, the step of configuring search parameters (step 1910) may include selecting a user profile 230, 332 that defines link relationship attributes and link reference attributes that may be interest of to the user in processing the steps of the user's search. The selected user profile 230, 332 may be applied as a filter to narrow a first list of search items from which to begin the search. The step of configuring search parameters (step 1910) may also include selecting one or more link directories 35 in which to search the link relationships 45 and link references 42, 52. This is an additional or optional step, and it may be skipped or eliminated in other embodiments of the method 1900.

The method 1900 may also include a step of choosing a method, or path, by which to search the link directories 35 (step 1920) for link references 42, 52, related by link relationships 45, to the document objects 40, 50 of interest to the user. The step of choosing a method of searching (step 1920) may include allowing a user to select a first list of search items upon which to begin the search of the link directories 35, where the first list of search items may include link references 42, 52, link reference attributes, or link relationship attributes. The first list of search items may, in one embodiment of the invention, include one or more document objects 40, 50, whereby the method 1900 may proceed in a manner similar to the method 700 described above.

The method 1900 may proceed from step 1920 to one of the steps 1930, 1940, 1950 or 1955 depending on the selection made by a user at the step 1920. The method 1900 may, upon the user's choice in step 1920, proceed to a step of initiating a search of the one or more link directories based upon link reference attributes (step 1930). The step of initiating a search of the one or more link directories based upon link reference attributes (step 1930) enables a search according to the steps of the method 1500 described above. The method 1900 may alternatively, upon the user's choice in step 1920, proceed to a step of initiating a search of the one or more link directories based upon link relationship attributes (step 1940). The step of initiating a search of the one or more link directories based upon link relationship attributes (step 1940) enables a search according to the steps of the method 1600 described above. The method 1900 may alternatively, upon the user's choice in step 1920, proceed to a step of initiating a search of the one or more link directories based upon selected link references (step 1950). The step of initiating a search of the one or more link directories based upon selected link references (step 1950) enables a search according to the steps of the method 1700 described above. The method 1900 may alternatively, upon the user's choice in step 1920, proceed to a step of initiating a search of the one or more link directories based upon selected document objects (step 1955). The step of initiating a search of the one or more link directories based upon selected document objects (step 1955) enables a search according to steps similar to the method 700 described above.

The method 1900 may proceed from one of the steps 1930, 1940, 1950 or 1955 to a step of displaying one or more link relationship attributes that describe the identified link relationships 45 (step 1960). Through the step 1960, the method 1900 may further display to the user one or more document objects 40, 50 identified in the search of link relationships 45 and link references 42, 52 stored in the one or more link directories 35 as document objects 40, 50 that may be of interest to the user.

The steps 1930, 1940, 1950 or 1955 preceding the step of displaying to the user one or more link relationship attributes (step 1960) may include a step of identifying one or more link relationships 45 using the selected items in first list of search items (not shown). In the embodiment where the first list of search items include link references 42, 52 (step 1950), the identifying step includes a step of identifying one or more link relationships 45 that the selected link references 42, 52 participate in (not shown, but see the method 1700 described above). In the embodiment where the first list of search items include link reference attributes (step 1930), the identifying step includes a step of identifying one or more link relationships 45 that one or more link references 42, 52 having the selected link reference attributes participate in (not shown, but see the method 1500 described above). In the embodiment where the first list of search items include link relationship attributes (step 1940), the identifying step includes a step of identifying one or more link relationships 45 that may be described by the selected link relationship attributes (not shown, but see the method 1600 described above). In addition, in the embodiment where the first list of search items include document objects 40, 50 (step 1950), the identifying step includes a step of identifying one or more link relationships 45 that one or more link references 42, 52 to the selected document objects 40, 50 participate in (not shown, but see the method 700 described above).

In one embodiment of the method 1900 where the user selects to proceed with the path defined by the step 1950, the method may further include steps for retrieving one or more link references 42, 52 that participate in one or more of the identified link relationships 45 (not shown); and a step of displaying the retrieved link references 42, 52 (not shown). In one embodiment of the method 1900 where the user selects to proceed with the path defined by the step 1930, the method may further include steps for retrieving one or more link reference attributes that describe the link references 42, 52 that participate in one or more of the identified link relationships 45 (not shown); and a step of displaying the retrieved link reference attributes (not shown). In one embodiment of the method 1900 where the user selects to proceed with the path defined by the step 1955, the method may further include steps for retrieving one or more document objects 40, 50 represented by the one or more link references 42, 52 that participate in one or more of the identified link relationships 45 (not shown); and a step of displaying the retrieved document objects 40, 50 (not shown).

The steps of the method 1900 shown in FIG. 19 may be repeated by choosing a method of searching link relationships 45 (step 1920) or a method of configuring search parameters for indirect search (step 1910) after the step of displaying the desired document object 40,50 (step 1960). In addition, the steps of the method 1900 may be repeated where the items in the first list of search items include displayed results of a previous iteration of a search according to the method 1900.

The steps of the methods 600, 700, 800, 1100, 1500, 1600, 1700 and 1900, and subsets of those steps or parts of the methods, may be implemented with hardware or by execution of programs, modules or scripts. The programs, modules or scripts may be stored or embodied on one or more computer readable mediums in a variety of formats, including source code, object code or executable code, among other formats. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet, wireless networks, or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A non-transitory computer readable medium upon which is embedded instructions for carrying out a method comprising:
   receiving a user input specifying a first document object located on a network and a second document object located on a network;
   creating a link relationship between the first document object and the second document object, wherein the creating is based on the received user input and establishes a traversable connection between the first and second document objects, such that the traversable connection contains information describing traversal from the first document object to the second document object and from the second document object to the first document object;
   creating a link directory for storing one or more traversable connections between document objects located on a network, wherein the link directory contains one or more records corresponding to the one or more link relationships between document objects;
   creating a plurality of link relationship attributes for the link relationship, wherein the link relationship attributes describe the link relationship in a context useful to a user of the network;
   storing the link relationship separate from the first document object and the second document object in the link directory, wherein the link relationship is stored as a record and connects document objects in a pairwise fashion by having a field identifying the first document object, and a field identifying the second document object, and one or more fields identifying link relationship attributes describing the traversable connection between the two document objects;
   presenting the first document object;
   presenting at least one of the plurality of link relationship attributes; and
   presenting the link relationship, thereby optimizing the ability to search document objects on the network by transforming an identification of individual document objects on the network into a presentation of a traversable relationship between the two document objects.

2. The computer readable medium of claim 1 wherein the method further comprises receiving user input describing the link directory, wherein the creating a link directory creates the link directory based on the received user input describing the link directory.

3. The computer readable medium of claim 1 wherein the method further comprises creating or forming the first document object.

4. The computer readable medium of claim 1 wherein the method further comprises storing a user profile.

5. The computer readable medium of claim 1 wherein the second document object is an image.

6. The computer readable medium of claim 1 wherein the first document object contains text and the second document object is an image.

7. The computer readable medium of claim 1 wherein the method further comprises accessing a user profile and accessing a link to the second document object.

8. The computer readable medium of claim 1 wherein the method further comprises recording data regarding the first document object in a user data store.

9. The computer readable medium of claim 1 wherein the user input is received from a user sponsoring the link relationship.

10. The computer readable medium of claim 1 further comprising creating a link relationship between the second document object and a third document object, wherein said link relationship is stored as a separate record in the link directory having a field identifying the second document object, a field identifying the third document object, and one or more fields identifying link relationship attributes describing the traversable connection between the two document objects.

11. The computer readable medium of claim 1 further comprising authorizing one or more users to access the link relationship.

12. The computer readable medium of claim 1 further comprising assigning the link relationship attributes describing the link relationship.

13. The computer readable medium of claim 12 further comprising storing the assigned link relationship attributes in the link directory.

14. The computer readable medium of claim 1 further comprising assigning attributes describing the first document object.

15. The computer readable medium of claim 1 further comprising assigning attributes describing the second document object.

16. The computer readable medium of claim 1 further comprising retrieving the first document object using the link relationship.

17. The computer readable medium of claim 1 further comprising retrieving the second document object using the link relationship.

18. The computer readable medium of claim 1 wherein the second document object includes motion pictures.

19. A non-transitory computer readable medium upon which is embedded instructions for carrying out a method comprising:
   receiving identification of a user profile located on a network and an image wherein the image is a document object located on a network;
   creating, using the received identification of the image, a link relationship referencing the image, wherein the link relationship establishes a traversable connection between said image and a second document object located on the network;
   creating a link directory for storing one or more link relationships between document objects located on a network, wherein the link directory stores one or more records representing the one or more link relationships between document objects;

creating a plurality of link relationship attributes for the link relationship;

storing the created link relationship in the link directory, wherein the link relationship is stored as one of said records in the link directory and explicitly relates document objects in a pairwise fashion by having a field identifying the first document object, a field identifying the second document object, and one or more fields identifying link relationship attributes describing traversable connection between the two document objects; and enabling a user to retrieve the stored link relationship from the link directory thereby optimizing a functionality of a computer by improving a user's ability to access document objects on a network by enabling a user to retrieve the traversable records of pairwise related document objects.

20. A non-transitory computer readable medium upon which is embedded instructions for carrying out a method comprising:

automatically uploading a first document object received from a user device;

automatically creating one or more link relationships referencing the first document object, wherein creating a link relationship referencing the first document object establishes a traversable connection between the first document object and a second document object located on a network;

assigning a plurality of link relationship attributes describing at least one of the one or more link relationships;

publishing the one or more link relationships wherein publishing the one or more link relationships comprises publishing, on a network, at least the reference to the first document object, the reference to the second document object, and one of said link relationships between the first document object and the second document object located on the network;

storing the one or more link relationships in one or more link directories, wherein each link relationship is stored as a record in the one or more link directories and relates document objects in a pairwise fashion by having a field referencing a first document object, a field referencing a second document object, and one or more fields identifying link relationship attributes describing the traversable connection between the two document objects;

making the first document object available to users through the one or more link relationships thereby optimizing a functionality of a computer by allowing users the ability to access related document objects on a network by explicitly relating document objects in a pairwise fashion.

21. The computer readable medium of claim 20 wherein the method further comprises authorizing a user to access the first document object.

22. The computer readable medium of claim 20 wherein publishing the one or more link relationships storing includes storing the one or more link relationships as one or more records in one or more link directories selected by the user.

23. The computer readable medium of claim 20 wherein the method further comprises automatically creating one or more link directories.

24. The computer readable medium of claim 20 wherein the first document object is an image.

25. The computer readable medium of claim 20 wherein the method further comprises authorizing one or more users to access the one or more link relationships.

26. The computer readable medium of claim 20 further comprising storing the assigned link relationship attributes.

27. The computer readable medium of claim 20 wherein the method further comprises assigning attributes describing the first document object.

28. The computer readable medium of claim 20 wherein the method further comprises retrieving the first document object using one of the one or more link relationships.

29. The computer readable medium of claim 20 wherein the publishing occurs after the first document object is uploaded.

30. The computer readable medium of claim 20 wherein at least one of the one or more link relationships references a second document object.

31. The computer readable medium of claim 30 wherein the second document object is an image.

32. A non-transitory computer readable medium upon which is embedded instructions for carrying out a method comprising:

automatically uploading a first document object received from a user;

automatically creating one or more link relationships referencing the first document object, wherein creating a link relationship referencing the first document object establishes a traversable connection between the first document object and a second document object located on a network;

publishing the one or more link relationships to one or more link directories appropriate to the link relationship, wherein link directories store one or more records corresponding to the one or more link relationships between document objects such that each record explicitly relates document objects in a pairwise fashion by having a field identifying a first document object and a field identifying a second document object;

assigning attributes describing the first document object; and assigning a plurality of link relationship attributes describing at least one of the one or more link relationships.

33. The computer readable medium of claim 32 wherein assigning attributes describing the first document object comprises automatically assigning the attributes.

34. The computer readable medium of claim 32 wherein assigning attributes describing the first document object comprises enabling the user to assign attributes describing the first document object.

35. The computer readable medium of claim 32 wherein the method further comprises automatically assigning the plurality of link relationship attributes describing at least one of the one or more link relationships.

36. The computer readable medium of claim 32 wherein the method further comprises receiving a user selection of an existing first document object.

37. The computer readable medium of claim 32 wherein publishing the one or more link relationships includes storing at least one of the one or more link relationships in one or more link directories selected by the user.

38. The computer readable medium of claim 32 wherein the method further comprises automatically creating one or more link directories.

39. The computer readable medium of claim 32 wherein the first document object is an image.

40. The computer readable medium of claim 32 wherein the method further comprises authorizing one or more users to access the one or more link relationships.

41. The computer readable medium of claim 32 wherein the method further comprises authorizing one or more users to access the uploaded first document object.

42. The computer readable medium of claim 32 wherein the method further comprises authorizing, based on user input, a user to access the uploaded first document object.

43. The computer readable medium of claim 32 wherein the method further comprises storing the assigned plurality of link relationship attributes in the one or more link directories.

44. The computer readable medium of claim 32 wherein the method further comprises retrieving the first document object using one of the one or more link relationships.

45. The computer readable medium of claim 32 wherein the publishing occurs after the first document object is uploaded.

46. The computer readable medium of claim 32 wherein at least one of the one or more link relationships references a second document object.

47. The computer readable medium of claim 46 wherein the second document object is an image.

48. A computer system for managing links, comprising:
one or more processors; and
at least one memory including program code that, when executed by the one or more processors, causes the computer system to:
receive for processing user input identifying a user profile located on a network and an image, wherein the image is a document object located on a network;
create, using the received identifications, a link relationship to the image such that the link relationship establishes a traversable connection between the image and a second document object located on the network;
generate a link directory for storing one or more records corresponding to one or more link relationships between document objects located on a network, wherein each record explicitly relates document objects in a pairwise fashion by having a field identifying a first document object, a field identifying a second document object, and one or more fields identifying link relationship attributes describing the traversable connection between the two document objects;
assign a plurality of link relationship attributes describing the link relationship;
store the created link relationship in the link directory whereby storing created link relationships improves the functionality of the computer system by establishing a network of pairwise related document objects; and
send the stored link relationship from the link directory to a user device.

49. The computer system of claim 48 wherein the at least one memory further comprises program code that, when executed by the processor, causes the computer system to publish the created link relationship.

50. The computer system of claim 48 wherein the at least one memory further comprises program code that, when executed by the processor, causes the computer system to authorize a user to access the stored link relationship.

51. A computerized method for linking data objects comprising:
receiving, using a computer system, an identification of a first document object located on a network and a second document object located on a network;
creating, using a computer system, a link relationship between the first document object and the second document object, wherein the creating is based on the received identifications and establishes a traversable connection between the first and second document objects;
automatically creating a link directory for storing link relationships between document objects located on a network;
creating a plurality of link relationship attributes for the link relationship;
storing in a memory device the link relationship in the link directory, wherein the link relationship is stored as a record in the link directory and explicitly relates document objects in a pairwise fashion by having a field identifying the first document object, a field identifying the second document object and one or more fields identifying link relationship attributes describing the traversable connection between the two document objects; and
making the link relationship and the plurality of link relationship attributes available to a user device upon request.

52. The computerized method of claim 51 further comprising publishing the created link relationship.

53. The computerized method of claim 51 further comprising authorizing a user to access the available link relationship and plurality of link relationship attributes.

* * * * *